US012486264B2

(12) United States Patent
Mevellec et al.

(10) Patent No.: US 12,486,264 B2
(45) Date of Patent: Dec. 2, 2025

(54) BICYCLIC HPK1 INHIBITORS

(71) Applicant: Janssen Pharmaceutica NV, Beerse (BE)

(72) Inventors: Laurence Anne Mevellec, Louviers (FR); Jorge Eduardo Vialard, Zurich (CH); Sophie Coupa, Belbeuf (FR); Christophe Denis Pascal Adelinet, Iville (FR); Berthold Wroblowski, Vosselaar (BE); James Patrick Edwards, Ambler, PA (US)

(73) Assignee: Janssen Pharmaceutica NV, Beerse (BE)

( * ) Notice: Subject to any disclaimer, the term of this patent is extended or adjusted under 35 U.S.C. 154(b) by 906 days.

(21) Appl. No.: 17/442,655

(22) PCT Filed: Mar. 24, 2020

(86) PCT No.: PCT/EP2020/058085
§ 371 (c)(1),
(2) Date: Sep. 24, 2021

(87) PCT Pub. No.: WO2020/193512
PCT Pub. Date: Oct. 1, 2020

(65) Prior Publication Data
US 2022/0169644 A1 Jun. 2, 2022

Related U.S. Application Data

(60) Provisional application No. 62/823,712, filed on Mar. 26, 2019.

(30) Foreign Application Priority Data

Apr. 8, 2019 (EP) .................................... 19167828

(51) Int. Cl.
*C07D 471/04* (2006.01)
(52) U.S. Cl.
CPC .................................. *C07D 471/04* (2013.01)
(58) Field of Classification Search
CPC ............................. C07D 471/04; A61P 35/00
See application file for complete search history.

(56) References Cited

U.S. PATENT DOCUMENTS

| | | | |
|---|---|---|---|
| 2019/0076401 A1 | 3/2019 | Vechorkin et al. | |
| 2020/0000780 A1 | 1/2020 | Heffron et al. | |

FOREIGN PATENT DOCUMENTS

| | | | |
|---|---|---|---|
| WO | 2016/090300 A1 | 6/2016 | |
| WO | 2016/205942 A1 | 12/2016 | |
| WO | 2018/049152 A1 | 3/2018 | |
| WO | 2018/049191 A1 | 3/2018 | |
| WO | 2018/049214 A1 | 3/2018 | |
| WO | WO-2018049200 A1 * | 3/2018 | .......... A61K 31/437 |
| WO | 2018/081531 A2 | 5/2018 | |
| WO | 2018/102366 A1 | 6/2018 | |
| WO | 2018/167147 A1 | 9/2018 | |
| WO | 2018/183956 A1 | 10/2018 | |
| WO | 2018/183964 A1 | 10/2018 | |
| WO | 2018/215668 A1 | 11/2018 | |
| WO | 2018/228920 A1 | 12/2018 | |
| WO | 2018/228923 A1 | 12/2018 | |
| WO | 2018/228925 A1 | 12/2018 | |
| WO | 2019/051199 A1 | 3/2019 | |

OTHER PUBLICATIONS

Healy, A. M., et al. Advanced Drug Delivery Reviews 117 (2017) 25-46. (Year: 2017).*
Hernandez, S., et al., 2018, Cell Reports 25, 80-94. (Year: 2018).*
Alzabin et al., "Hematopoietic progenitor kinase 1 is a critical component of prostaglandin E2-mediated suppression of the anti-tumor immune response", Cancer Immunol. Immunother, 2010, 59, 419-429.
Alzabin et al., "Hematopoietic progenitor kinase 1 is a negative regulator of dendritic cell activation", J. Immunol., 2009, 182, 6187-6194.
Arnold et al., "Activation of Hematopoietic Progenitor Kinase 1 Involves Relocation, Autophosphorylation, and Transphosphorylation by Protein Kinase D 1", Mol. Cell Biol, 2005, 25, 2364-2383.
Arnold et al., "Caspase-mediated cleavage of hematopoietic progenitor kinase 1 (HPK1) converts an activator of NFkappaB into an inhibitor of NFkappaB", J. Biol. Chem, 2001, 276, 14675-14684.
Batliwalla et al., "Microarray analyses of peripheral blood cells identifies unique gene expression signature in psoriatic arthritis", Mol. Med., 2005, 11, 21-29.
Brenner et al., "Activation or suppression of NFkappaB by HPK1 determines sensitivity to activation-induced cell death", Embo J., 2005, 24, 4279-4290.
Charron et al., Tetrahedron Letters, "Recent developments in radiolabelled peptides for PET imaging of cancer", 2016, 57(37), 4119-4127.
Di Bartolo et al., "A novel pathway down-modulating T cell activation involves HPK-1-dependent recruitment of 14-3-3 proteins on SLP-76", J. Exp. med., 2007, 204, 681-691.
Gennaro et al., Remington's Pharmaceutical Sciences, 18th ed., Mack Publishing Company, Chapter 89, 1990, 1633-1665.
Hu et al., "Human HPK1, a novel human hematopoietic progenitor kinase that activates the JNK/SAPK kinase cascade", Genes Dev., 1996, 10, 2251-2264.
Kiefer et al., "HPK1, a hematopoietic protein kinase activating the SAPK/JNK pathway", Embo J., 1996, 15, 7013-7025.
Konigsberger et al., "HPK1 associates with SKAP-HOM to negatively regulate Rap1-mediated B-lymphocyte adhesion", PLOS One, 2010, 5(9), e12468, 9pp.
Lasserre et al., "Release of serine/threonine-phosphorylated adaptors from signaling microclusters down-regulates T cell activation" J. Cell Biol., 2011, 839-853.

(Continued)

*Primary Examiner* — Eric Olson
*Assistant Examiner* — Samuel L Galster
(74) *Attorney, Agent, or Firm* — BakerHostetler

(57) ABSTRACT

The present invention relates to pharmaceutical agents useful for therapy and/or prophylaxis in a mammal, pharmaceutical composition comprising such compounds, and their use as HPK1 inhibitors, useful for treating diseases such as cancer.

23 Claims, No Drawings

(56) References Cited

OTHER PUBLICATIONS

Leahy et al., "Discovery of a Novel Series of Potent and Orally Bioavailable Phosphoinositide 3-Kinase r Inhibitors", J. Med. Chem., 2012, vol. 55(11), 5467-5482.

Ling et al., "Involvement of hematopoietic progenitor kinase 1 in T cell receptor signaling", J. Biol. Chem., 2001, 276, 18908-18914.

Liou et al., "HPK1 is activated by lymphocyte antigen receptors and negatively regulates AP-1", Immunity, 2000, 12, 399-408.

Nagata et al., "Activation of hematopoietic progenitor kinase-1 by erythropoietin", Blood, 1999, 93, 3347-3354.

Pantel et al., Cancer Letters, "Molecular imaging to guide systemic cancer therapy: Illustrative examples of PET imaging cancer biomarkers", 2016, doi: 10.1016/j.canlet.2016.05.008, 25-31.

Patzak et al., "HPK1 competes with ADAP for SLP-76 binding and via Rap1 negatively affects T-cell adhesion", Eur. J. Immunol., 2010, 40, 3220-3225.

Ribas et al., "Cancer immunotherapy using checkpoint blockage", Science, 2018, 359, 1350-1355.

Sawasdikosol et al., "Hematopoietic progenitor kinase 1 (HPK1) negatively regulates postaglandin E2-induced fos gene transcription", Blood, 2003, 101, 3687-3689.

Sawasdikosol et al., "Prostaglandin E2 activates HPK1 kinase activity via a PKA-dependent pathway", J. Biol. Chem., 2007, 282, 34693-34699.

Shui et al., "Hematopietic progenitor kinase 1 negatively regulates T cell receptor signaling and T cell-mediated immune responses", Nat. Immunol., 2007, 8, 84-91.

Stoeckman et al., "A distinct inflammatory gene expression profile in patients with psoriatic arthritis", Gene Immun., 2006, 7, 583-591.

Wuts et al., Greene's Protective Groups in Organic Synthesis, 4th ed., Wiley, Hoboken, New Jersey, 2007, 1pp.

Zhang et al., "Inhibited expression of hematopoietic progenitor kinase 1 associated with loss of jumonji domain containing 3 promoter binding contributes to autoimmunity in systemic lupus erythematosus", J. Autoimmun., 2011, 31, 180-189.

Zhou et al., "Hematopoietic progenitor kinase 1 is a component of transforming growth factor beta-induced c-Jun N- terminal kinase signaling cascade", J. Biol. Chem. 1999, 274, 13133-13138.

\* cited by examiner

BICYCLIC HPK1 INHIBITORS

CROSS-REFERENCE TO RELATED APPLICATIONS

This application is the National Stage of International Patent Application No. PCT/EP2020/058085, "Bicyclic HPK1 Inhibitors" (filed Mar. 24, 2020), which claims priority to U.S. Patent Application No. 62/823,712 (filed Mar. 26, 2019) and European Patent Application No. 19167828.3 (filed Apr. 8, 2019). The foregoing applications are incorporated herein by reference in their entireties for any and all purposes.

FIELD OF THE INVENTION

The present invention relates to pharmaceutical agents useful for therapy and/or prophylaxis in a mammal, pharmaceutical composition comprising such compounds, and their use as HPK1 inhibitors, useful for treating diseases such as cancer.

BACKGROUND OF THE INVENTION

One of the hallmarks of cancer is its ability to evade the immune system by suppressing its ability to recognize malignant cells and mount an effective immune response against them. Therapeutic strategies designed to overcome these immunosuppressive effects include interfering with mechanisms that negatively regulate effector T cell function, such as the PD1/PDL1 immune checkpoint axis (Ribas and Wolchok, 2018). Antibodies that block PD1/PDL1 interaction and thereby eliminate the suppressive effect on T cells have demonstrated clinical benefit in several cancer types. Another example is the use of therapeutic antibodies that block the interaction between CD80/CD86 and the T-cell co-inhibitory receptor, CTLA-4, which facilitates T cell expansion in secondary lymphoid tissues. In addition to these cell-surface associated proteins, negative regulators of intracellular signalling required for an effective immune response have also been identified. One of these is Hematopoietic Progenitor Kinase 1 (HPK1), also known as MAP4K1, a serine/threonine kinase whose expression is restricted to heinatopoietic cells (Hu et al., 1996; Kiefer et al., 1996).

HPK1 deficiency is associated with autoimmnunity in humans and mice, suggesting a role in immune tolerance. HPK1 expression was down-regulated in PBMCs from patients with psoriatic arthritis (Batliwalla et al., 2005; Stoeckman et al., 2006) and in T cells from patients with systemic lupus erythemnatosus (Zhang et al., 2011), while HPK1-deficient mice displayed increased susceptibility to experimentally induced autoimmune encephalitis (Shui et al., 2007). T and B cells isolated from HPK1-deficient mice demonstrated enhanced antigen-dependent activation (Shui et al., 2007; Alzabin et al., 2010), highlighting its role as a negative regulator of T and B cell function. HPK1-deficient dendritic cells displayed enhanced antigen-presenting and T-cell activating properties, consistent with a negative regulatory role in these immune cells (Alzabin et al., 2009). HPK1 may also play a role in T and B cell adhesion by regulating integrin activation (Patzak et al., 2010; Königsberger et al., 2010). Overexpression studies suggested a role in activation-induced cell death through JNK pathway activation (Arnold et al., 2001; Brenner et al., 2005).

The HPK1 kinase is activated by T cell receptor and B cell receptor engagement. Upon TCR activation in T cells, Hpk1 is recruited to the TCR foci where it is phosphorylated and activated by Lck and Zap70 kinases (Arnold et al., 2005; Ling et al., 2001; Liou et al; 2000). Activated Hpk1 phosphorylates the adaptor proteins SLP76 and LAT, components of the TCR signalling complex that also includes GADS (Di Bartolo et al., 2007). Hpk1-dependent SLP76 phosphorylation on S376 creates a docking site for 14-3-3 proteins, which target SLP76 for degradation, thereby causing disruption of the TCR signalling complex and preventing further downstream signalling required for T cell activation (Lasserre et al., 2011). Hpk1 can also be activated by PGE2 in a PKA-dependent manner (Sawasdikosol et al., 2003, 2007; Alzabin et al., 2010) and possibly other immunosuppressive factors produced by tumors (Nagata et al., 1999; Zhou et al., 1999).

Growth of syngeneic Lewis Lung carcinoma tumors was reduced in HPK1$^{-/-}$ compared to wild-type mice (Alzabin et al., 2010). Adoptive T cell transfer studies into T cell deficient mice demonstrated that the anti-tumor immune response in HPK1$^{-/-}$ mice was at least partially T-cell dependent (Alzabin et al., 2010). A potential contribution from dendritic cells to the anti-tumor effect in HPK1$^{-/-}$ mice was demonstrated by reconstitution of irradiated mice with HPK1-deficent bone marrow derived dendritic cells (Alzabin et al., 2009). In more recent studies using mutant mice expressing a catalytically inactive form of HPK1, reduced GL261 glioblastoma tumor growth was observed and the anti-tumoral effect of anti-PD1 treatment on MC38 tumors was enhanced in mutant compared to wild-type mice (Hernanadez et al., 2018). These studies suggest that small molecule HPK1 kinase inhibitors could provide anti-tumoral effects as single agents, but also in combination with other immune modulators.

REFERENCES REFERRED TO HEREABOVE

Alzabin S, Bhardwaj N, Kiefer F, Sawasdikosol S, Burakoff S. (2009). Hematopoietic progenitor kinase 1 is a negative regulator of dendritic cell activation. J. Immunol. 182: 6187-94.

Alzabin S, Pyarajan S, Yee H, Kiefer F, Suzuki A, Burakoff S, Sawasdikosol S. (2010). Hematopoietic progenitor kinase 1 is a critical component of prostaglandin E2-mediated suppression of the anti-tumor immune response. Cancer Immunol. Immunother. 59:419-29.

Arnold R, Liou J, Drexler H C, Weiss A, Kiefer F. (2001). Caspase-mediated cleavage of hematopoietic progenitor kinase 1 (HPK1) converts an activator of NFkappaB into an inhibitor of NFkappaB. J Biol Chem. 276:14675-84.

Arnold R, Patzak I M, Neuhaus B, Vancauwenbergh S, Veillette A, Van Lint J, Kiefer F. (2005). Mol Cell Biol. 25:2364-83.

Batliwalla F M, Li W, Ritchlin C T, Xiao X, Brenner M, Laragione T, Shao T, Durham R, Kemshetti S, Schwarz E, Coe R, Kern M, Baechler E C, Behrens T W, Gregersen P K, Gulko P S. (2005). Microarray analyses of peripheral blood cells identifies unique gene expression signature in psoriatic arthritis. Mol Med. 11:21-9.

Brenner D, Golks A, Kiefer F, Krammer P H, Arnold R. (2005). Activation or suppression of NFkappaB by HPK1 determines sensitivity to activation-induced cell death. EMBO J. 24:4279-90.

Di Bartolo V. Montagne B, Salek M, Jungwirth B, Carrette F, Fourtane J, Sol-Foulon N, Michel F, Schwartz O, Lehmann W D, Acuto O. (2007). A novel pathway down-modulating T cell activation involves HPK-1-dependent recruitment of 14-3-3 proteins on SLP-76. J Exp Med. 204:681-91.

Hernandez S, Qing J, Thibodeau R H, et al. (2018). The kinase activity of Hematopoietic Progenitor Kinase 1 Is essential for the regulation of T cell function. Cell Rep. 25:80-94.

Hu M C, Qiu W R, Wang X, Meyer C F, Tan T H. (1996). Human HPK1, a novel human hematopoietic progenitor kinase that activates the JNK/SAPK kinase cascade. Genes Dev. 10:2251-64.

Kiefer F, Tibbles L A, Anafi M, Janssen A, Zanke B W, Lassam N, Pazwson T, Woodgett J R, Iscove N N. (1996). HPK1, a hematopoietic protein kinase activating the SAPK/JNK pathway. EMBO J. 15:7013-25.

Königsberger S, Peckl-Schmid D, Zaborsky N, Patzak I, Kiefer F, Achatz G. (2010). HPK1 associates with SKAP-HOM to negatively regulate Rapt-mediated B-lymphocyte adhesion. PLoS One. 5(9): e12468.

Lasserre R, Cuche C, Blecher-Gonen R, Libman E, Biquand E, Danckaert A, Yablonski D, Alcover A. Di Bartolo V. (2011). Release of serine/threonine-phosphorylated adaptors from signaling microclusters down-regulates T cell activation. J Cell Biol. 195:839-53.

Ling P, Meyer C F, Redmond L P, Shui J W, Davis B, Rich R R, Hu M C, Wange R L, Tan T H. (2001). Involvement of hematopoietic progenitor kinase T in T cell receptor signaling. J Biol Chem. 276:18908-14.

Liou J, Kiefer F, Dang A, Hashimoto A, Cobb M H, Kurosaki T, Weiss A. (2000). HPK1 is activated by lymphocyte antigen receptors and negatively regulates AP-1. Immunity. 12:399-408.

Nagata Y, Kiefer F, Watanabe T, Todokoro K. (1999). Activation of hematopoietic progenitor kinase-1 by erythropoietin. Blood 93:3347-54.

Patzak I M, Königsberger S, Suzuki A, Mak T W, Kiefer F. (2010). HPK1 competes with ADAP for SLP-76 binding and via Rapt negatively affects T-cell adhesion. Eur J Immunol. 40:3220-5.

Ribas A, Wolchok J D. (2018). Cancer immunotherapy using checkpoint blockade. Science 359:1350-1355.

Savasdikosol S, Russo K M, and Burakoff S J. (2003). Hematopoietic progenitor kinase 1 (HPK1) negatively regulates prostaglandin E2-induced fos gene transcription. Blood 101:3687-9.

Sawasdikosol S, Pyarajan S, Alzabin S, Matejovic G, and Burakoff S J. (2007). Prostaglandin E2 activates HPK1 kinase activity via a PKA-dependent pathway. J Biol Chem. 282:34693-9.

Shui J W, Boomer J S, Han J, Xu J, Dement G A, Zhou G, Tan T H. (2007). Hematopoietic progenitor kinase 1 negatively regulates T cell receptor signaling and T cell-mediated immune responses. Nat Immunol. 8:84-91.

Stoeckman A K, Baechler E C, Ortmann W A, Behrens T W, Michet C J, Peterson E J. (2006). A distinct inflammatory gene expression profile in patients with psoriatic arthritis. Genes Immun. 7:583-91.

Zhang Q, Long H, Liao J, Zhao M, Liang G, Wu X, Zhang P, Ding S, Luo S, Lu Q. (2011). Inhibited expression of hematopoietic progenitor kinase 1 associated with loss of jumonji domain containing 3 promoter binding contributes to autoimmunity in systemic lupus erythematosus. J Autoimmun. 37:180-9.

Zhou G, Lee S C, Yao Z, Tan T H. (1999). Hematopoietic progenitor kinase 1 is a component of transforming growth factor beta-induced c-Jun N-terminal kinase signaling cascade. J Biol Chem. 274:13133-8.

WO2018049152, WO2018049214, WO2018049200, WO2018049191 and WO2019051199 describe derivatives as HPK1 modulators and uses thereof for the treatment of cancer.

WO2018081531 describes methods for human T-cell activation.

WO2018102366 describes anilinopyrimidines as HPK1 inhibitors.

WO2016090300 describes methods and compositions for treating cancer using PD-1 axis antagonists and HPK1 antagonists.

WO2018167147, WO2018183956 and WO2018183964 describe compounds as inhibitors of HPK1.

WO2018215668 describes inhibitors of MAP4K1.

WO2018228920, WO2018228923 and WO2018228925 describe compounds useful in the treatment or prophylaxis of a disease, where the disease is cancer or conditions with dysregulated immune responses or other disorders associated with aberrant MAP4K1 signaling.

WO2016205942 describes HPK1 inhibitors.

DESCRIPTION OF THE INVENTION

The present invention concerns novel compounds of Formula (I):

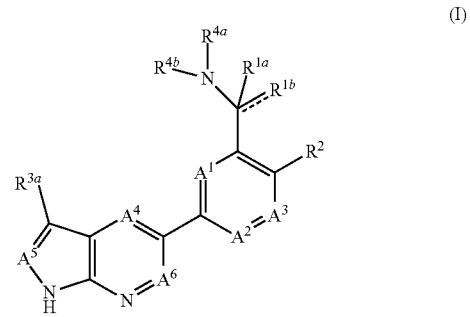

tautomers and stereoisomeric forms thereof, wherein
the dotted bond towards $R^{1b}$ is an optional bond that may be present when $R^{1b}$ and $R^{4b}$ are taken together to form a monocyclic or bicyclic aromatic heterocyclyl as defined herein;
$A^1$ represents CH or N; $A^2$ represents CH; $A^3$ represents CH or N;
provided that only one of $A^1$ and $A^3$ represents N;
$A^4$ represents CH or N; $A^5$ represents N or $CR^{3b}$; $A^6$ represents CH;
$R^{1a}$ represents hydrogen;
$R^{1b}$ represents hydrogen or $CH_3$;
$R^{4a}$ represents hydrogen, $C_{1-4}$alkyl, or $C_{3-6}$cycloalkyl;
$R^{4b}$ represents hydrogen, $C_{1-4}$alkyl, $C_{3-6}$cycloalkyl, or
a carbon linked monocyclic 4-, 5-, 6- or 7-membered non-aromatic heterocyclyl containing 1, 2 or 3 heteroatoms each independently selected from the group consisting of N, O, and S; wherein said S-atom might be substituted to form S(=O), S(=O)$_2$, or S(=O)(=NR$^x$);
or
$R^{1b}$ and $R^{4b}$ are taken together to form together with the atoms to which they are attached a monocyclic 5-membered aromatic heterocyclyl or a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$); or a bicyclic 6- to 12-membered aromatic or fully saturated heterocyclyl containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$);

wherein said monocyclic or bicyclic, aromatic or fully saturated heterocyclyl might be substituted on one or more of the carbon atoms with in total 1, 2 or 3 substituents each independently selected from the group consisting of —OH, CN, halo, R$^7$, —O—R$^7$, —S(=O)$_2$—R$^7$, —C(=O)—R$^7$, —NR$^{6c}$R$^{6d}$, —C(=O)—NR$^{6a}$R$^{6b}$, and Het$^c$;

wherein said monocyclic or bicyclic, aromatic or fully saturated heterocyclyl might be substituted on the optional additional nitrogen atoms with in total 1 or 2 substituents each independently selected from the group consisting of R$^7$, —S(=O)$_2$—R$^7$, —C(=O)—R$^7$, —C(=O)—NR$^{6a}$R$^b$, and Het$^d$;

provided that in case R$^{1b}$ and R$^{4b}$ are taken together, R$^{4a}$ represents hydrogen; and R$^{1a}$ represents hydrogen or R$^{1a}$ is absent when the dotted bond towards R$^{1b}$ is a bond;

or

R$^{4a}$ and R$^{4b}$ are taken together to form together with the N-atom to which they are attached a monocyclic 5-, 6- or 7-membered aromatic heterocyclyl or a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$); or a bicyclic 6- to 12-membered aromatic or fully saturated heterocyclyl containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$);

wherein said monocyclic or bicyclic, aromatic or fully saturated heterocyclyl might be substituted on one or more of the carbon atoms with in total 1, 2 or 3 substituents each independently selected from the group consisting of —OH, CN, halo, R$^7$, —O—R$^7$, —S(=O)$_2$—R$^7$, —C(=O)—R$^7$, —NR$^{6c}$R$^{6d}$, —C(=O)—NR$^{6a}$R$^{6b}$, and Het$^c$;

wherein said monocyclic or bicyclic, aromatic or fully saturated heterocyclyl might be substituted on the nitrogen atoms with in total 1 or 2 substituents each independently selected from the group consisting of R$^7$, —S(=O)$_2$—R$^7$, —C(=O)—R$^7$, —C(=O)—NR$^{6a}$R$^{6b}$, and Het$^d$;

in case R$^{4a}$ and R$^{4b}$ are taken together, R$^{1a}$ represents hydrogen, and R$^{1b}$ represents hydrogen;

R$^2$ is selected from the group consisting of cyano; halo; —C(=O)—NR$^{8a}$R$^{8b}$;

—CH$_2$—NR$^{8c}$R$^{8d}$; Het$^b$; —P(=O)—(C$_{1-4}$alkyl)$_2$; —S(=O)$_2$—C$_{1-4}$alkyl; —S(=O)(=NR$^x$)—C$_{1-4}$alkyl;

C$_{1-6}$alkyl optionally substituted with 1 or 2 substituents each independently selected from the group consisting of halo, —OH, cyano, and —O—C$_{1-4}$alkyl;

C$_{3-6}$cycloalkyl optionally substituted with 1 or 2 substituents each independently selected from the group consisting of halo, —OH, cyano and —O—C$_{1-4}$alkyl; and C$_{3-6}$cycloalkenyl optionally substituted with 1 or 2 substituents each independently selected from the group consisting of halo, —OH, cyano and —O—C$_{1-4}$alkyl;

R$^{3a}$ represents hydrogen, halo, cyano, —NR$^{6e}$R$^{6f}$, —C(=O)—NR$^{6g}$R$^{6h}$, or C$_{1-4}$alkyl optionally substituted with one, two or three substituents each independently selected from the group consisting of cyano, halo, CF$_3$, —NR$^{6e}$R$^{6f}$, and —C(=O)—NR$^{6g}$R$^{6h}$;

R$^{3b}$ represents hydrogen, halo, cyano, or C$_{1-4}$alkyl optionally substituted by 1, 2 or 3 halo atoms;

R$^{6a}$, R$^{6b}$, R$^{6c}$, and R$^{6d}$ are each independently selected from the group consisting of hydrogen; C$_{3-6}$cycloalkyl optionally substituted with one —OR$^5$; and C$_{1-4}$alkyl optionally substituted with one —OR$^5$, wherein two hydrogen atoms on the same carbon atom of said C$_{1-4}$alkyl might be taken together to form C$_{3-6}$cycloalkyl;

R$^{6e}$, R$^{6f}$, R$^{6g}$, and R$^{6h}$ are each independently selected from the group consisting of hydrogen; —S(=O)$_2$—R$^7$; C$_{3-6}$cycloalkyl optionally substituted with one or two substituents each independently selected from the group consisting of —OR$^5$, Het$^g$, and Het$^e$; and C$_{1-6}$alkyl optionally substituted with one or two substituents each independently selected from the group consisting of —OR$^5$, —NR$^{9a}$—C(O)—R$^{9b}$, Het$^g$, and Het$^e$, wherein two hydrogen atoms on the same carbon atom of said C$_{1-6}$alkyl might be taken together to form C$_{3-6}$cycloalkyl wherein optionally one carbon atom is replaced by an heteroatom selected from nitrogen, oxygen and sulfur;

R$^5$ represents hydrogen or C$_{1-4}$alkyl;

R$^{8a}$, R$^{8c}$, and R$^{8d}$ are each independently selected from the group consisting of hydrogen;

C$_{1-4}$alkyl optionally substituted with one —OH or —O—C$_{1-4}$alkyl; and C$_{3-6}$cycloalkyl optionally substituted with one —OH or —O—C$_{1-4}$alkyl;

R$^{8b}$ is selected from the group consisting C$_{1-4}$alkyl optionally substituted with one —OH or —O—C$_{1-4}$alkyl; and C$_{3-6}$cycloalkyl optionally substituted with one —OH or —O—C$_{1-4}$alkyl;

or

R$^{8a}$ and R$^{8b}$, or R$^{8c}$ and R$^{8d}$ are taken together to form together with the N-atom to which they are attached a monocyclic fully saturated heterocyclyl containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$); wherein said monocyclic 4-, 5-, 6- or 7-membered fully saturated heterocyclyl might be substituted on one or more of the carbon atoms with in total 1, 2 or 3 substituents each independently selected from the group consisting of —OH, CN, halo, R$^7$, —O—R$^7$, —S(=O)$_2$—R$^7$, —C(=O)—R$^7$, —NR$^{6c}$R$^{6d}$, and —C(=O)—NR$^{6a}$R$^{6b}$;

wherein said monocyclic fully saturated heterocyclyl might be substituted on the nitrogen atoms with in total 1 or 2 substituents each independently selected from the group consisting of R$^7$, —S(=O)$_2$—R$^7$, —C(=O)—R$^7$, and —C(=O)—NR$^{6a}$R$^{6b}$;

$R^{9a}$ represents hydrogen or $C_{1-4}$alkyl;

$R^{9b}$ represents hydrogen or $C_{1-4}$alkyl optionally substituted with 1, 2 or 3 halo atoms;

each $Het^c$ independently represents a monocyclic 4-, 5-, 6- or 7-membered fully saturated heterocyclyl containing 1, 2 or 3 heteroatoms each independently selected from the group consisting of N, O or S; wherein said S-atom might be substituted to form $S(=O)$, $S(=O)_2$, or $S(=O)(=NR^x)$;

each $Het^d$ independently represents a carbon linked monocyclic 4-, 5-, 6- or 7-membered fully saturated heterocyclyl containing 1, 2 or 3 heteroatoms each independently selected from the group consisting of N, O or S; wherein said S-atom might be substituted to form $S(=O)$, $S(=O)_2$, or $S(=O)(=NR^x)$;

$Het^b$ represents a monocyclic 4-, 5-, 6- or 7-membered non-aromatic heterocyclyl containing 1, 2 or 3 heteroatoms each independently selected from the group consisting of N, O, S; wherein said S-atom might be substituted to form $S(=O)$, $S(=O)_2$, or $S(=O)(=NR^x)$; or a bicyclic 6- to 12-membered non-aromatic heterocyclyl containing 1, 2 or 3 heteroatoms each independently selected from the group consisting of N, O, S; wherein said S-atom might be substituted to form $S(=O)$, $S(=O)_2$, or $S(=O)(=NR^x)$;

wherein said monocyclic or bicyclic non-aromatic heterocyclyl might be substituted on one or more of the carbon atoms with in total 1, 2 or 3 substituents each independently selected from the group consisting of —OH, CN, halo, $R^7$, —O—$R^7$, —S$(=O)_2$—$R^7$, —C$(=O)$—$R^7$, —NR$^{6c}$R$^{6d}$, and —C$(=O)$—NR$^{6a}$R$^{6b}$;

wherein said monocyclic or bicyclic non-aromatic heterocyclyl might be substituted on the nitrogen atoms with in total 1 or 2 substituents each independently selected from the group consisting of $R^7$, —S$(=O)_2$—$R^7$, —C$(=O)$—$R^7$, and —C$(=O)$—NR$^{6a}$R$^{6b}$;

each $R^7$ independently represents $C_{3-6}$cycloalkyl optionally substituted with 1, 2 or 3 substituents each independently selected from the group consisting of halo, —OH, —O—$C_{1-4}$alkyl and cyano; or $C_{1-4}$alkyl optionally substituted with 1, 2 or 3 substituents each independently selected from the group consisting of halo, —OH, —O—$C_{1-4}$alkyl and cyano;

$Het^e$ represents monocyclic 5-membered aromatic heterocyclyl containing 1 N-atom and optionally 1 or 2 additional heteroatoms each independently selected from the group consisting of N, O, S; wherein said optional S-atom might be substituted to form $S(=O)$, $S(=O)_2$, or $S(=O)(=NR^x)$; wherein said monocyclic 5-membered aromatic heterocyclyl is optionally substituted with one substituent selected from the group consisting of $Het^f$, and $C_{1-4}$alkyl optionally substituted with one $Het^f$;

$Het^f$ represents a monocyclic 4-, 5-, 6- or 7-membered non-aromatic heterocyclyl containing 1, 2 or 3 heteroatoms each independently selected from the group consisting of N, O, S; wherein said S-atom might be substituted to form $S(=O)$, $S(=O)_2$, or $S(=O)(=NR^x)$; wherein said monocyclic non-aromatic heterocyclyl is optionally substituted with one $C_{1-4}$alkyl;

$Het^g$ represents a monocyclic 4-, 5-, 6- or 7-membered non-aromatic heterocyclyl containing 1, 2 or 3 heteroatoms each independently selected from the group consisting of N, O, S; wherein said S-atom might be substituted to form $S(=O)$, $S(=O)_2$, or $S(=O)(=NR^x)$; wherein said monocyclic non-aromatic heterocyclyl is optionally substituted with one substituent selected from the group consisting of oxo, $Het^f$, and $C_{1-4}$alkyl optionally substituted with one $Het^f$;

each $R^x$ independently represents hydrogen or $C_{1-4}$alkyl;

and the pharmaceutically acceptable addition salts, the N-oxides, and the solvates thereof.

The present invention also relates to a pharmaceutical composition comprising a therapeutically effective amount of a compound of Formula (I), a pharmaceutically acceptable addition salt, an N-oxide, or a solvate thereof, and a pharmaceutically acceptable carrier or excipient.

Additionally, the invention relates to a compound of Formula (I), a pharmaceutically acceptable addition salt, an N-oxide, or a solvate thereof, for use as a medicament, and to a compound of Formula (I), a pharmaceutically acceptable addition salt, an N-oxide or a solvate thereof, for use in the treatment or in the prevention of cancer.

In a particular embodiment, the invention relates to a compound of Formula (I), a pharmaceutically acceptable addition salt, an N-oxide, or a solvate thereof, for use in the treatment or in the prevention of cancer.

The invention also relates to the use of a compound of Formula (I), a pharmaceutically acceptable addition salt, an N-oxide, or a solvate thereof, in combination with an additional pharmaceutical agent for use in the treatment or prevention of cancer.

Furthermore, the invention relates to a process for preparing a pharmaceutical composition according to the invention, characterized in that a pharmaceutically acceptable carrier is intimately mixed with a therapeutically effective amount of a compound of Formula (I), a pharmaceutically acceptable addition salt, an N-oxide, or a solvate thereof. The invention also relates to a product comprising a compound of Formula (I), a pharmaceutically acceptable addition salt, an N-oxide, or a solvate thereof, and an additional pharmaceutical agent, as a combined preparation for simultaneous, separate or sequential use in the treatment or prevention of cancer.

Additionally, the invention relates to a method of treating or preventing a cell proliferative disease in a warm-blooded animal which comprises administering to the said animal an effective amount of a compound of Formula (I), a pharmaceutically acceptable addition salt, an N-oxide, or a solvate thereof, as defined herein, or a pharmaceutical composition or combination as defined herein.

DETAILED DESCRIPTION OF THE INVENTION

The term 'halo' or 'halogen' as used herein represents fluoro, chloro, bromo and iodo.

The prefix '$C_{x-y}$' (where x and y are integers) as used herein refers to the number of carbon atoms in a given group. Thus, a $C_{1-6}$alkyl group contains from 1 to 6 carbon atoms, and so on.

The term '$C_{1-4}$alkyl' as used herein as a group or part of a group represents a straight or branched chain fully saturated hydrocarbon radical having from 1 to 4 carbon atoms, such as methyl, ethyl, n-propyl, isopropyl, n-butyl, s-butyl, t-butyl and the like.

The term '$C_{3-6}$cycloalkyl' as used herein as a group or part of a group defines a fully saturated, cyclic hydrocarbon radical having from 3 to 6 carbon atoms, such as cyclopropyl, cyclobutyl, cyclopentyl and cyclohexyl.

It will be clear for the skilled person that $S(=O)_2$ or $SO_2$ represents a sulfonyl moiety.

It will be clear for the skilled person that CO or C(=O) represents a carbonyl moiety.

In general, whenever the term 'substituted' is used in the present invention, it is meant, unless otherwise indicated or clear from the context, to indicate that one or more hydrogens, in particular from 1 to 4 hydrogens, more in particular from 1 to 3 hydrogens, preferably 1 or 2 hydrogens, more preferably 1 hydrogen, on the atom or radical indicated in the expression using 'substituted' are replaced with a selection from the indicated group, provided that the normal valency is not exceeded, and that the substitution results in a chemically stable compound, i.e. a compound that is sufficiently robust to survive isolation to a useful degree of purity from a reaction mixture.

Combinations of substituents and/or variables are permissible only if such combinations result in chemically stable compounds. 'Stable compound' is meant to indicate a compound that is sufficiently robust to survive isolation to a useful degree of purity from a reaction mixture.

The skilled person will understand that the term 'optionally substituted' means that the atom or radical indicated in the expression using 'optionally substituted' may or may not be substituted (this means substituted or unsubstituted respectively).

When two or more substituents are present on a moiety they may, where possible and unless otherwise indicated or clear from the context, replace hydrogens on the same atom or they may replace hydrogen atoms on different atoms in the moiety.

It will be clear for the skilled person that, unless otherwise is indicated or is clear from the context, a substituent on a heterocyclyl group may replace any hydrogen atom on a ring carbon atom or on a ring heteroatom (e.g. a hydrogen on a nitrogen atom may be replaced by a substituent).

A 'non-aromatic' group (e.g. a 'monocyclic non-aromatic heterocyclyl') embraces unsaturated ring systems without aromatic character, partially saturated and fully saturated carbocyclic and heterocyclic ring systems. The term 'partially saturated' refers to rings wherein the ring structure(s) contain(s) at least one multiple bond e.g. a C=C, N=C bond. The term 'fully saturated' refers to rings where there are no multiple bonds between ring atoms.

Unless otherwise specified or clear from the context, aromatic, non-aromatic or fully saturated heterocyclyl groups, can be attached to the remainder of the molecule of Formula (I) through any available ring carbon atom (carbon linked) or nitrogen atom (nitrogen linked).

Unless otherwise specified or clear from the context, aromatic, non-aromatic or fully saturated heterocyclyl groups, may optionally be substituted, where possible, on carbon and/or nitrogen atoms according to the embodiments.

The term 'monocyclic 4-, 5-, 6- or 7-membered non-aromatic heterocyclyl containing 1, 2 or 3 hetereoatoms each independently selected from the group consisting of N, O and S' as used herein alone or as part of another group, defines a monocyclic non-aromatic, cyclic hydrocarbon radical containing at least one nitrogen, oxygen or sulphur atom having from 4 to 7 ring members, as defined above. Non-limiting examples are:

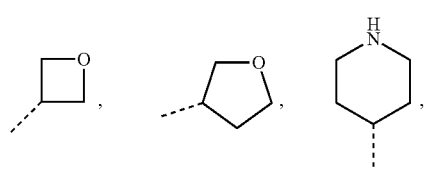

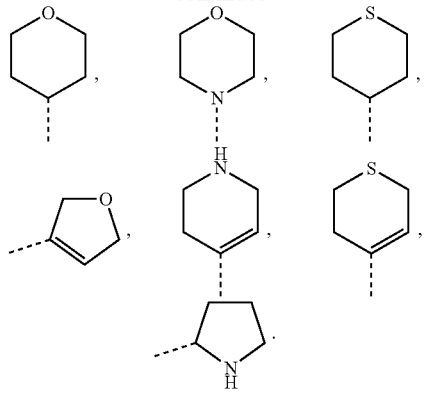

Within the context of this invention, bicyclic fully saturated heterocyclyl groups include fused, spiro and bridged saturated heterocycles.

Fused bicyclic groups are two cycles that share two atoms and the bond between these atoms.

Spiro bicyclic groups are two cycles that are joined at a single atom.

Bridged bicyclic groups are two cycles that share more than two atoms.

As defined in the scope, when $R^{1b}$ and $R^{4b}$ are taken together, $R^{4a}$ represents hydrogen. This means that the nitrogen atom to which $R^{4a}$ is attached, always has a hydrogen atom and is not substituted, nor is a double bond attached to said nitrogen atom. Therefore, non-limiting examples of $R^{1b}$ and $R^{4b}$ taken together to form a monocyclic 5-membered aromatic heterocyclyl containing 1 N-atom and optionally 1 or 2 additional heteroatoms each independently selected from the group consisting of N O, S, include but are not limited to

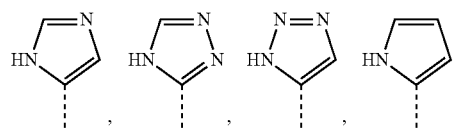

Therefore, non-limiting examples of $R^{1b}$ and $R^{4b}$ taken together to form a monocyclic 4-, 5-, 6- or 7-membered fully saturated heterocyclyl containing 1 N-atom and optionally 1 or 2 additional heteroatoms each independently selected from the group consisting of N, O, S, include, but are not limited to:

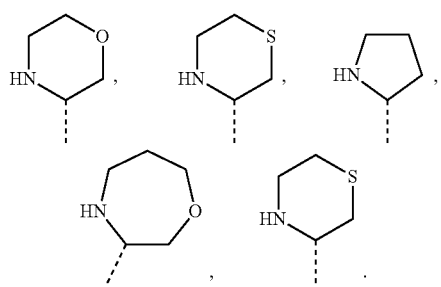

Therefore, non-limiting examples of $R^{1b}$ and $R^{4b}$ taken together to form a bicyclic 6- to 12-membered aromatic heterocyclyl containing 1 N-atom and optionally 1 or 2 additional heteroatoms each independently selected from the group consisting of N, O, S, include, but are not limited to

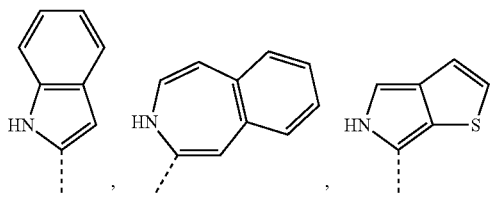

Therefore, non-limiting examples of $R^{1b}$ and $R^{4b}$ taken together to form a bicyclic 6- to 12-membered fully saturated heterocyclyl containing 1 N-atom and optionally 1 or 2 additional heteroatoms each independently selected from the group consisting of N, O, S, include, but are not limited to

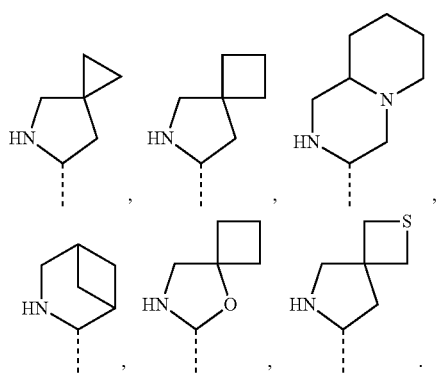

Non-limiting examples of $R^{4a}$ and $R^{4b}$ taken together to form together with the N-atom to which they are attached a monocyclic 5-membered aromatic heterocyclyl containing 1 N-atom and optionally 1 or 2 additional heteroatoms each independently selected from the group consisting of N, O, S, include, but are not limited to

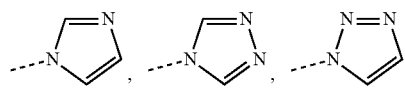

Non-limiting examples of $R^{4a}$ and $R^{4b}$ taken together to form together with the N-atom to which they are attached a monocyclic 4-, 5-, 6- or 7-membered fully saturated heterocyclyl containing 1 N-atom and optionally 1 or 2 additional heteroatoms each independently selected from the group consisting of N, O, S, include, but are not limited to:

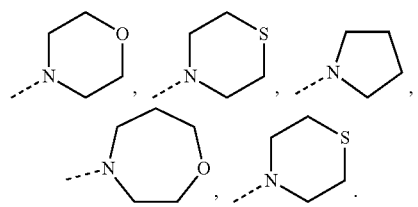

Non-limiting examples of $R^{4a}$ and $R^{4b}$ taken together to form together with the N-atom to which they are attached a bicyclic 6- to 12-membered aromatic heterocyclyl containing 1 N-atom and optionally 1 or 2 additional heteroatoms each independently selected from the group consisting of N, O, S, include, but are not limited to

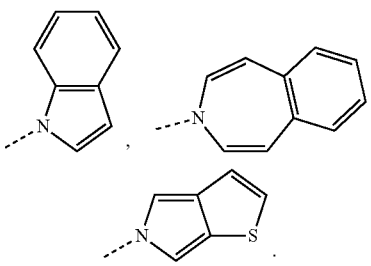

Non-limiting examples of $R^{4a}$ and $R^{4b}$ taken together to form together with the N-atom to which they are attached a bicyclic 6- to 12-membered fully saturated heterocyclyl containing 1 N-atom and optionally 1 or 2 additional heteroatoms each independently selected from the group consisting of N, O, S, include, but are not limited to

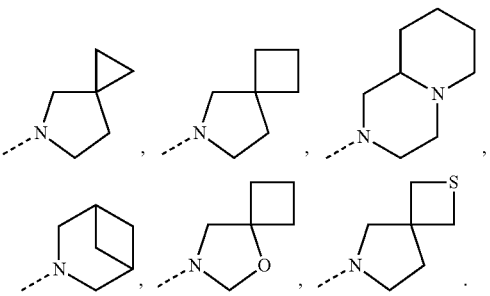

Non-limiting examples of carbon linked monocyclic 5-, 6- or 7-membered aromatic heterocyclyl containing 1, 2 or 3 hetereoatoms each independently selected from the group consisting of N, O and S, include, but are not limited to

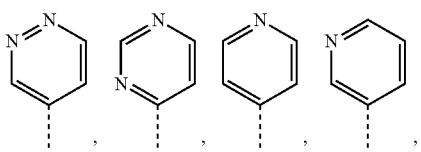

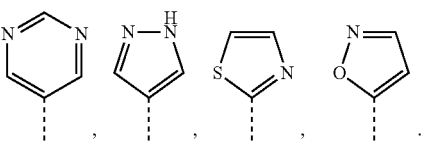

Non-limiting examples of carbon linked bicyclic 6- to 12-membered aromatic heterocyclyl containing 1, 2 or 3 hetereoatoms each independently selected from the group consisting of N, O and S, include, but are not limited to

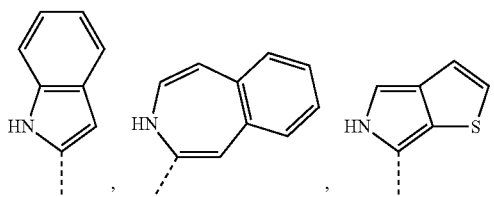

The term 'bicyclic 6- to 12-membered non-aromatic heterocyclyl containing 1, 2 or 3 heteroatoms each independently selected from the group consisting of N, O and S' as used herein alone or as part of another group, defines a bicyclic non-aromatic, cyclic hydrocarbon radical containing at least one nitrogen, oxygen or sulphur atom having from 6 to 12 ring members, as defined above. Non-limiting examples are:

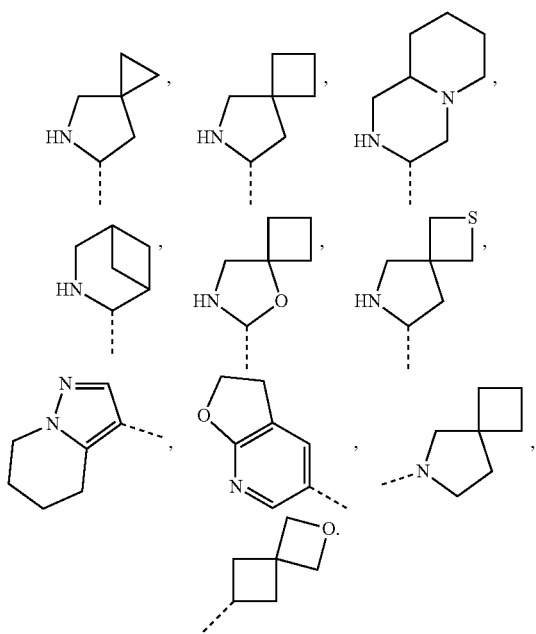

Non-limiting examples of monocyclic 4-, 5-, 6- or 7-membered fully saturated heterocyclyl containing 1, 2 or 3 heteroatoms each independently selected from the group consisting of N, O, S, include, but are not limited to:

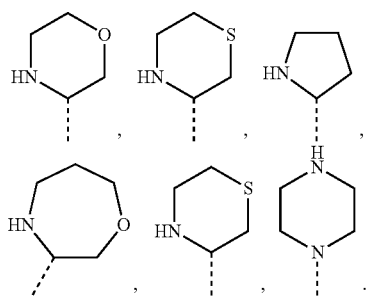

Non-limiting examples of $C_{3-6}$cycloalkyl wherein one carbon atom is replaced by an heteroatom selected from nitrogen, oxygen and sulfur, include, but are not limited to:

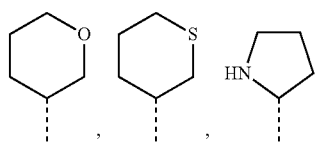

Non-limiting examples of a monocyclic 5-membered aromatic heterocyclyl containing 1 N-atom and optionally 1 or 2 additional heteroatoms each independently selected from the group consisting of N, O, S, include, but are not limite to:

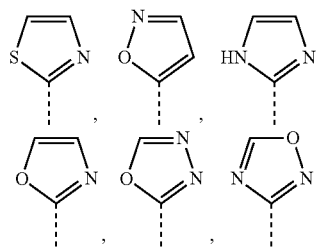

When any variable occurs more than one time in any constituent, each definition is independent.

When any variable occurs more than one time in any formula (e.g. Formula (I)), each definition is independent.

The term "subject" as used herein, refers to an animal, preferably a mammal (e.g. cat, dog, primate or human), more preferably a human, who is or has been the object of treatment, observation or experiment.

The term "therapeutically effective amount" as used herein, means that amount of active compound or pharmaceutical agent that elicits the biological or medicinal response in a tissue system, animal or human that is being sought by a researcher, veterinarian, medicinal doctor or other clinician, which includes alleviation or reversal of the symptoms of the disease or disorder being treated.

The term "composition" is intended to encompass a product comprising the specified ingredients in the specified amounts, as well as any product which results, directly or indirectly, from combinations of the specified ingredients in the specified amounts.

The term "treatment", as used herein, is intended to refer to all processes wherein there may be a slowing, interrupting, arresting or stopping of the progression of a disease, but does not necessarily indicate a total elimination of all symptoms.

The term "compound(s) of the (present) invention" or "compound(s) according to the (present) invention" as used herein, is meant to include the compounds of Formula (I) and the pharmaceutically acceptable addition salts, the N-oxides, and the solvates thereof.

As used herein, any chemical formula with bonds shown only as solid lines and not as solid wedged or hashed wedged bonds, or otherwise indicated as having a particular configuration (e.g. R, S) around one or more atoms, contemplates each possible stereoisomer, or mixture of two or more stereoisomers.

Hereinbefore and hereinafter, the term "compound(s) of Formula (I)" is meant to include the tautomers thereof and the stereoisomeric forms thereof.

The terms "stereoisomers", "stereoisomeric forms" or "stereochemically isomeric forms" hereinbefore or hereinafter are used interchangeably.

The invention includes all stereoisomers of the compounds of the invention either as a pure stereoisomer or as a mixture of two or more stereoisomers.

Enantiomers are stereoisomers that are non-superimposable mirror images of each other. A 1:1 mixture of a pair of enantiomers is a racemate or racemic mixture.

Atropisomers (or atropoisomers) are stereoisomers which have a particular spatial configuration, resulting from a restricted rotation about a single bond, due to large steric hindrance. All atropisomeric forms of the compounds of Formula (I) are intended to be included within the scope of the present invention.

Diastereomers (or diastereoisomers) are stereoisomers that are not enantiomers, i.e. they are not related as mirror images. If a compound contains a double bond, the substituents may be in the E or the Z configuration.

Substituents on bivalent cyclic saturated or partially saturated radicals may have either the cis- or trans-configuration; for example if a compound contains a disubstituted cycloalkyl group, the substituents may be in the cis or trans configuration.

Therefore, the invention includes enantiomers, atropisomers, diastereomers, racemates, E isomers, Z isomers, cis isomers, trans isomers and mixtures thereof, whenever chemically possible.

The meaning of all those terms, i.e. enantiomers, atropisomers, diastereomers, racemates, E isomers, Z isomers, cis isomers, trans isomers and mixtures thereof are known to the skilled person.

The absolute configuration is specified according to the Cahn-Ingold-Prelog system.

The configuration at an asymmetric atom is specified by either R or S. Resolved stereoisomers whose absolute configuration is not known can be designated by (+) or (−) depending on the direction in which they rotate plane polarized light. For instance, resolved enantiomers whose absolute configuration is not known can be designated by (+) or (−) depending on the direction in which they rotate plane polarized light.

When a specific stereoisomer is identified, this means that said stereoisomer is substantially free, i.e. associated with less than 50%, preferably less than 20%, more preferably less than 10%, even more preferably less than 5%, in particular less than 2% and most preferably less than 1%, of the other stereoisomers. Thus, when a compound of Formula (I) is for instance specified as (R), this means that the compound is substantially free of the (S) isomer; when a compound of Formula (I) is for instance specified as E, this means that the compound is substantially free of the Z isomer; when a compound of Formula (I) is for instance specified as cis, this means that the compound is substantially free of the trans isomer.

The stereochemical configuration for centers in some compounds may be designated "R" or "S" when the mixture(s) was separated; for some compounds, the stereochemical configuration at indicated centers has been designated as "R*" or "S*" when the absolute stereochemistry is undetermined (even if the bonds are drawn stereo specifically) although the compound itself has been isolated as a single stereoisomer and is enantiomerically pure.

For example, it will be clear that Compound 31a

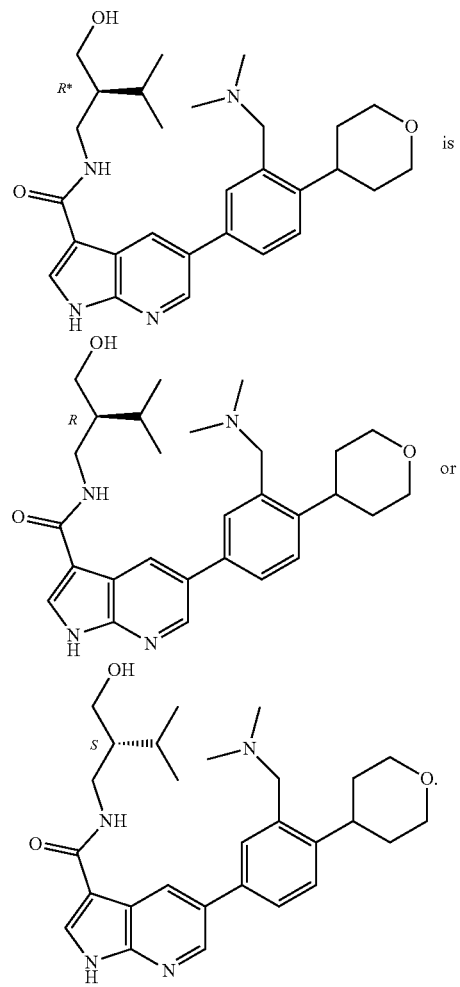

is or

Pharmaceutically acceptable addition salts include acid addition salts and base addition salts. Such salts may be formed by conventional means, for example by reaction of a free acid or a free base form with one or more equivalents of an appropriate base or acid, optionally in a solvent, or in a medium in which the salt is insoluble, followed by removal of said solvent, or said medium, using standard techniques (e.g. in vacuo, by freeze-drying or by filtration). Salts may also be prepared by exchanging a counter-ion of a compound of the invention in the form of a salt with another counter-ion, for example using a suitable ion exchange resin.

The pharmaceutically acceptable addition salts as mentioned hereinabove or hereinafter are meant to comprise the therapeutically active non-toxic acid and base salt forms which the compounds of Formula (I), N-oxides and solvates thereof, are able to form.

Appropriate acids comprise, for example, inorganic acids such as hydrohalic acids, e.g. hydrochloric or hydrobromic acid, sulfuric, nitric, phosphoric and the like acids; or organic acids such as, for example, acetic, propanoic, hydroxyacetic, lactic, pyruvic, oxalic (i.e. ethanedioic), malonic, succinic (i.e. butanedioic acid), maleic, fumaric, malic, tartaric, citric, methanesulfonic, ethanesulfonic, benzenesulfonic, p-toluenesulfonic, cyclamic, salicylic, p-aminosalicylic, pamoic and the like acids.

Conversely said salt forms can be converted by treatment with an appropriate base into the free base form.

The compounds of Formula (I) and solvates thereof containing an acidic proton may also be converted into their non-toxic metal or amine salt forms by treatment with appropriate organic and inorganic bases.

Appropriate base salt forms comprise, for example, the ammonium salts, the alkali and earth alkaline metal salts, e.g. the lithium, sodium, potassium, cesium, magnesium, calcium salts and the like, salts with organic bases, e.g. primary, secondary and tertiary aliphatic and aromatic amines such as methylamine, ethylamine, propylamine, isopropylamine, the four butylamine isomers, dimethylamine, diethylamine, diethanolamine, dipropylamine, diisopropylamine, di-n-butylamine, pyrrolidine, piperidine, morpholine, trimethylamine, triethylamine, tripropylamine, quinuclidine, pyridine, quinoline and isoquinoline; the benzathine, N-methyl-D-glucamine, hydrabamine salts, and salts with amino acids such as, for example, arginine, lysine and the like. Conversely the salt form can be converted by treatment with acid into the free acid form.

The term solvate comprises the solvent addition forms as well as the salts thereof, which the compounds of Formula (I) are able to form. Examples of such solvent addition forms are e.g. hydrates, alcoholates and the like.

The compounds of the invention as prepared in the processes described below may be synthesized in the form of mixtures of enantiomers, in particular racemic mixtures of enantiomers, that can be separated from one another following art-known resolution procedures. A manner of separating the enantiomeric forms of the compounds of Formula (I), and pharmaceutically acceptable addition salts, N-oxides and solvates thereof, involves liquid chromatography using a chiral stationary phase. Said pure stereochemically isomeric forms may also be derived from the corresponding pure stereochemically isomeric forms of the appropriate starting materials, provided that the reaction occurs stereospecifically. Preferably if a specific stereoisomer is desired, said compound would be synthesized by stereospecific methods of preparation. These methods will advantageously employ enantiomerically pure starting materials.

The term "enantiomerically pure" as used herein means that the product contains at least 80% by weight of one enantiomer and 20% by weight or less of the other enantiomer. Preferably the product contains at least 90% by weight of one enantiomer and 10% by weight or less of the other enantiomer. In the most preferred embodiment the term "enantiomerically pure" means that the composition contains at least 99% by weight of one enantiomer and 1% or less of the other enantiomer.

The present invention also embraces isotopically-labeled compounds of the present invention which are identical to those recited herein, but for the fact that one or more atoms are replaced by an atom having an atomic mass or mass number different from the atomic mass or mass number usually found in nature (or the most abundant one found in nature).

All isotopes and isotopic mixtures of any particular atom or element as specified herein are contemplated within the scope of the compounds of the invention, either naturally occurring or synthetically produced, either with natural abundance or in an isotopically enriched form. Exemplary isotopes that can be incorporated into compounds of the invention include isotopes of hydrogen, carbon, nitrogen, oxygen, phosphorus, sulfur, fluorine, chlorine and iodine, such as $^{2}H$, $^{3}H$, $^{11}C$, $^{13}C$, $^{14}C$, $^{13}N$, $^{15}O$, $^{17}O$, $^{18}O$, $^{32}P$, $^{33}P$, $^{35}S$, $^{18}F$, $^{36}Cl$, $^{122}I$, $^{123}I$, $^{125}I$, $^{131}I$, $^{75}Br$, $^{76}Br$, $^{77}Br$ and $^{82}Br$. Preferably, the radioactive isotope is selected from the group of $^{2}H$, $^{3}H$, $^{11}C$ and $^{8}F$. More preferably, the radioactive isotope is $^{2}H$. In particular, deuterated compounds are intended to be included within the scope of the present invention.

Certain isotopically-labeled compounds of the present invention (e.g., those labeled with $^{3}H$ and $^{11}C$) may be useful for example in substrate tissue distribution assays. Tritiated ($^{3}H$) and carbon-14 ($^{14}C$) isotopes are useful for their ease of preparation and detectability. Further, substitution with heavier isotopes such as deuterium (i.e., $^{2}H$) may afford certain therapeutic advantages resulting from greater metabolic stability (e.g., increased in vivo half-life or reduced dosage requirements) and hence may be preferred in some circumstances. Positron emitting isotopes such as $^{15}O$, $^{13}N$, $^{11}C$ and $^{18}F$ are useful for positron emission tomography (PET) studies. PET imaging in cancer finds utility in helping locate and identify tumours, stage the disease and determine suitable treatment. Human cancer cells overexpress many receptors or proteins that are potential disease-specific molecular targets. Radiolabelled tracers that bind with high affinity and specificity to such receptors or proteins on tumour cells have great potential for diagnostic imaging and targeted radionuclide therapy (Charron, Carlie L. et al. Tetrahedron Lett. 2016, 57(37), 4119-4127). Additionally, target-specific PET radiotracers may be used as biomarkers to examine and evaluate pathology, by for example, measuring target expression and treatment response (Austin R. et al. Cancer Letters (2016), doi: 10.1016/j.canlet.2016.05.008).

The present invention relates in particular to compounds of Formula (I) as defined herein, and the tautomers and the stereoisomeric forms thereof, wherein the dotted bond towards $R^{1b}$ is absent;

$A^1$ represents CH or N; $A^2$ represents CH; $A^3$ represents CH or N;

provided that only one of $A^1$ and $A^3$ represents N;

$A^4$ represents CH or N; $A^5$ represents N or $CR^{3b}$; $A^6$ represents CH;

$R^{1a}$ represents hydrogen;

$R^{1b}$ represents hydrogen or $CH_3$;

$R^{4a}$ represents hydrogen, $C_{1-4}$alkyl, or $C_{3-6}$cycloalkyl;

$R^{4b}$ represents hydrogen, $C_{1-4}$alkyl, $C_{3-6}$cycloalkyl, or a carbon linked monocyclic 4-, 5-, 6- or 7-membered non-aromatic heterocyclyl containing 1, 2 or 3 heteroatoms each independently selected from the group consisting of N, O, and S; wherein said S-atom might be substituted to form S(=O), S(=O)$_2$, or S(=O)(=NR$^x$);

or $R^{1b}$ and $R^{4b}$ are taken together to form together with the atoms to which they are attached a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$); or a bicyclic 6- to 12-membered fully saturated heterocyclyl containing 1 N-atom and optionally 1 or 2 additional heteroatoms each independently selected from the group consisting of N, O, S; wherein said optional S-atom might be substituted to form S(=O)$_2$, S(=O)$_2$, or S(=O)(=NR$^x$);

wherein said monocyclic or bicyclic, fully saturated heterocyclyl might be substituted on one or more of the carbon atoms with in total 1, 2 or 3 substituents each independently selected from the group consisting of —OH, CN, halo, $R^7$, —O—$R^7$, —S(=O)$_2$—$R^7$, —C(=O)—$R^7$, —N$R^{6c}R^{6d}$, —C(=O)—N$R^{6a}R^{6b}$, and Het$^e$;

wherein said monocyclic or bicyclic, fully saturated heterocyclyl might be substituted on the optional additional nitrogen atoms with in total 1 or 2 substituents each independently selected from the group consisting of $R^7$, —S(=O)$_2$—$R^7$, —C(=O)—$R^7$, —C(=O)—N$R^{6a}R^{6b}$, and Het$^d$;

provided that in case $R^{1b}$ and $R^{4b}$ are taken together, $R^{4a}$ represents hydrogen; and $R^{1a}$ represents hydrogen or $R^{1a}$ is absent when the dotted bond towards $R^{1b}$ is a bond;

or $R^{4a}$ and $R^{4b}$ are taken together to form together with the N-atom to which they are attached a monocyclic 5-, 6- or 7-membered aromatic heterocyclyl or a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O), S(=O)$_2$, or S(=O)(=N$R^x$); or a bicyclic 6- to 12-membered aromatic or fully saturated heterocyclyl containing 1 N-atom and optionally 1 or 2 additional heteroatoms each independently selected from the group consisting of N, O, S; wherein said optional S-atom might be substituted to form S(=O), S(=O)$_2$, or S(=O)(=N$R^x$);

wherein said monocyclic or bicyclic, aromatic or fully saturated heterocyclyl might be substituted on one or more of the carbon atoms with in total 1, 2 or 3 substituents each independently selected from the group consisting of —OH, CN, halo, $R^7$, —O—$R^7$, —S(=O)$_2$—$R^7$, —C(=O)—$R^7$, —N$R^{6c}R^{6d}$, —C(=O)—N$R^{6a}R^{6b}$, and Het$^e$;

wherein said monocyclic or bicyclic, aromatic or fully saturated heterocyclyl might be substituted on the nitrogen atoms with in total 1 or 2 substituents each independently selected from the group consisting of $R^7$, —S(=O)$_2$—$R^7$, —C(=O)—$R^7$, —C(=O)—N$R^{6a}R^{6b}$, and Het$^d$;

in case $R^{4a}$ and $R^{4b}$ are taken together, $R^{1a}$ represents hydrogen, and $R^{1b}$ represents hydrogen;

$R^2$ is selected from the group consisting of cyano; halo; —C(=O)—N$R^{8a}R^{8b}$; —CH$_2$—N$R^{8c}R^{8d}$; Het$^b$; —P(=O)—(C$_{1-4}$alkyl)$_2$; —S(=O)$_2$—C$_{1-4}$alkyl; —S(=O)(=N$R^x$)—C$_{1-4}$alkyl;

C$_{1-6}$alkyl optionally substituted with 1 or 2 substituents each independently selected from the group consisting of halo, —OH, cyano, and —O—C$_{1-4}$alkyl;

C$_{3-6}$cycloalkyl optionally substituted with 1 or 2 substituents each independently selected from the group consisting of halo, —OH, cyano and —O—C$_{1-4}$alkyl; and C$_{3-6}$cycloalkenyl optionally substituted with 1 or 2 substituents each independently selected from the group consisting of halo, —OH, cyano and —O—C$_{1-4}$alkyl;

$R^{3a}$ represents hydrogen, halo, cyano, —N$R^{6e}R^{6f}$, —C(=O)—N$R^{6g}R^{6h}$, or C$_{1-4}$alkyl optionally substituted with one, two or three substituents each independently selected from the group consisting of cyano, halo, CF$_3$, —N$R^{6e}R^{6f}$, and —C(=O)—N$R^{6g}R^{6h}$;

$R^{3b}$ represents hydrogen, halo, cyano, or C$_{1-4}$alkyl optionally substituted by 1, 2 or 3 halo atoms;

$R^{6a}$, $R^{6b}$, $R^{6c}$, and $R^{6d}$ are each independently selected from the group consisting of hydrogen; C$_{3-6}$cycloalkyl optionally substituted with one —O$R^5$; and C$_{1-4}$alkyl optionally substituted with one —O$R^5$, wherein two hydrogen atoms on the same carbon atom of said C$_{1-4}$alkyl might be taken together to form C$_{3-6}$cycloalkyl;

$R^{6e}$, $R^{6f}$, $R^{6g}$, and $R^{6h}$ are each independently selected from the group consisting of hydrogen; —S(=O)$_2$—$R^7$; C$_{3-6}$cycloalkyl optionally substituted with one or two substituents each independently selected from the group consisting of —O$R^5$, Het$^g$, and Het$^e$; and C$_{1-6}$alkyl optionally substituted with one or two substituents each independently selected from the group consisting of —O$R^5$, —N$R^{9a}$—C(=O)—$R^{9b}$, Het$^g$, and Het$^e$, wherein two hydrogen atoms on the same carbon atom of said C$_{1-6}$alkyl might be taken together to form C$_{3-6}$cycloalkyl wherein optionally one carbon atom is replaced by an heteroatom selected from nitrogen, oxygen and sulfur;

$R^5$ represents hydrogen or C$_{1-4}$alkyl;

$R^{8a}$, $R^{8c}$, and $R^{8d}$ are each independently selected from the group consisting of hydrogen;

C$_{1-4}$alkyl optionally substituted with one —OH or —O—C$_{1-4}$alkyl; and C$_{3-6}$cycloalkyl optionally substituted with one —OH or —O—C$_{1-4}$alkyl;

$R^{8b}$ is selected from the group consisting C$_{1-4}$alkyl optionally substituted with one —OH or —O—C$_{1-4}$alkyl; and C$_{3-6}$cycloalkyl optionally substituted with one —OH or —O—C$_{1-4}$alkyl;

or $R^{8a}$ and $R^{8b}$, or $R^{8c}$ and $R^{8d}$ are taken together to form together with the N-atom to which they are attached a monocyclic fully saturated heterocyclyl containing 1 N-atom and optionally 1 or 2 additional heteroatoms each independently selected from the group consisting of N, O, S; wherein said optional S-atom might be substituted to form S(=O), S(=O)$_2$, or S(=O)(=N$R^x$); wherein said monocyclic 4-, 5-, 6- or 7-membered fully saturated heterocyclyl might be substituted on one or more of the carbon atoms with in total 1, 2 or 3 substituents each independently selected from the group consisting of —OH, CN, halo, $R^7$, —O—$R^7$, —S(=O)$_2$—$R^7$, —C(=O)—$R^7$, —N$R^{6c}R^{6d}$, and —C(=O)—N$R^{6a}R^{6b}$;

wherein said monocyclic fully saturated heterocyclyl might be substituted on the nitrogen atoms with in total 1 or 2 substituents each independently selected from the group consisting of $R^7$, —S(=O)$_2$—$R^7$, —C(=O)—$R^7$, and —C(=O)—N$R^{6a}R^{6b}$;

$R^{9a}$ represents hydrogen or C$_{1-4}$alkyl;

$R^{9b}$ represents hydrogen or C$_{1-4}$alkyl optionally substituted with 1, 2 or 3 halo atoms;

each Het$^c$ independently represents a monocyclic 4-, 5-, 6- or 7-membered fully saturated heterocyclyl containing 1, 2 or 3 heteroatoms each independently selected from the group consisting of N, O or S; wherein said S-atom might be substituted to form S(=O), S(=O)$_2$, or S(=O)(=N$R^x$);

each Het$^d$ independently represents a carbon linked monocyclic 4-, 5-, 6- or 7-membered fully saturated heterocyclyl containing 1, 2 or 3 heteroatoms each independently selected from the group consisting of N, O or S; wherein said S-atom might be substituted to form S(=O), S(=O)$_2$, or S(=O)(=N$R^x$);

Het$^b$ represents a monocyclic 4-, 5-, 6- or 7-membered non-aromatic heterocyclyl containing 1, 2 or 3 heteroatoms each independently selected from the group consisting of N, O, S; wherein said S-atom might be substituted to form S(=O), S(=O)$_2$, or S(=O)(=NR$^x$); or a bicyclic 6- to 12-membered non-aromatic heterocyclyl containing 1, 2 or 3 heteroatoms each independently selected from the group consisting of N, O, S; wherein said S-atom might be substituted to form S(=O), S(O)$_2$, or S(=O)(=NR$^x$);

wherein said monocyclic or bicyclic non-aromatic heterocyclyl might be substituted on one or more of the carbon atoms with in total 1, 2 or 3 substituents each independently selected from the group consisting of —OH, CN, halo, R$^7$, —O—R$^7$, —S(=O)$_2$—R$^7$, —C(=O)—R$^7$, —NR$^{6c}$R$^{6d}$, and —C(=O)—NR$^{6a}$R$^{6b}$;

wherein said monocyclic or bicyclic non-aromatic heterocyclyl might be substituted on the nitrogen atoms with in total 1 or 2 substituents each independently selected from the group consisting of R$^7$, —S(=O)$_2$—R$^7$, —C(=O)—R$^7$, and —C(=O)—NR$^{6a}$R$^{6b}$;

each R$^7$ independently represents C$_{3-6}$cycloalkyl optionally substituted with 1, 2 or 3 substituents each independently selected from the group consisting of halo, —OH, —O—C$_{1-4}$alkyl and cyano; or C$_{1-4}$alkyl optionally substituted with 1, 2 or 3 substituents each independently selected from the group consisting of halo, —OH, —O—C$_{1-4}$alkyl and cyano;

Het$^e$ represents monocyclic 5-membered aromatic heterocyclyl containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$); wherein said monocyclic 5-membered aromatic heterocyclyl is optionally substituted with one substituent selected from the group consisting of Het$^f$ and C$_{1-4}$alkyl optionally substituted with one Het$^f$;

Het$^f$ represents a monocyclic 4-, 5-, 6- or 7-membered non-aromatic heterocyclyl containing 1, 2 or 3 heteroatoms each independently selected from the group consisting of N, O, S; wherein said S-atom might be substituted to form S(=O), S(=O)$_2$, or S(=O)(=NR$^x$); wherein said monocyclic non-aromatic heterocyclyl is optionally substituted with one C$_{1-4}$alkyl;

Het$^g$ represents a monocyclic 4-, 5-, 6- or 7-membered non-aromatic heterocyclyl containing 1, 2 or 3 heteroatoms each independently selected from the group consisting of N, O, S; wherein said S-atom might be substituted to form S(=O), S(=O)$_2$, or S(=O)(=NR$^x$); wherein said monocyclic non-aromatic heterocyclyl is optionally substituted with one substituent selected from the group consisting of oxo, Het$^f$, and C$_{1-4}$alkyl optionally substituted with one Het$^f$;

each R$^x$ independently represents hydrogen or C$_{1-4}$alkyl;
and the pharmaceutically acceptable addition salts, the N-oxides, and the solvates thereof.

The present invention relates in particular to compounds of Formula (I) as defined herein, and the tautomers and the stereoisomeric forms thereof, wherein the dotted bond towards R$^{1b}$ is absent;

A$^1$ represents CH or N; A$^2$ represents CH; A$^3$ represents CH or N;
provided that only one of A$^1$ and A$^3$ represents N;
A$^4$ represents CH or N; A$^5$ represents N or CR$^{3b}$; A$^6$ represents CH;
R$^{1a}$ represents hydrogen;

R$^{1b}$ represents hydrogen or CH$_3$;
R$^{4a}$ represents hydrogen, C$_{1-4}$alkyl, or C$_{3-6}$cycloalkyl;
R$^{4b}$ represents hydrogen, C$_{1-4}$alkyl, C$_{3-6}$cycloalkyl, or
a carbon linked monocyclic 4-, 5-, 6- or 7-membered non-aromatic heterocyclyl containing 1, 2 or 3 heteroatoms each independently selected from the group consisting of N, O, and S; wherein said S-atom might be substituted to form S(=O), S(=O)$_2$, or S(=O)(=NR$^x$);
or
R$^{1b}$ and R$^{4b}$ are taken together to form together with the atoms to which they are attached a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$); or a bicyclic 6- to 12-membered fully saturated heterocyclyl containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$);

wherein said monocyclic or bicyclic, fully saturated heterocyclyl might be substituted on one or more of the carbon atoms with in total 1, 2 or 3 substituents each independently selected from the group consisting of —OH, CN, halo, R$^7$, —O—R$^7$, —S(=O)$_2$—R$^7$, —C(=O)—R$^7$, —NR$^{6c}$R$^{6d}$, —C(=O)—NR$^{6a}$R$^{6b}$, and Het$^c$;

wherein said monocyclic or bicyclic, fully saturated heterocyclyl might be substituted on the optional additional nitrogen atoms with in total 1 or 2 substituents each independently selected from the group consisting of R$^7$, —S(=O)$_2$—R$^7$, —C(=O)—R$^7$, —C(=O)—NR$^{6a}$R$^{6b}$, and Het$^d$;

provided that in case R$^{1b}$ and R$^{4b}$ are taken together, R$^{4a}$ represents hydrogen; and
R$^{1a}$ represents hydrogen or R$^{1a}$ is absent when the dotted bond towards R$^{1b}$ is a bond;
or
R$^{4a}$ and R$^{4b}$ are taken together to form together with the N-atom to which they are attached a monocyclic 5-, 6- or 7-membered aromatic heterocyclyl or a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$); or
a bicyclic 6- to 12-membered aromatic or fully saturated heterocyclyl containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$);

wherein said monocyclic or bicyclic, aromatic or fully saturated heterocyclyl might be substituted on one or more of the carbon atoms with in total 1, 2 or 3 substituents each independently selected from the group consisting of —OH, CN, halo, R$^7$, —O—R$^7$, —S(=O)$_2$—R$^7$, —C(=O)—R$^7$, —NR$^{6c}$R$^{6d}$, —C(=O)—NR$^{6a}$R$^{6b}$, and Het$^c$;

wherein said monocyclic or bicyclic, aromatic or fully saturated heterocyclyl might be substituted on the nitrogen atoms with in total 1 or 2 substituents each independently selected from the group consisting of $R^7$, $-S(=O)_2-R^7$, $-C(=O)-R^7$, $-C(=O)-NR^{6a}R^{6b}$, and $Het^d$;

in case $R^{4a}$ and $R^{4b}$ are taken together, $R^{1a}$ represents hydrogen, and $R^{1b}$ represents hydrogen;

$R^2$ represents $Het^b$;

$R^{3a}$ represents hydrogen, halo, cyano, $-NR^{6e}R^{6f}$, $-C(=O)-NR^{6g}R^{6h}$, or $C_{1-4}$alkyl optionally substituted with one, two or three substituents each independently selected from the group consisting of cyano, halo, $CF_3$, $-NR^{6e}R^{6f}$, and $-C(=O)-NR^{6a}R^{6b}$;

$R^{3b}$ represents hydrogen, halo, cyano, or $C_{1-4}$alkyl optionally substituted by 1, 2 or 3 halo atoms;

$R^{6a}$, $R^{6b}$, $R^{6c}$, and $R^{6d}$ are each independently selected from the group consisting of hydrogen; $C_{3-6}$cycloalkyl optionally substituted with one $-OR^5$; and $C_{1-4}$alkyl optionally substituted with one $-OR^5$, wherein two hydrogen atoms on the same carbon atom of said $C_{1-4}$alkyl might be taken together to form $C_{3-6}$cycloalkyl;

$R^{6e}$, $R^{6f}$, $R^{6g}$, and $R^{6h}$ are each independently selected from the group consisting of hydrogen; $-S(=O)_2-R^7$; $C_{3-6}$cycloalkyl optionally substituted with one or two substituents each independently selected from the group consisting of $-OR^5$, $Het^g$, and $Het^e$; and $C_{1-6}$alkyl optionally substituted with one or two substituents each independently selected from the group consisting of $-OR^5$, $-NR^{9a}-C(=O)-R^{9b}$, $Het^g$, and $Het^e$, wherein two hydrogen atoms on the same carbon atom of said $C_{1-6}$alkyl might be taken together to form $C_{3-6}$cycloalkyl wherein optionally one carbon atom is replaced by an heteroatom selected from nitrogen, oxygen and sulfur;

$R^5$ represents hydrogen or $C_{1-4}$alkyl;

$R^{8a}$, $R^{8c}$, and $R^{8d}$ are each independently selected from the group consisting of hydrogen;

$C_{1-4}$alkyl optionally substituted with one $-OH$ or $-O-C_{1-4}$alkyl; and $C_{3-6}$cycloalkyl optionally substituted with one $-OH$ or $-O-C_{1-4}$alkyl;

$R^{8b}$ is selected from the group consisting $C_{1-4}$alkyl optionally substituted with one $-OH$ or $-O-C_{1-4}$alkyl; and $C_{3-6}$cycloalkyl optionally substituted with one $-OH$ or $-O-C_{1-4}$alkyl;

or $R^{8a}$ and $R^{8b}$, or $R^{8c}$ and $R^{8d}$ are taken together to form together with the N-atom to which they are attached a monocyclic fully saturated heterocyclyl containing 1 N-atom and optionally 1 or 2 additional heteroatoms each independently selected from the group consisting of N, O, S; wherein said optional S-atom might be substituted to form $S(=O)$, $S(=O)_2$, or $S(=O)(=NR^x)$; wherein said monocyclic 4-, 5-, 6- or 7-membered fully saturated heterocyclyl might be substituted on one or more of the carbon atoms with in total 1, 2 or 3 substituents each independently selected from the group consisting of $-OH$, CN, halo, $R^7$, $-O-R^7$, $-S(=O)_2-R^7$, $-C(=O)-R^7$, $-NR^{6c}R^{6d}$, and $-C(=O)-NR^{6a}R^{6b}$;

wherein said monocyclic fully saturated heterocyclyl might be substituted on the nitrogen atoms with in total 1 or 2 substituents each independently selected from the group consisting of $R^7$, $-S(=O)_2-R^7$, $-C(=O)-R^7$, and $-C(=O)-NR^{6a}R^{6b}$;

$R^{9a}$ represents hydrogen or $C_{1-4}$alkyl;

$R^{9b}$ represents hydrogen or $C_{1-4}$alkyl optionally substituted with 1, 2 or 3 halo atoms; each $Het^c$ independently represents a monocyclic 4-, 5-, 6- or 7-membered fully saturated heterocyclyl containing 1, 2 or 3 heteroatoms each independently selected from the group consisting of N, O or S; wherein said S-atom might be substituted to form $S(=O)$, $S(=O)_2$, or $S(=O)(=NR^x)$;

each $Het^d$ independently represents a carbon linked monocyclic 4-, 5-, 6- or 7-membered fully saturated heterocyclyl containing 1, 2 or 3 heteroatoms each independently selected from the group consisting of N, O or S; wherein said S-atom might be substituted to form $S(=O)$, $S(=O)_2$, or $S(=O)(=NR^x)$;

$Het^b$ represents a carbon linked monocyclic 4-, 5-, 6- or 7-membered non-aromatic heterocyclyl containing 1, 2 or 3 heteroatoms each independently selected from the group consisting of N, O, S; wherein said S-atom might be substituted to form $S(=O)$, $S(=O)_2$, or $S(=O)(=NR^x)$; or a carbon linked bicyclic 6- to 12-membered non-aromatic heterocyclyl containing 1, 2 or 3 heteroatoms each independently selected from the group consisting of N, O, S; wherein said S-atom might be substituted to form $S(=O)$, $S(=O)_2$, or $S(=O)(=NR^x)$; wherein said monocyclic or bicyclic non-aromatic heterocyclyl might be substituted on one or more of the carbon atoms with in total 1, 2 or 3 substituents each independently selected from the group consisting of $-OH$, CN, halo, $R^7$, $-O-R^7$, $-S(=O)_2-R^7$, $-C(=O)-R^7$, $-NR^{6c}R^{6d}$, and $-C(=O)-NR^{6a}R^{6b}$;

wherein said monocyclic or bicyclic non-aromatic heterocyclyl might be substituted on the nitrogen atoms with in total 1 or 2 substituents each independently selected from the group consisting of $R^7$, $-S(=O)_2-R^7$, $-C(=O)-R^7$, and $-C(=O)-NR^{6a}R^{6b}$;

each $R^7$ independently represents $C_{3-6}$cycloalkyl optionally substituted with 1, 2 or 3 substituents each independently selected from the group consisting of halo, $-OH$, $-O-C_{1-4}$alkyl and cyano; or $C_{1-4}$alkyl optionally substituted with 1, 2 or 3 substituents each independently selected from the group consisting of halo, $-OH$, $-O-C_{1-4}$alkyl and cyano;

$Het^e$ represents monocyclic 5-membered aromatic heterocyclyl containing 1 N-atom and optionally 1 or 2 additional heteroatoms each independently selected from the group consisting of N, O, S; wherein said optional S-atom might be substituted to form $S(=O)$, $S(=O)_2$, or $S(=O)(=NR^x)$; wherein said monocyclic 5-membered aromatic heterocyclyl is optionally substituted with one substituent selected from the group consisting of $Het^f$, and $C_{1-4}$alkyl optionally substituted with one $Het^f$;

$Het^f$ represents a monocyclic 4-, 5-, 6- or 7-membered non-aromatic heterocyclyl containing 1, 2 or 3 heteroatoms each independently selected from the group consisting of N, O, S; wherein said S-atom might be substituted to form $S(=O)$, $S(=O)_2$, or $S(=O)(=NR^x)$; wherein said monocyclic non-aromatic heterocyclyl is optionally substituted with one $C_{1-4}$alkyl;

$Het^g$ represents a monocyclic 4-, 5-, 6- or 7-membered non-aromatic heterocyclyl containing 1, 2 or 3 heteroatoms each independently selected from the group consisting of N, O, S; wherein said S-atom might be substituted to form $S(=O)$, $S(=O)_2$, or $S(=O)(=NR^x)$; wherein said monocyclic non-aromatic heterocyclyl is optionally substituted with one substituent selected from the group consisting of oxo, Het$^f$, and C$_{1-4}$alkyl optionally substituted with one Het$^f$;

each R$^7$ independently represents hydrogen or C$_{1-4}$alkyl;

and the pharmaceutically acceptable addition salts, the N-oxides, and the solvates thereof.

The present invention relates in particular to compounds of Formula (I) as defined herein, and the tautomers and the stereoisomeric forms thereof, wherein the dotted bond towards R$^{1b}$ is absent;

A$^1$ represents CH or N; A$^2$ represents CH; A$^3$ represents CH or N;

provided that only one of A$^1$ and A$^3$ represents N;

A$^4$ represents CH or N; A$^5$ represents N or CR$^{3b}$; A$^6$ represents CH;

R$^{1a}$ represents hydrogen;

R$^{1b}$ represents hydrogen or CH$_3$;

R$^{4a}$ represents hydrogen, C$_{1-4}$alkyl, or C$_{3-6}$cycloalkyl;

R$^{4b}$ represents hydrogen, C$_{1-4}$alkyl, C$_{3-6}$cycloalkyl, or a carbon linked monocyclic 4-, 5-, 6- or 7-membered non-aromatic heterocyclyl containing 1, 2 or 3 heteroatoms each independently selected from the group consisting of N, O, and S; wherein said S-atom might be substituted to form S(=O), S(=O)$_2$, or S(=O)(=NR$^x$);

or

R$^{1b}$ and R$^{4b}$ are taken together to form together with the atoms to which they are attached a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$); or a bicyclic 6- to 12-membered fully saturated heterocyclyl containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$);

wherein said monocyclic or bicyclic, fully saturated heterocyclyl might be substituted on one or more of the carbon atoms with in total 1, 2 or 3 substituents each independently selected from the group consisting of —OH, CN, halo, R$^7$, —O—R$^7$, —S(=O)$_2$—R$^7$, —C(=O)—R$^7$, —NR$^{6c}$R$^{6d}$, and —C(=O)—NR$^{6a}$R$^{6b}$;

wherein said monocyclic or bicyclic, fully saturated heterocyclyl might be substituted on the optional additional nitrogen atoms with in total 1 or 2 substituents each independently selected from the group consisting of R$^7$, —S(=O)$_2$—R$^7$, —C(=O)—R$^7$, and —C(=O)—NR$^{6a}$R$^{6b}$;

provided that in case R$^{1b}$ and R$^{4b}$ are taken together, R$^{4a}$ represents hydrogen; and R$^{1a}$ represents hydrogen or R$^{1a}$ is absent when the dotted bond towards R$^{1b}$ is a bond;

R$^2$ is selected from the group consisting of cyano; halo; —C(=O)—NR$^{8a}$R$^{8b}$; —CH$_2$—NR$^{8c}$R$^{8d}$; Het$^b$; —P(=O)—(C$_{1-4}$alkyl)$_2$; —S(=O)$_2$—C$_{1-4}$alkyl; —S(=O)(=NR$^x$)—C$_{1-4}$alkyl;

C$_{1-6}$alkyl optionally substituted with 1 or 2 substituents each independently selected from the group consisting of halo, —OH, cyano, and —O—C$_{1-4}$alkyl;

C$_{3-6}$cycloalkyl optionally substituted with 1 or 2 substituents each independently selected from the group consisting of halo, —OH, cyano and —O—C$_{1-4}$alkyl; and C$_{3-6}$cycloalkenyl optionally substituted with 1 or 2 substituents each independently selected from the group consisting of halo, —OH, cyano and —O—C$_{1-4}$alkyl;

R$^{3a}$ represents hydrogen, halo, cyano, —NR$^{6e}$R$^{6f}$, —C(=O)—NR$^{6g}$R$^{6h}$, or C$_{1-4}$alkyl optionally substituted with one, two or three substituents each independently selected from the group consisting of cyano, halo, CF$_3$, —NR$^{6e}$R$^{6f}$, and —C(=O)—NR$^{6g}$R$^{6h}$;

R$^{3b}$ represents hydrogen, halo, cyano, or C$_{1-4}$alkyl optionally substituted by 1, 2 or 3 halo atoms;

R$^{6a}$, R$^{6b}$, R$^{6c}$, and R$^{6d}$ are each independently selected from the group consisting of hydrogen; C$_{3-6}$cycloalkyl optionally substituted with one —OR$^5$; and C$_{1-4}$alkyl optionally substituted with one —OR$^5$, wherein two hydrogen atoms on the same carbon atom of said C$_{1-4}$alkyl might be taken together to form C$_{3-6}$cycloalkyl;

R$^{6e}$, R$^{6f}$, R$^{6g}$, and R$^{6h}$ are each independently selected from the group consisting of hydrogen; —S(=O)$_2$—R$^7$; C$_{3-6}$cycloalkyl optionally substituted with one or two substituents each independently selected from the group consisting of —OR$^5$, Het$^g$, and Het$^e$; and C$_{1-6}$alkyl optionally substituted with one or two substituents each independently selected from the group consisting of —OR$^5$, —NR$^{9a}$—C(=O)—R$^{9b}$, Het$^g$, and Het$^e$, wherein two hydrogen atoms on the same carbon atom of said C$_{1-6}$alkyl might be taken together to form C$_{3-6}$cycloalkyl wherein optionally one carbon atom is replaced by an heteroatom selected from nitrogen, oxygen and sulfur;

R$^5$ represents hydrogen or C$_{1-4}$alkyl;

R$^{8a}$, R$^{8c}$, and R$^{8d}$ are each independently selected from the group consisting of hydrogen;

C$_{1-4}$alkyl optionally substituted with one —OH or —O—C$_{1-4}$alkyl; and C$_{3-6}$cycloalkyl optionally substituted with one —OH or —O—C$_{1-4}$alkyl;

R$^{8b}$ is selected from the group consisting C$_{1-4}$alkyl optionally substituted with one —OH or —O—C$_{1-4}$alkyl; and C$_{3-6}$cycloalkyl optionally substituted with one —OH or —O—C$_{1-4}$alkyl;

or

R$^{8a}$ and R$^{8b}$, or R$^{8c}$ and R$^{8d}$ are taken together to form together with the N-atom to which they are attached a monocyclic fully saturated heterocyclyl containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$); wherein said monocyclic 4-, 5-, 6- or 7-membered fully saturated heterocyclyl might be substituted on one or more of the carbon atoms with in total 1, 2 or 3 substituents each independently selected from the group consisting of —OH, CN, halo, R$^7$, —O—R$^7$, —S(=O)$_2$—R$^7$, —C(=O)—R$^7$, —NR$^{6c}$R$^{6d}$, and —C(=O)—NR$^{6a}$R$^{6b}$;

wherein said monocyclic fully saturated heterocyclyl might be substituted on the nitrogen atoms with in total 1 or 2 substituents each independently selected from the group consisting of R$^7$, —S(=O)$_2$—R$^7$, —C(=O)—R$^7$, and —C(=O)—NR$^{6a}$R$^{6b}$;

R$^{9a}$ represents hydrogen or C$_{1-4}$alkyl;

R$^{9b}$ represents hydrogen or C$_{1-4}$alkyl optionally substituted with 1, 2 or 3 halo atoms;

Het$^b$ represents a monocyclic 4-, 5-, 6- or 7-membered non-aromatic heterocyclyl containing 1, 2 or 3 heteroatoms each independently selected from the group consisting of N, O, S; wherein said S-atom might be substituted to form S(=O), S(=O)$_2$, or S(=O)(=NR$^x$); or a bicyclic 6- to 12-membered non-aromatic heterocyclyl containing 1, 2 or 3 heteroatoms each independently selected from the group consisting of N, O, S; wherein said S-atom might be substituted to form S(=O), S(=O)$_2$, or S(=O)(=NR$^x$);

wherein said monocyclic or bicyclic non-aromatic heterocyclyl might be substituted on one or more of the carbon atoms with in total 1, 2 or 3 substituents each independently selected from the group consisting of —OH, CN, halo, R$^7$, —O—R$^7$, —S(=O)$_2$—R$^7$, —C(=O)—R$^7$, —NR$^{6c}$R$^{6d}$, and —C(=O)—NR$^{6a}$R$^{6b}$;

wherein said monocyclic or bicyclic non-aromatic heterocyclyl might be substituted on the nitrogen atoms with in total 1 or 2 substituents each independently selected from the group consisting of R$^7$, —S(=O)$_2$—R$^7$, —C(=O)—R$^7$, and —C(=O)—NR$^{6a}$R$^{6b}$;

each R$^7$ independently represents C$_{3-6}$cycloalkyl optionally substituted with 1, 2 or 3 substituents each independently selected from the group consisting of halo, —OH, —O—C$_{1-4}$alkyl and cyano; or C$_{1-4}$alkyl optionally substituted with 1, 2 or 3 substituents each independently selected from the group consisting of halo, —OH, —O—C$_{1-4}$alkyl and cyano;

Het$^e$ represents monocyclic 5-membered aromatic heterocyclyl containing 1 N-atom and optionally 1 or 2 additional heteroatoms each independently selected from the group consisting of N, O, S; wherein said optional S-atom might be substituted to form S(=O). S(=O)$_2$, or S(=O)(=NR$^x$); wherein said monocyclic 5-membered aromatic heterocyclyl is optionally substituted with one substituent selected from the group consisting of Het$^f$, and C$_{1-4}$alkyl optionally substituted with one Het$^f$;

Het$^f$ represents a monocyclic 4-, 5-, 6- or 7-membered non-aromatic heterocyclyl containing 1, 2 or 3 heteroatoms each independently selected from the group consisting of N, O, S; wherein said S-atom might be substituted to form S(=O), S(=O)$_2$, or S(=O)(=NR$^x$); wherein said monocyclic non-aromatic heterocyclyl is optionally substituted with one C$_{1-4}$alkyl;

Het$^g$ represents a monocyclic 4-, 5-, 6- or 7-membered non-aromatic heterocyclyl containing 1, 2 or 3 heteroatoms each independently selected from the group consisting of N, O, S; wherein said S-atom might be substituted to form S(=O), S(=O)$_2$, or S(=O)(=NR$^x$); wherein said monocyclic non-aromatic heterocyclyl is optionally substituted with one substituent selected from the group consisting of oxo, Het$^f$, and C$_{1-4}$alkyl optionally substituted with one Het$^f$;

each R$^x$ independently represents hydrogen or C$_{1-4}$alkyl;

and the pharmaceutically acceptable addition salts, the N-oxides, and the solvates thereof.

The present invention relates in particular to compounds of Formula (I) as defined herein, and the tautomers and the stereoisomeric forms thereof, wherein the dotted bond towards R$^{1b}$ is absent;

A$^1$ represents CH; A$^2$ represents CH; A$^3$ represents CH; A$^4$ represents CH or N; A$^5$ represents N or CR$^{3b}$; A$^6$ represents CH;

R$^{1a}$ represents hydrogen;

R$^{1b}$ represents hydrogen;

R$^{4a}$ represents C$_{1-4}$alkyl;

R$^{4b}$ represents C$_{1-4}$alkyl;

or

R$^{1b}$ and R$^{4b}$ are taken together to form together with the atoms to which they are attached a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O) or S(=O)$_2$;

provided that in case R$^{1b}$ and R$^{4b}$ are taken together, R$^{4a}$ represents hydrogen; and R$^{1a}$ represents hydrogen;

R$^2$ represents Het$^b$;

R$^{3a}$ represents hydrogen, cyano, —C(=O)—NR$^{6g}$R$^{6h}$, or C$_{1-4}$alkyl optionally substituted with one, two or three substituents each independently selected from the group consisting of cyano, halo, CF$_3$, and —NR$^{6e}$R$^{6f}$;

R$^{3b}$ represents hydrogen or C$_{1-4}$alkyl;

R$^{6e}$, R$^{6f}$, R$^{6g}$, and R$^{6h}$ are each independently selected from the group consisting of hydrogen; —S(=O)$_2$—R$^7$; C$_{3-6}$cycloalkyl optionally substituted with one or two —OR$^5$ substituents; and C$_{1-6}$alkyl optionally substituted with one or two substituents each independently selected from the group consisting of —OR$^5$, —NR$^{9a}$—C(=O)—R$^{9b}$, Het$^g$, and Het$^e$, wherein two hydrogen atoms on the same carbon atom of said C$_{1-6}$alkyl might be taken together to form C$_{3-6}$cycloalkyl wherein optionally one carbon atom is replaced by an heteroatom selected from nitrogen, oxygen and sulfur;

R$^5$ represents hydrogen or C$_{1-4}$alkyl;

R$^{9a}$ represents hydrogen or C$_{1-4}$alkyl;

R$^{9b}$ represents C$_{1-4}$alkyl optionally substituted with 1, 2 or 3 halo atoms;

Het$^b$ represents a monocyclic 4-, 5-, 6- or 7-membered non-aromatic heterocyclyl containing 1, 2 or 3 heteroatoms each independently selected from the group consisting of N, O, S; wherein said S-atom might be substituted to form S(=O) or S(=O)$_2$;

each R$^7$ represents C$_{3-6}$cycloalkyl;

Het$^e$ represents monocyclic 5-membered aromatic heterocyclyl containing 1 N-atom and optionally 1 or 2 additional heteroatoms each independently selected from the group consisting of N, O, S; wherein said optional S-atom might be substituted to form S(=O) or S(=O)$_2$; wherein said monocyclic 5-membered aromatic heterocyclyl is optionally substituted with one C$_{1-4}$alkyl;

and the pharmaceutically acceptable addition salts, the N-oxides, and the solvates thereof.

The present invention relates in particular to compounds of Formula (I) as defined herein, and the tautomers and the stereoisomeric forms thereof, wherein the dotted bond towards R$^{1b}$ is absent;

A$^1$ represents CH; A$^2$ represents CH; A$^3$ represents CH; A$^4$ represents CH; A$^5$ represents CR$^{3b}$; A$^6$ represents CH;

R$^{1b}$ and R$^{4b}$ are taken together to form together with the atoms to which they are attached a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O) or S(=O)$_2$;

provided that R$^{4a}$ represents hydrogen; and R$^{1a}$ represents hydrogen;

R$^2$ represents Het$^b$;

R$^{3a}$ represents hydrogen, cyano, —C(=O)—NR$^{6g}$R$^{6h}$, or C$_{1-4}$alkyl optionally substituted with one, two or three substituents each independently selected from the group consisting of cyano, halo, CF$_3$, and —NR$^{6e}$R$^{6f}$;

R$^{3b}$ represents hydrogen or C$_{1-4}$alkyl;

R$^{6e}$, R$^{6f}$, R$^{6g}$, and R$^{6h}$ are each independently selected from the group consisting of hydrogen; —S(=O)$_2$—R$^7$; C$_{3-6}$cycloalkyl optionally substituted with one or two —OR$^5$ substituents; and C$_{1-6}$alkyl optionally substituted with one or two substituents each independently selected from the group consisting of —OR, —NR$^{9a}$—C(=O)—R$^{9b}$, Het$^g$, and Het$^e$, wherein two hydrogen atoms on the same carbon atom of said C$_{1-6}$alkyl might be taken together to form C$_{3-6}$cycloalkyl wherein optionally one carbon atom is replaced by an heteroatom selected from nitrogen, oxygen and sulfur;

R$^5$ represents hydrogen or C$_{1-4}$alkyl;

R$^{9a}$ represents hydrogen or C$_{1-4}$alkyl;

R$^{9b}$ represents C$_{1-4}$alkyl optionally substituted with 1, 2 or 3 halo atoms;

Het$^b$ represents a monocyclic 4-, 5-, 6- or 7-membered non-aromatic heterocyclyl containing 1, 2 or 3 heteroatoms each independently selected from the group consisting of N, O, S; wherein said S-atom might be substituted to form S(=O) or S(=O)$_2$;

each R$^7$ represents C$_{3-6}$cycloalkyl;

Het$^e$ represents monocyclic 5-membered aromatic heterocyclyl containing 1 N-atom and optionally 1 or 2 additional heteroatoms each independently selected from the group consisting of N, O, S; wherein said optional S-atom might be substituted to form S(=O) or S(=O)$_2$; wherein said monocyclic 5-membered aromatic heterocyclyl is optionally substituted with one C$_{1-4}$alkyl;

and the pharmaceutically acceptable addition salts, the N-oxides, and the solvates thereof.

The present invention relates in particular to compounds of Formula (I) as defined herein, and the tautomers and the stereoisomeric forms thereof, wherein the dotted bond towards R$^{1b}$ is absent;

A$^1$ represents CH; A$^2$ represents CH; A$^3$ represents CH; A$^4$ represents CH; A$^5$ represents CR$^{3b}$; A$^6$ represents CH;

R$^{1b}$ and R$^{4b}$ are taken together to form together with the atoms to which they are attached a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O) or S(=O)$_2$;

provided that R$^{4a}$ represents hydrogen; and R$^{1a}$ represents hydrogen;

R$^2$ represents Het$^b$;

R$^{3a}$ represents C$_{1-4}$alkyl;

R$^{3b}$ represents hydrogen;

Het$^b$ represents 4-tetrahydropyranyl;

and the pharmaceutically acceptable addition salts, the N-oxides, and the solvates thereof.

The present invention relates in particular to compounds of Formula (I) as defined herein, and the tautomers and the stereoisomeric forms thereof, wherein the dotted bond towards R$^{1b}$ is absent;

A$^1$ represents CH; A$^2$ represents CH; A$^3$ represents CH; A$^4$ represents CH; A$^5$ represents CR$^{3b}$; A$^6$ represents CH;

R$^{1b}$ and R$^{4b}$ are taken together to form together with the atoms to which they are attached

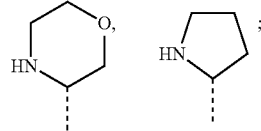

R$^{4a}$ represents hydrogen; and R$^{1a}$ represents hydrogen;

R$^2$ represents Het$^b$;

R$^{3a}$ represents C$_{1-4}$alkyl;

R$^{3b}$ represents hydrogen;

Het$^b$ represents 4-tetrahydropyranyl;

and the pharmaceutically acceptable addition salts, the N-oxides, and the solvates thereof.

In an embodiment, the present invention relates to those compounds of Formula (I) and the pharmaceutically acceptable addition salts, the N-oxides, and the solvates thereof, or any subgroup thereof as mentioned in any of the other embodiments, wherein R$^2$ represents Het$^b$.

In an embodiment, the present invention relates to those compounds of Formula (I) and the pharmaceutically acceptable addition salts, the N-oxides, and the solvates thereof, or any subgroup thereof as mentioned in any of the other embodiments, wherein R$^2$ represents Het$^b$; and wherein Het$^b$ is attached the remainder of the molecule via a carbon atom (carbon linked).

In an embodiment, the present invention relates to those compounds of Formula (I) and the pharmaceutically acceptable addition salts, the N-oxides, and the solvates thereof, or any subgroup thereof as mentioned in any of the other embodiments, wherein Het$^b$ is attached the remainder of the molecule via a carbon atom (carbon linked).

In an embodiment, the present invention relates to those compounds of Formula (I) and the pharmaceutically acceptable addition salts, the N-oxides, and the solvates thereof, or any subgroup thereof as mentioned in any of the other embodiments, wherein Het$^b$ represents a carbon linked monocyclic 4-, 5-, 6- or 7-membered non-aromatic heterocyclyl containing 1, 2 or 3 heteroatoms each independently selected from the group consisting of N, O, S; wherein said S-atom might be substituted to form S(=O), S(=O)$_2$, or S(=O)(=NR$^x$); or a carbon linked bicyclic 6- to 12-membered non-aromatic heterocyclyl containing 1, 2 or 3 heteroatoms each independently selected from the group consisting of N, O, S;

wherein said S-atom might be substituted to form S(=O), S(=O)$_2$, or S(=O)(=NR$^x$);

wherein said monocyclic or bicyclic non-aromatic heterocyclyl might be substituted on one or more of the carbon atoms with in total 1, 2 or 3 substituents each independently selected from the group consisting of —OH, CN, halo, R$^7$, —O—R$^7$, —S(=O)$_2$—R$^7$, —C(=O)—R$^7$, —NR$^{6c}$R$^{6d}$, and —C(=O)—NR$^{6a}$R$^{6b}$;

wherein said monocyclic or bicyclic non-aromatic heterocyclyl might be substituted on the nitrogen atoms with in total 1 or 2 substituents each independently selected from the group consisting of R$^7$, —S(=O)$_2$—R$^7$, —C(=O)—R$^7$, and —C(=O)—NR$^{6a}$R$^{6b}$.

In an embodiment, the present invention relates to those compounds of Formula (I) and the pharmaceutically acceptable addition salts, the N-oxides, and the solvates thereof, or any subgroup thereof as mentioned in any of the other embodiments, wherein R² represents Het$^b$;

Het$^b$ represents a carbon linked monocyclic 4-, 5-, 6- or 7-membered non-aromatic heterocyclyl containing 1, 2 or 3 heteroatoms each independently selected from the group consisting of N, O, S; wherein said S-atom might be substituted to form S(=O), S(=O)$_2$, or S(=O)(=NR$^x$); or a carbon linked bicyclic 6- to 12-membered non-aromatic heterocyclyl containing 1, 2 or 3 heteroatoms each independently selected from the group consisting of N, O, S;

wherein said S-atom might be substituted to form S(=O), S(=O)$_2$, or S(=O)(=NR$^x$);

wherein said monocyclic or bicyclic non-aromatic heterocyclyl might be substituted on one or more of the carbon atoms with in total 1, 2 or 3 substituents each independently selected from the group consisting of —OH, CN, halo, R$^7$, —O—R$^7$, —S(=O)$_2$—R$^7$, —C(=O)—R$^7$, —NR$^{6c}$R$^{6d}$, and —C(=O)—NR$^{6a}$R$^{6b}$;

wherein said monocyclic or bicyclic non-aromatic heterocyclyl might be substituted on the nitrogen atoms with in total 1 or 2 substituents each independently selected from the group consisting of R$^7$, —S(=O)$_2$—R$^7$, —C(=O)—R$^7$, and —C(=O)—NR$^{6a}$R$^{6b}$.

In an embodiment, the present invention relates to those compounds of Formula (I) and the pharmaceutically acceptable addition salts, the N-oxides, and the solvates thereof, or any subgroup thereof as mentioned in any of the other embodiments, wherein Het$^b$ represents a carbon linked monocyclic 4-, 5-, 6- or 7-membered non-aromatic heterocyclyl containing 1, 2 or 3 heteroatoms each independently selected from the group consisting of N, O, S; wherein said S-atom might be substituted to form S(=O), S(=O)$_2$, or S(=O)(=NR$^x$);

wherein said monocyclic non-aromatic heterocyclyl might be substituted on the nitrogen atoms with in total 1 or 2 substituents each independently selected from the group consisting of R$^7$, —S(=O)$_2$—R$^7$, —C(=O)—R$^7$, and —C(=O)—NR$^{6a}$R$^{6b}$.

In an embodiment, the present invention relates to those compounds of Formula (I) and the pharmaceutically acceptable addition salts, the N-oxides, and the solvates thereof, or any subgroup thereof as mentioned in any of the other embodiments, wherein R² represents Het$^b$;

Het$^b$ represents a carbon linked monocyclic 4-, 5-, 6- or 7-membered non-aromatic heterocyclyl containing 1, 2 or 3 heteroatoms each independently selected from the group consisting of N, O, S; wherein said S-atom might be substituted to form S(=O), S(=O)$_2$, or S(=O)(=NR$^x$);

wherein said monocyclic non-aromatic heterocyclyl might be substituted on the nitrogen atoms with in total 1 or 2 substituents each independently selected from the group consisting of R$^7$, —S(=O)$_2$—R$^7$, —C(=O)—R$^7$, and —C(=O)—NR$^{6a}$R$^{6b}$.

In an embodiment, the present invention relates to those compounds of Formula (I) and the pharmaceutically acceptable addition salts, the N-oxides, and the solvates thereof, or any subgroup thereof as mentioned in any of the other embodiments, wherein R² represents

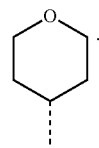

In an embodiment, the present invention relates to those compounds of Formula (I) and the pharmaceutically acceptable addition salts, the N-oxides, and the solvates thereof, or any subgroup thereof as mentioned in any of the other embodiments, wherein R² represents

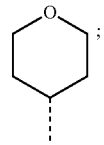

R$^{1b}$ and R$^{4b}$ are taken together to form together with the atoms to which they are attached

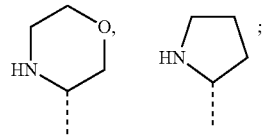

R$^{4a}$ represents hydrogen; and R$^{1a}$ represents hydrogen.

In an embodiment, the present invention relates to those compounds of Formula (I) and the pharmaceutically acceptable addition salts, the N-oxides, and the solvates thereof, or any subgroup thereof as mentioned in any of the other embodiments, wherein R$^{1b}$ and R$^{4b}$ are taken together to form together with the atoms to which they are attached

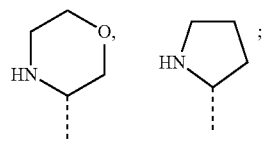

R$^{4a}$ represents hydrogen; and R$^{1a}$ represents hydrogen.

In an embodiment, the present invention relates to those compounds of Formula (I) and the pharmaceutically acceptable addition salts, the N-oxides, and the solvates thereof, or any subgroup thereof as mentioned in any of the other embodiments, wherein R$^{1b}$ and R$^{4b}$ are taken together to form together with the atoms to which they are attached

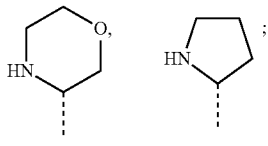

R stereochemistry    S stereochemistry

R$^{4a}$ represents hydrogen; and R$^{1a}$ represents hydrogen.

In an embodiment, the present invention relates to those compounds of Formula (I) and the pharmaceutically acceptable addition salts, the N-oxides, and the solvates thereof, or any subgroup thereof as mentioned in any of the other embodiments, wherein $R^{1b}$ and $R^{4b}$ are taken together to form together with the atoms to which they are attached

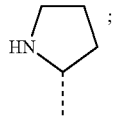

$R^{4a}$ represents hydrogen; and $R^{1a}$ represents hydrogen.

In an embodiment, the present invention relates to those compounds of Formula (I) and the pharmaceutically acceptable addition salts, the N-oxides, and the solvates thereof, or any subgroup thereof as mentioned in any of the other embodiments, wherein $R^{1b}$ and $R^{4b}$ are taken together to form together with the atoms to which they are attached

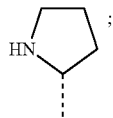

S stereochemistry $R^{4a}$ represents hydrogen; and $R^{1a}$ represents hydrogen.

In an embodiment, the present invention relates to those compounds of Formula (I) and the pharmaceutically acceptable addition salts, the N-oxides, and the solvates thereof, or any subgroup thereof as mentioned in any of the other embodiments, wherein
$A^1$ represents CH or N; $A^2$ represents CH; $A^3$ represents CH;
$A^4$ represents CH or N; $A^5$ represents $CR^{3a}$; $A^6$ represents CH.

In an embodiment, the present invention relates to those compounds of Formula (I) and the pharmaceutically acceptable addition salts, the N-oxides, and the solvates thereof, or any subgroup thereof as mentioned in any of the other embodiments, wherein
$A^1$ represents CH or N; $A^2$ represents CH; $A^3$ represents CH;
$A^4$ represents CH or N; $A^5$ represents $CR^{3a}$; $A^6$ represents CH;
$R^2$ represents $Het^b$.

In an embodiment, the present invention relates to those compounds of Formula (I) and the pharmaceutically acceptable addition salts, the N-oxides, and the solvates thereof or any subgroup thereof as mentioned in any of the other embodiments, wherein
$R^{1a}$ represents hydrogen;
$R^{1b}$ represents hydrogen or $CH_3$;
$R^{4a}$ represents hydrogen, $C_{1-4}$alkyl, or $C_{3-6}$cycloalkyl;
$R^{4b}$ represents hydrogen, $C_{1-4}$alkyl, $C_{3-6}$cycloalkyl, or
a carbon linked monocyclic 4-, 5-, 6- or 7-membered non-aromatic heterocyclyl containing 1, 2 or 3 heteroatoms each independently selected from the group consisting of N, O, and S; wherein said S-atom might be substituted to form S(=O), S(=O)$_2$, or S(=O)(=NR$^x$).

In an embodiment, the present invention relates to those compounds of Formula (I) and the pharmaceutically acceptable addition salts, the N-oxides, and the solvates thereof, or any subgroup thereof as mentioned in any of the other embodiments, wherein
$R^{1b}$ and $R^{4b}$ are taken together to form together with the atoms to which they are attached a monocyclic 5-membered aromatic heterocyclyl or a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$); or
a bicyclic 6- to 12-membered aromatic or fully saturated heterocyclyl containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$);
wherein said monocyclic or bicyclic, aromatic or fully saturated heterocyclyl might be substituted on one or more of the carbon atoms with in total 1, 2 or 3 substituents each independently selected from the group consisting of —OH, CN, halo, $R^7$, —O—$R^7$, —S(=O)$_2$—$R^7$, —C(=O)—$R^7$, —NR$^{6c}$R$^{6d}$, —C(=O)—NR$^{6a}$R$^{6b}$, and Het$^d$;
wherein said monocyclic or bicyclic, aromatic or fully saturated heterocyclyl might be substituted on the optional additional nitrogen atoms with in total 1 or 2 substituents each independently selected from the group consisting of $R^7$, —S(=O)$_2$—$R^7$, —C(=O)—$R^7$, —C(=O)—NR$^{6a}$R$^6$, and Het$^d$;
provided that $R^{4a}$ represents hydrogen; and
$R^{1a}$ represents hydrogen or $R^{1a}$ is absent when the dotted bond towards $R^{1b}$ is a bond.

In an embodiment, the present invention relates to those compounds of Formula (I) and the pharmaceutically acceptable addition salts, the N-oxides, and the solvates thereof, or any subgroup thereof as mentioned in any of the other embodiments, wherein
$R^{1b}$ and $R^{4b}$ are taken together to form together with the atoms to which they are attached a monocyclic 5-membered aromatic heterocyclyl or a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$);
wherein said monocyclic aromatic or fully saturated heterocyclyl might be substituted on one or more of the carbon atoms with in total 1, 2 or 3 substituents each independently selected from the group consisting of —OH, CN, halo, $R^7$, —O—$R^7$, —S(=O)$_2$—$R^7$, —C(=O)—$R^7$, —NR$^{6c}$R$^{6d}$, —C(=O)—NR$^{6a}$R$^{6b}$, and Het$^c$;
wherein said monocyclic aromatic or fully saturated heterocyclyl might be substituted on the optional additional nitrogen atoms with in total 1 or 2 substituents each independently selected from the group consisting of $R^7$, —S(=O)$_2$—$R^7$, —C(=O)—$R^7$, —C(=O)—NR$^{6a}$R$^{6b}$, and Het$^d$;
provided that $R^{4a}$ represents hydrogen; and
$R^{1a}$ represents hydrogen or $R^{1a}$ is absent when the dotted bond towards $R^{1b}$ is a bond.

In an embodiment, the present invention relates to those compounds of Formula (I) and the pharmaceutically acceptable addition salts, the N-oxides, and the solvates thereof, or any subgroup thereof as mentioned in any of the other embodiments, wherein $R^{1b}$ and $R^{4b}$ are taken together to form together with the atoms to which they are attached a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$);

wherein said monocyclic fully saturated heterocyclyl might be substituted on one or more of the carbon atoms with in total 1, 2 or 3 substituents each independently selected from the group consisting of —OH, CN, halo, R$^7$, —O—R$^7$, —S(=O)$_2$—R$^7$, —C(=O)—R$^7$, —NR$^{6c}$R$^{6d}$, —C(=O)—NR$^{6a}$R$^{6b}$, and Het$^c$;

wherein said monocyclic fully saturated heterocyclyl might be substituted on the optional additional nitrogen atoms with in total 1 or 2 substituents each independently selected from the group consisting of R$^7$, —S(=O)$_2$—R$^7$, —C(=O)—R$^7$, —C(=O)—NR$^{6a}$R$^{6b}$, and Het$^d$;

provided that $R^{4a}$ represents hydrogen; and $R^{1a}$ represents hydrogen or $R^{1a}$ is absent when the dotted bond towards $R^{1b}$ is a bond.

In an embodiment, the present invention relates to those compounds of Formula (I) and the pharmaceutically acceptable addition salts, the N-oxides, and the solvates thereof, or any subgroup thereof as mentioned in any of the other embodiments, wherein $R^{1b}$ and $R^{4b}$ are taken together;

provided that $R^{4a}$ represents hydrogen; and $R^{1a}$ represents hydrogen or $R^{1a}$ is absent when the dotted bond towards $R^{1b}$ is a bond.

In an embodiment, the present invention relates to those compounds of Formula (I) and the pharmaceutically acceptable addition salts, the N-oxides, and the solvates thereof, or any subgroup thereof as mentioned in any of the other embodiments, wherein $R^{4a}$ and $R^{4b}$ are taken together to form together with the N-atom to which they are attached a monocyclic 5-membered aromatic heterocyclyl or a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$); or a bicyclic 6- to 12-membered aromatic or fully saturated heterocyclyl containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$);

wherein said monocyclic or bicyclic, aromatic or fully saturated heterocyclyl might be substituted on one or more of the carbon atoms with in total 1, 2 or 3 substituents each independently selected from the group consisting of —OH, CN, halo, R$^7$, —O—R$^7$, —S(=O)$_2$—R$^7$, —C(=O)—R$^7$, —NR$^{6c}$R$^{6d}$, —C(=O)—NR$^{6a}$R$^{6b}$, and Het$^c$;

wherein said monocyclic or bicyclic, aromatic or fully saturated heterocyclyl might be substituted on the nitrogen atoms with in total 1 or 2 substituents each independently selected from the group consisting of R$^7$, —S(=O)$_2$—R$^7$, —C(=O)—R$^7$, —C(=O)—NR$^{6a}$R$^{6b}$, and Het$^d$.

$R^{1a}$ represents hydrogen, and $R^{1b}$ represents hydrogen.

In an embodiment, the present invention relates to those compounds of Formula (I) and the pharmaceutically acceptable addition salts, the N-oxides, and the solvates thereof, or any subgroup thereof as mentioned in any of the other embodiments, wherein $R^{1a}$ represents hydrogen;

$R^{1b}$ represents hydrogen or CH$_3$;

$R^{4a}$ represents hydrogen, C$_{1-4}$alkyl, or C$_{3-6}$cycloalkyl;

$R^{4b}$ represents hydrogen, C$_{1-4}$alkyl, C$_{3-6}$cycloalkyl, or a carbon linked monocyclic 4-, 5-, 6- or 7-membered non-aromatic heterocyclyl containing 1, 2 or 3 heteroatoms each independently selected from the group consisting of N, O, and S; wherein said S-atom might be substituted to form S(=O), S(=O)$_2$, or S(=O)(=NR$^x$);

or $R^{1b}$ and $R^{4b}$ are taken together to form together with the atoms to which they are attached a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$); or a bicyclic 6- to 12-membered fully saturated heterocyclyl containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$);

wherein said monocyclic or bicyclic, fully saturated heterocyclyl might be substituted on one or more of the carbon atoms with in total 1, 2 or 3 substituents each independently selected from the group consisting of —OH, CN, halo, R$^7$, —O—R$^7$, —S(=O)$_2$—R$^7$, —C(=O)—R$^7$, —NR$^{6c}$R$^{6d}$, —C(=O)—NR$^{6a}$R$^{6b}$, and Het$^d$;

wherein said monocyclic or bicyclic, fully saturated heterocyclyl might be substituted on the optional additional nitrogen atoms with in total 1 or 2 substituents each independently selected from the group consisting of R$^7$, —S(=O)$_2$—R$^7$, —C(=O)—R$^7$, —C(=O)—NR$^{6a}$R$^{6b}$, and Het$^d$;

provided that in case $R^{1b}$ and $R^{4b}$ are taken together, $R^{4a}$ represents hydrogen; and $R^{1a}$ represents hydrogen or $R^{1a}$ is absent when the dotted bond towards $R^{1b}$ is a bond;

or $R^{4a}$ and $R^{4b}$ are taken together to form together with the N-atom to which they are attached a monocyclic 5-, 6- or 7-membered aromatic heterocyclyl or a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O). S(=O)$_2$, or S(=O)(=NR$^x$); or a bicyclic 6- to 12-membered aromatic or fully saturated heterocyclyl containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$);

wherein said monocyclic or bicyclic, aromatic or fully saturated heterocyclyl might be substituted on one or more of the carbon atoms with in total 1, 2 or 3 substituents each independently selected from the group consisting of —OH, CN, halo, R$^7$, —O—R$^7$, —S(=O)$_2$—R$^7$, —C(=O)—R$^7$, —NR$^{6c}$R$^{6d}$, —C(=O)—NR$^{6a}$R$^{6b}$, and Het$^c$;

wherein said monocyclic or bicyclic, aromatic or fully saturated heterocyclyl might be substituted on the nitrogen atoms with in total 1 or 2 substituents each independently selected from the group consisting of R$^7$, —S(=O)$_2$—R$^7$, —C(=O)—R$^7$, —C(=O)—NR$^{6a}$R$^{6b}$, and Het$^d$;

in case R$^{4a}$ and R$^{4b}$ are taken together, Rid represents hydrogen, and R$^{1b}$ represents hydrogen.

In an embodiment, the present invention relates to those compounds of Formula (I) and the pharmaceutically acceptable addition salts, the N-oxides, and the solvates thereof, or any subgroup thereof as mentioned in any of the other embodiments, wherein R$^{1a}$ represents hydrogen;
R$^{1b}$ represents hydrogen or CH$_3$;
R$^{4a}$ represents hydrogen, C$_{1-4}$alkyl, or C$_{3-6}$cycloalkyl;
R$^{4b}$ represents hydrogen, C$_{1-4}$alkyl, C$_{3-6}$cycloalkyl, or
a carbon linked monocyclic 4-, 5-, 6- or 7-membered non-aromatic heterocyclyl containing 1, 2 or 3 heteroatoms each independently selected from the group consisting of N, O, and S; wherein said S-atom might be substituted to form S(=O), S(=O)$_2$, or S(=O)(=NR$^x$);
or R$^{1b}$ and R$^{4b}$ are taken together to form together with the atoms to which they are attached a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$); or a bicyclic 6- to 12-membered fully saturated heterocyclyl containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$);

wherein said monocyclic or bicyclic, fully saturated heterocyclyl might be substituted on one or more of the carbon atoms with in total 1, 2 or 3 substituents each independently selected from the group consisting of —OH, CN, halo, R$^7$, —O—R$^7$, —S(=O)$_2$—R$^7$, —C(=O)—R$^7$, —NR$^{6c}$R$^{6d}$, —C(=O)—NR$^{6a}$R$^{6b}$, and Het$^c$;

wherein said monocyclic or bicyclic, fully saturated heterocyclyl might be substituted on the optional additional nitrogen atoms with in total 1 or 2 substituents each independently selected from the group consisting of R$^7$, —S(=O)$_2$—R$^7$, —C(=O)—R$^7$, —C(=O)—NR$^{6a}$R$^{6b}$, and Het$^d$;

provided that in case R$^{1b}$ and R$^{4b}$ are taken together, R$^{4a}$ represents hydrogen; and R$^{1a}$ represents hydrogen or R$^{1a}$ is absent when the dotted bond towards R$^{1b}$ is a bond.

In an embodiment, the present invention relates to those compounds of Formula (I) and the pharmaceutically acceptable addition salts, the N-oxides, and the solvates thereof, or any subgroup thereof as mentioned in any of the other embodiments, wherein R$^{1b}$ and R$^{4b}$ are taken together to form together with the atoms to which they are attached a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$); or a bicyclic 6- to 12-membered fully saturated heterocyclyl containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$);

wherein said monocyclic or bicyclic, fully saturated heterocyclyl might be substituted on one or more of the carbon atoms with in total 1, 2 or 3 substituents each independently selected from the group consisting of —OH, CN, halo, R$^7$, —O—R$^7$, —S(=O)$_2$—R$^7$, —C(=O)—R$^7$, —NR$^{6c}$R$^{6d}$, —C(=O)—NR$^{6a}$R$^{6b}$, and Het$^c$;

wherein said monocyclic or bicyclic, fully saturated heterocyclyl might be substituted on the optional additional nitrogen atoms with in total 1 or 2 substituents each independently selected from the group consisting of R$^7$, —S(=O)$_2$—R$^7$, —C(=O)—R$^7$, —C(=O)—NR$^{6a}$R$^{6b}$, and Het$^d$;

provided that R$^{4a}$ represents hydrogen; and
R$^{1a}$ represents hydrogen or R$^{1a}$ is absent when the dotted bond towards R$^{1b}$ is a bond.

In an embodiment, the present invention relates to those compounds of Formula (I) and the pharmaceutically acceptable addition salts, the N-oxides, and the solvates thereof, or any subgroup thereof as mentioned in any of the other embodiments, wherein Het$^c$ represents oxetanyl.

In an embodiment, the present invention relates to those compounds of Formula (I) and the pharmaceutically acceptable addition salts, the N-oxides, and the solvates thereof, or any subgroup thereof as mentioned in any of the other embodiments, wherein the compounds of Formula (I) are restricted to compounds of Formula (I-a1):

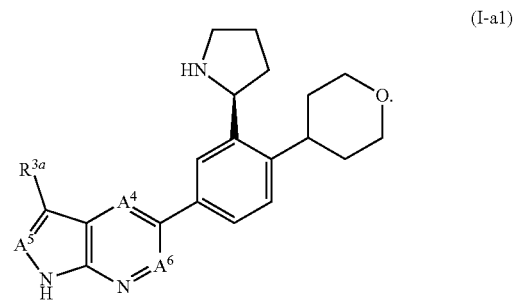

(I-a1)

In an embodiment, the present invention relates to those compounds of Formula (I) and the pharmaceutically acceptable addition salts, the N-oxides, and the solvates thereof, or any subgroup thereof as mentioned in any of the other embodiments, wherein the compounds of Formula (I) are restricted to compounds of Formula (I-a2):

(I-a2)

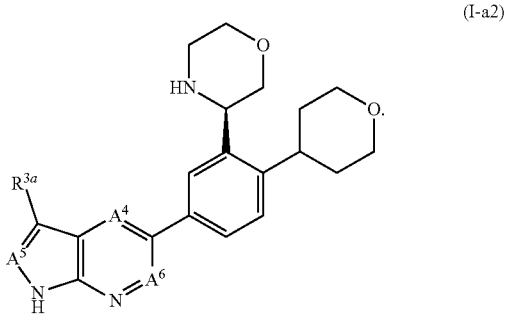

In an embodiment, the present invention relates to a subgroup of Formula (I) as defined in the general reaction schemes.

In an embodiment the compound of Formula (I) is selected from the group consisting of any of the exemplified compounds,
tautomers and stereoisomeric forms thereof,
any pharmaceutically acceptable addition salts, the N-oxides, and the solvates thereof.

All possible combinations of the above indicated embodiments are considered to be embraced within the scope of the invention.

Methods for the Preparation of Compounds of Formula (I)

In this section, as in all other sections unless the context indicates otherwise, references to Formula (I) also include all other sub-groups and examples thereof as defined herein.

The general preparation of some typical examples of the compounds of Formula (I) is described hereunder and in the specific examples and are generally prepared from starting materials which are either commercially available or prepared by standard synthetic processes commonly used by those skilled in the art of organic chemistry. The following schemes are only meant to represent examples of the invention and are in no way meant to be a limit of the invention.

Alternatively, compounds of the present invention may also be prepared by analogous reaction protocols as described in the general schemes below and the specific examples, combined with standard synthetic processes commonly used by those skilled in the art.

The skilled person will realize that in the reactions described in the Schemes, although this is not always explicitly shown, it may be necessary to protect reactive functional groups (for example hydroxy, amino, or carboxy groups) where these are desired in the final product, to avoid their unwanted participation in the reactions. In general, conventional protecting groups can be used in accordance with standard practice. The protecting groups may be removed at a convenient subsequent stage using methods known from the art.

The skilled person will realize that in the reactions described in the Schemes, it may be advisable or necessary to perform the reaction under an inert atmosphere, such as for example under $N_2$-gas atmosphere.

It will be apparent for the skilled person that it may be necessary to cool the reaction mixture before reaction work-up (refers to the series of manipulations required to isolate and purify the product(s) of a chemical reaction such as for example quenching, column chromatography, extraction).

The skilled person will realize that heating the reaction mixture under stirring may enhance the reaction outcome. In some reactions microwave heating may be used instead of conventional heating to shorten the overall reaction time.

The skilled person will realize that another sequence of the chemical reactions shown in the Schemes below, may also result in the desired compound of Formula (I).

The skilled person will realize that intermediates and final compounds shown in the Schemes below may be further functionalized according to methods well-known by the person skilled in the art. The intermediates and compounds described herein can be isolated in free form or as a salt, or a solvate thereof. The intermediates and compounds described herein may be synthesized in the form of mixtures of tautomers and stereoisomeric forms that can be separated from one another following art-known resolution procedures.

Hereinafter, "DCM" means dichloromethane; "LAH" means lithium aluminium hydride; "r.t." means room temperature; "Boc" means tert-butoxycarbonyl; "MeCN" means acetonitrile; "MeOH" means methanol; "TFA" means trifluoroacetic acid; "THF" means tetrahydrofuran; "Ti(OEt)$_4$" means titanium ethoxide; "EDCI" means 1-Ethyl-3-(3-dimethylaminopropyl)carbodiimide "HOBT" means 1-hydroxy-1H-benzotriazole; "Pd(PPh$_3$)$_4$" means tetrakis(triphenylphosphine)palladiun; "[Ir(dtbbpy)(ppy)$_2$]PF$_6$" means (4,4'-Di-t-butyl-2,2'-bipyridine)bis[2-(2-pyridinyl-kN) phenyl-kC]iridium(III) hexafluorophosphate; "SnAP" means tin amine protocol; "SLAP" means silicon amine protocol; "h" means hours; "PdCl$_2$(dppf)" means [1,1'-bis(diphenylphosphino-κP)ferrocene]dichloropalladium; "SFC" means Supercritical fluid chromatography; "LiHMDS" means Lithium bis(trimethylsilyl)ande; "SnBu$_3$" means tributyltin; "SiMe$_3$" means trimethylsilyl; "Cu(OTf)$_2$ means Copper (II) triflate; "PhBox" means 2,2'-Isopropylidenebis[(4R)-4-phenyl-2-oxazoline; "Bi(OTf)$_3$" means Bismuth(III) trifluoromethanesulfonate; "BF$_3$·2 MeOH means boron trifluoride in methanol; "TMSOTf" means trimethylsilyltriflate; "Me-THF" means methyltetrahydrofuran; "NiCl$_2$" means Nickel (II) chloride.

Scheme 1
In general, compounds of Formula (I) wherein all variables are defined according to the scope of the present invention, can be prepared according to the following reaction Scheme 1.
In the scheme 1, the following definitions apply: X represents an halo.
The following reaction conditions apply:
1: at a suitable temperature such as for example at 80° C., in the presence of bis(pinacolatodiboron), a suitable catalyst as for example PdCl$_2$(dppf), a suitable basis such as potassium acetate, in a suitable solvent such 1,4-dioxane
2: at a suitable temperature such as for example at 80° C., in the presence of a suitable catalyst as for the example PdCl$_2$(dppf), a suitable basis such as sodium carbonate, in a suitable solvent or mixture of solvents such 1,4-dioxane and water
In the preparation of compounds of the present invention, protection of remote functionality (e.g., primary or secondary amine) of intermediates may be necessary. The need for such protection will vary depnding on the nature of the remote functionality and the conditions of the preparations methods. Suitable amino-protecting group (NH-Pg) include t-butoxycarbonyl (Boc), acetyl, benzyl... The need for such protection is readily determined by one skilled in the art.

a)

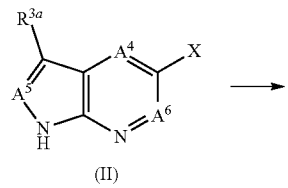

(II)

-continued

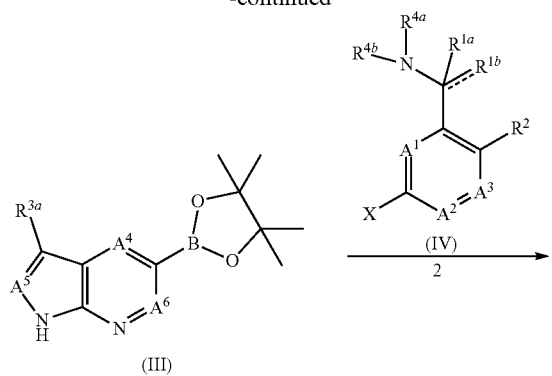

(III) + (IV) →<sub>2</sub> (I)

b)

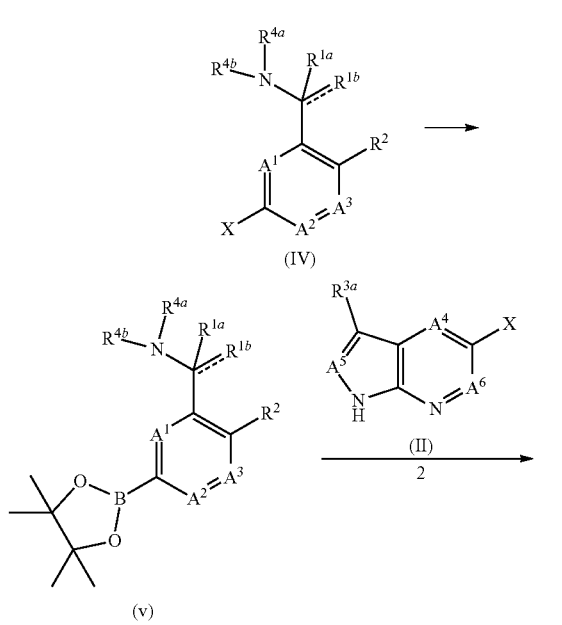

(IV) → (v) + (II) →<sub>2</sub> (I)

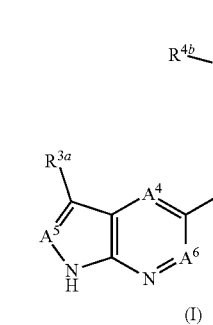

Scheme 2
Intermediates of Formula (IV) wherein $R^{1a}$ and $R^{1b}$ represent hydrogen, and X represent halo can be prepared according to the following reaction Scheme 2. All other variables in Scheme 2 are defined according to the scope of the present invention.

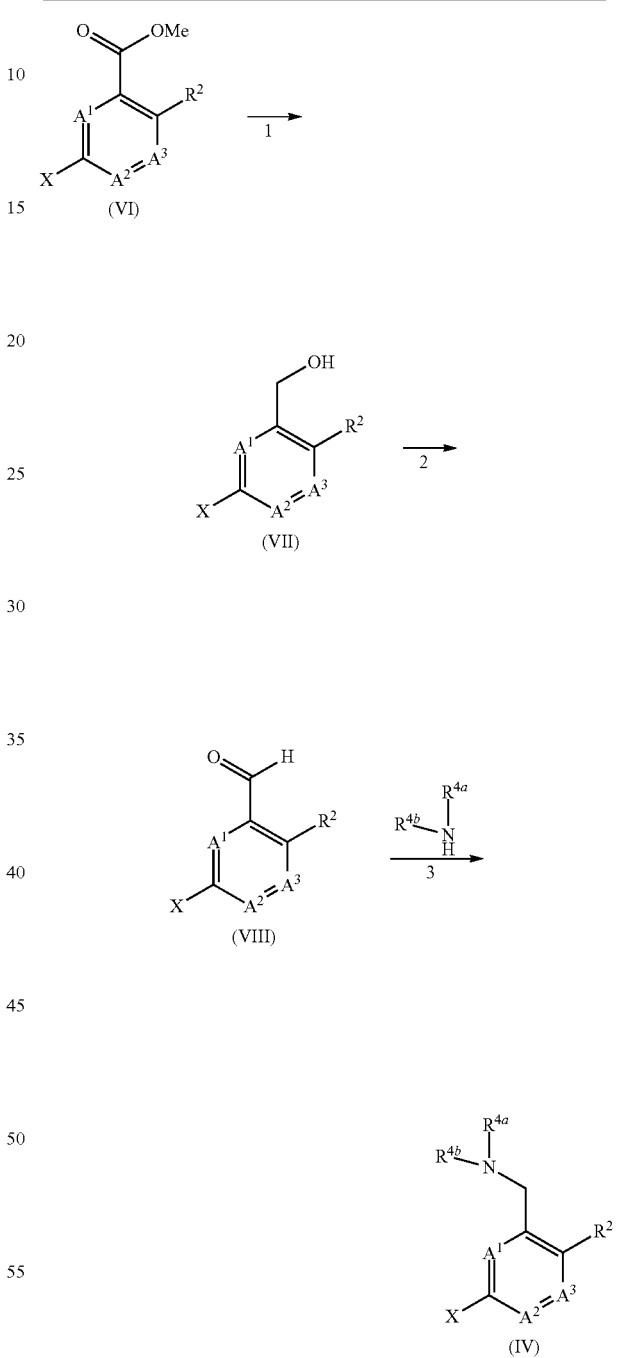

1: suitable temperature such as for example from 0° C. to rt, in the presence of a suitable reducing agent such as for example LAH in a suitable solvent such as for example THF
2: at a suitable temperature such as rt, in the presence of an oxidizing agent such as for example manganese oxide or Dess-Martin periodianane, in a suitable solvent such as for example DCM
3: at a suitable temperature such as for example rt, in the presence of a suitable reducing agent such as for example sodium triacetoxyborohydride in a suitable solvent such as for example DCM or THF.

Scheme 3
Intermediates of Formula (IV) wherein R$^{1a}$ represents hydrogen, R$^{1b}$ and R$^{4b}$ are taken together to form together with the atoms to which they attached a monocyclic 5-membered fully saturated heterocyclyl containing 1N-atom as for example intermediates of Formula (XII) can be prepared according to the following reaction Scheme 3. X represents halo, PG means protective group, all other variables in Scheme 3 are defined according to the scope of the present invention.

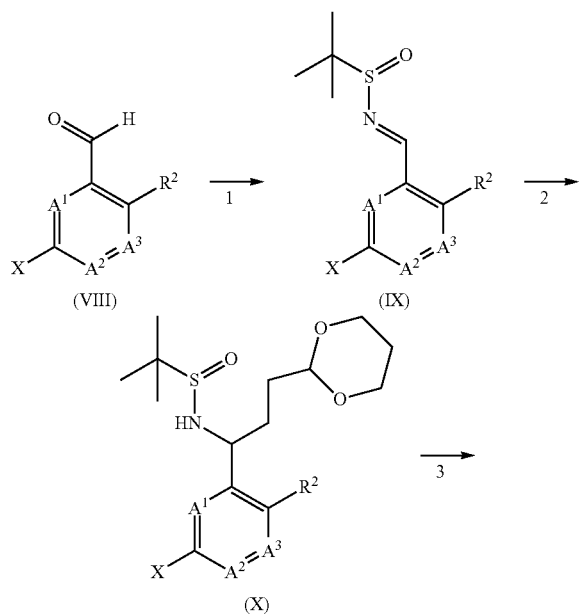

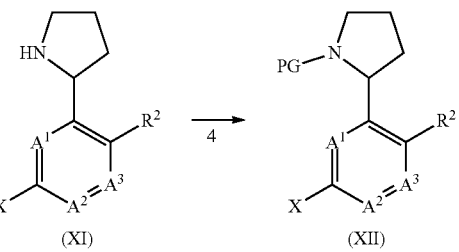

1: an intermediate of Formula (VIII) can react with t-Butylsulfinamide in the presence of Ti(OEt)$_4$ in a suitable solvent such as for example THF
2: Reaction with (1,3-dioxan-2-ylethyl) magnesium bromide in a suitable solvent, such as for example THF
3: in the presence of a suitable acid, such as for example TFA and a reductant triethylsilane in a suitable solvent such as for example water
4: an intermediate of Formula (XI) can be protected into a compound of Formula (XII) by reaction for example with di-tert-butyl dicarbonate in a suitable solvent such as for example DCM The intermediates of Formula (XII) may be synthesized in the form of racemic mixtures of enantiomers which can be separated from one another such as liquid chromatography using a chiral stationary phase or SFC.

A skilled person will realize that similar chemistry can be used to prepare compounds wherein R$^{1b}$ and R$^{4b}$ are taken together to form together with the atoms to which they attached a monocyclic 4-, 6- or 7-membered fully saturated heterocyclyl containing 1N-atom.

Scheme 4
Intermediate of Formula (IV) wherein R$^{1a}$ represents hydrogen, R$^{1b}$ and R$^{4b}$ are taken together to form together with the atoms to which they attached a monocyclic 5-membered fully saturated heterocyclyl containing at least 1N-atom and substituted as for example in intermediates of Formula (XV) and (XVIII), can be prepared according to the following reaction Scheme 4. X represents halo and n and p = 1, 2, Y represents O or CH$_2$, PG means protective group. All other variables in Scheme 4 are defined according to the scope of the present invention.
A skilled person will realize that similar chemistry can be used to prepare compounds wherein R$^{1b}$ and R$^{4b}$ are taken together to form together with the atoms to which they attached other sizes of fully saturate heterocycls containing at least 1N-atom.

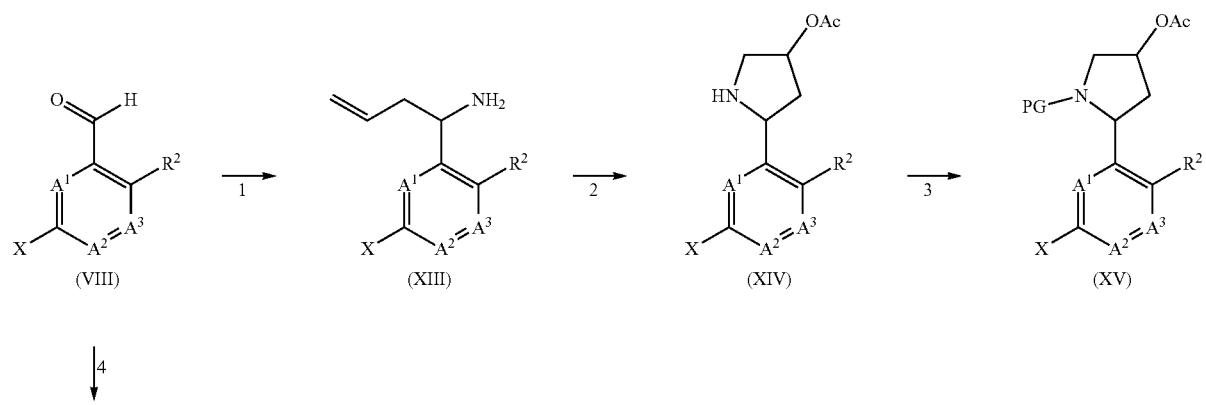

-continued

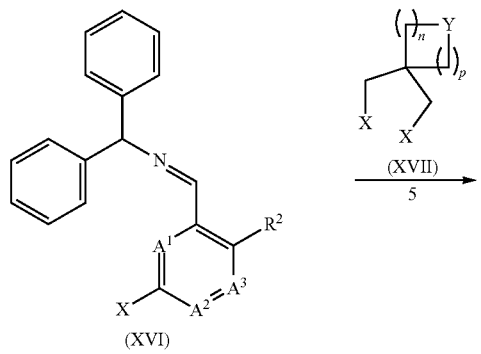 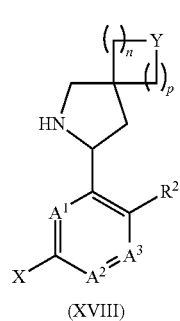

1 and 2: an intermediate of Formula (VIII) can be converted into a compound of formula (XIII) by reaction with Allylmagnesium choloride and LiHMDS in a suitable solvent, such as for example THF, followed by reaction with acetic anhydride in presence of a suitable basis such as triethylamine in a suitable solvent such as DCM.
3: an intermediate of Formula (XIV) can be protected into a compound of Formula (XV) by for example reaction with di-tert-butyl dicarbonate in a suitable solvent such as for example DCM
4: an intermediate of Formula (VIII) can react with Benzhydrylamine with magnesium sulfate in a suitable solvent such as DCM to give an intermediate of Formula (XVI)
5: an intermediate of Formula (XVI) can react with a compound of Formula (XVII) in presence of a suitable basis such as potassium tert-butoxide in a suitable solvent such as THF Intermediates of Formula (XV) can be further functionalized by a person skilled in the art.

The stereoisomers of intermediates of Formula (XV) and (XVIII) can be separated from one another such as liquid chromatography using a chiral stationary phase or SFC.

Scheme 5

Intermediate of Formula (IV) wherein $R^{1a}$ represents hydrogen, $R^{1b}$ and $R^{4b}$ are taken together to form together with the atoms to which they attached a monocyclic 6- or 7-membered fully saturated heterocyclyl containing at lease 1 N-atom and substituted as for example intermediates of Formula (XX), can be prepared according to the following reaction Scheme 5. X represents halo, n and p represent 1 or 2 (but only one of n and p can represent 2), Y represents O, S,or N, Z represents SnBu$_3$ or SiMe$_2$. A skilled person will understand that $R^q$ and $R^z$ can be selected from the list of substituents as defined in the scope of the present invention and do also include bicyclic spiro moieties formed together with the N-containing heterocyclyls to which they are attached. A skilled person will understand that $R^q$ and $R^z$ for example will not represent cyano or a directly attached amine substituent.
All other variable in Scheme 5 are defined according to the scope of the present invention.

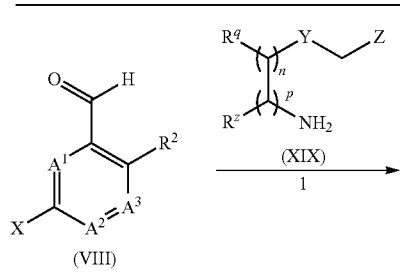

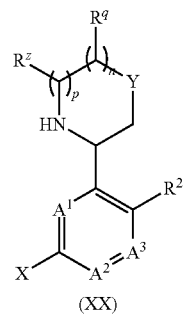

1: an intermediate of Formula (VIII) can react with a compound of Formula (XIX, Y represents O, S or N, Z = SnBu$_3$) in the presence of an oxidant, such as for example Cu(OTf)$_2$, a suitable ligand, such as for example Lutidien or PhBox, and a suitable solvent or solvent mixture, such as hexafluoroisopropan (HFIP) an dDCM or an intermediate of Formula (VIII) can react with a compound of Formula (XIX, Y = N, Z = SiMe$_3$) in the presence of a photocatalyst, such as for example Ir[ppy]$_2$(dtbby)PF$_6$, and a suitable solvent or solvent mixture, such as trifluoroethanol (TFE) and CH$_3$CN under blue light irradiation resulting or an intermediate of Formula (VIII) can react with a compound of Formula (XIX, Y = O, Z = SiMe$_3$) in the presence of a photocatalyst, such as for example triphenylpyrilium (TPP), a suitable acid such as for example TMSOTf, and a suitable solvent or solvent mixture, such as hexafluoroisopropanol (HFIP) and CH$_3$CN under blue light irradiation.

Scheme 6
Intermediate of Formula (IV) wherein $R^{1a}$ is absent when the dotted towards $R^{1b}$ is a bond as for example intermediates of Formula (XXIV) and (XXVI) can be prepared according to the following reaction Scheme 6. All other variables in Scheme 6 are defined according to the scope of the present invention.

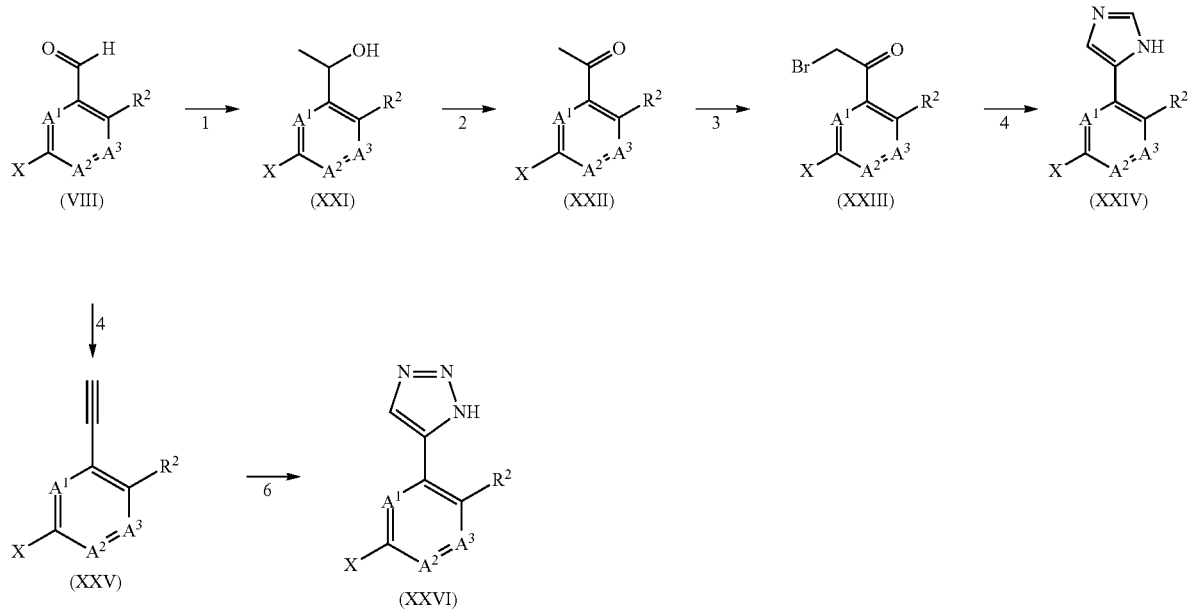

1: an intermediate of Formula (VIII) can be converted into an intermediate of Formula (XXI) by reaction for example with methylmagnesium bromide in a suitable solvent, such as for example THF
2: an intermediate of Formula (XXI) can be converted into an intermediate of Formula (XXII) by reaction for example with an oxidant such as for example manganese oxide in a suitable solvent, such as for example DCM
3: an intermediate of Formula (XXII) can be converted into an intermediate of Formula (XXIII) by reaction for example with a bromination agent such as for example tetra-n-butylammonium tribromide in a suitable solvent, such as for example acetonitrile
4: an intermediate of Formula (XXIII) can be converted into an intermediate of Formula (XXIV) by reaction for example with formamide as a suitable solvent
5: an intermediate of Formula (XXIII) can be converted into an intermediate of Formula (XXV) by reaction for example with dimethyl(1-dizao-2-oxopropyl)phosphonate in presence of a suitable basis such as potassium carbonate in a suitable solvent, such as for example MeOH
6: an intermediate of Formula (XXV) can be converted into an intermediate of Formula (XXVI) by reaction for example with trimethylsilyl azide in the presence of a catalyst as for example copper iodide in a suitable solvent or mixture of solvents as for example DMF and MeoH.

Scheme 7a
Intermediates of Formula (II) wherein $R^{3a}$ represents —C(=O)—NR$^{6g}$R$^{6h}$ and can be prepared according to the following reaction Scheme 7a. All other variables in Scheme 7a are defined according to the scope of the present invention.

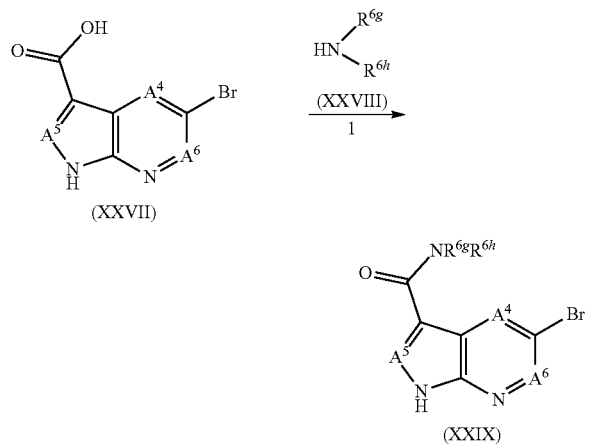

1: an intermediate of Formula (XXVII) can react with an intermediate of Formula (XXVIII) in the presence of suitable carboxyl activating agents such as EDCI and HOBT, a suitable base, such as DIPEA and in a suitable solvent or solvent mixture, such as for DCM and DMSO Scheme 7b
Intermediates of Formula (II) wherein $R^{3a}$ represents C$_{1-4}$alkyl optionally substituted with one NR$^{6e}$R$^{6f}$, and X=Br can be prepared according to the following reaction Scheme 7b. All other variables in Scheme 7b are defined according to the scope of the present invention.

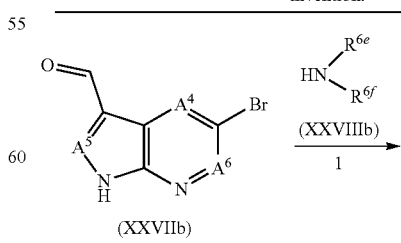

-continued

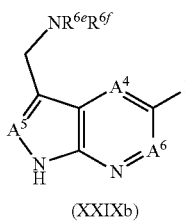

(XXIXb)

1. an intermediate of Formula (XXVIIb) can react with an intermediate of Formula (XXVIIIb) in the presence of a suitable reducing agent such as sodium triacetoxyborohydride in a suitable solvent such as MeOH.

Scheme 8

An alternative to synthesis of compounds of Formula (I) wherein $R^{3a}$ represent $C_{1\text{-}4}$alkyl optionally substituted with one $NR^{6e}R^{6f}$ (compounds of Formula (XXXI) can be prepared according to the following reaction Scheme 8. All other variables are defined according to the scope of the present invention

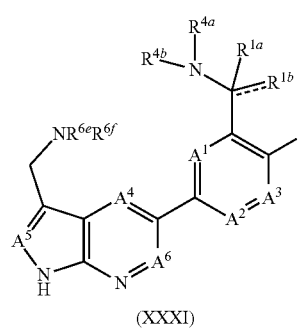

(XXXI)

1: an intermediate of Formula (XXX) can react with an intermediate of Formula (XXVIIIb) in the presence of suitable reducing agent such as sodium triacetoxyborohydride in a suitable solvent such as MEOH.

Scheme 8b

An alternative to synthesis of compounds of Formula (I) wherein $R^{3a}$ represents- $C(=O)-NR^{6g}R^{6h}$ (compounds of Formula (XXXII)) can be prepared according to the following reaction Scheme 8b. All other variables are defined according to the scope of the present invention

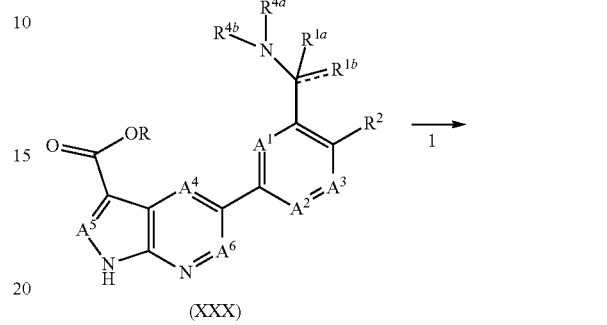

(XXX)

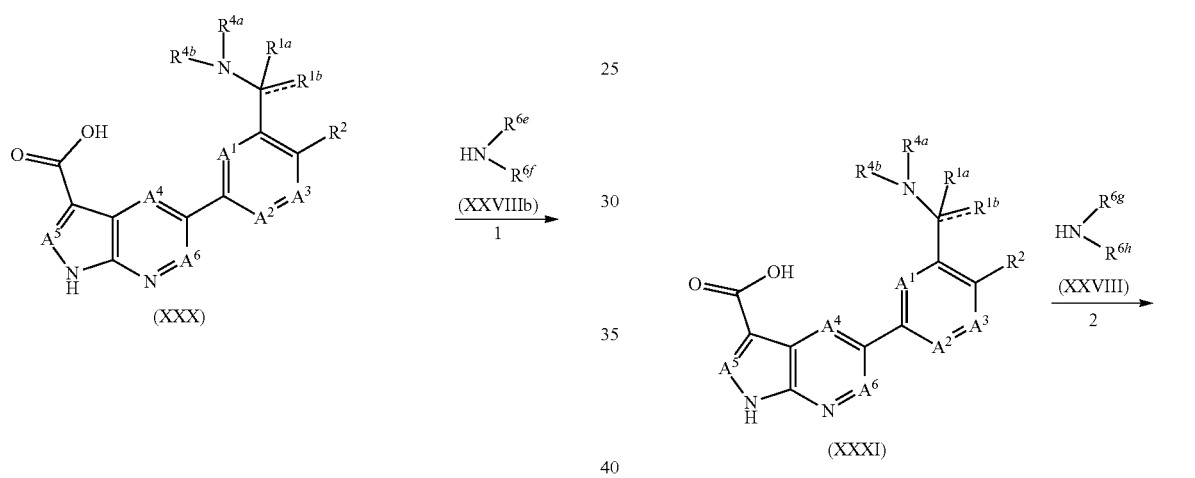

(XXXI)

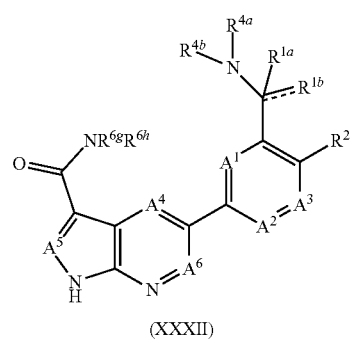

(XXXII)

1: an intermediate of Formula (XXX) can be saponified in the presence as for example lithium hydroxide in a suitable solvent or mixture of solvents such as MeOH and water
2: an intermediate of Formula (XXXI) can react with an intermediate of Formula (XXVIII) in the presence of a suitable carboxyl activating agents such as EDCI and HOBT, a suitable base, such as DIPEA and in a suitable solvent or solvent mixture, such as for DCM and DMSO

Scheme 9

An alterntaive to synthesis of compounds of Formula (I) wherein $R^{3a}$ and $R^{3b}$ are different from halo, can be prepared according to the following reaction in Scheme 9, as for example, compounds of Formula (XXXV) wherein $R^2$ represents $Het^b$. All other variables are defined according to the scope of the present invention

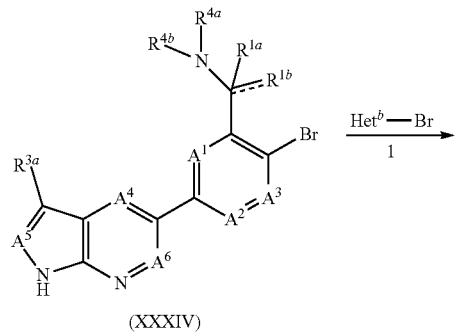

(XXXIV)

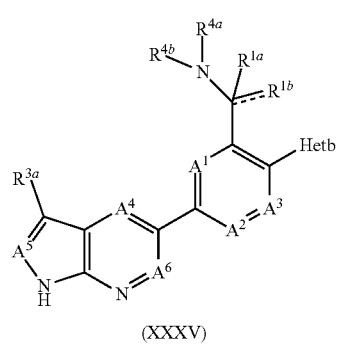

(XXXV)

1: an intermediate of Formula (XXXIV) can react with $Het^b$ bromides in the presence of a suitable photocatalyst, such as for example Ir[ppy]$_2$(dtbbpy)PF$_6$, a suitable Nickel source, such as for example NiCl$_2$, a suitable ligand, such as for example di-tert-butylbispyridine (dtbbp), a suitable reductant, such as for example tris(trimethylsilyl)silane (TTMSS), a suitable base, such as sodium bicarbonate (Na$_2$CO$_3$), and a suitable solvent, such as DME, under blue light irradiation.

Scheme 10

An alternative to synthesis of compounds of Formula (I) can be prepared according to the following reaction in Scheme 10, as for example, compounds of Formula (XXXVII) wherein $R^{1a}$ represents hydrogen, $R^{1b}$ and $R^{4b}$ are taken together to form together with the atoms to which they attached a monocyclic 6- or 7- membered fully saturated heterocyclyl containing at least 1N-atom and substituted; n and p represent 1 or 2 (but only one of n and p can represent 2), Y represents O, S, or N, and Z represents SnBu$_3$ or SiMe$_3$. A skilled person will understand that $R^q$ and $R^z$ can be selected from the list of substituents as defined in the scope of the present invention and do also include bicyclic spiro moieties formed together with the N-containing heterocyclyls to which they are attached. A skilled person will understand that $R^q$ and $R^z$ for example will not represent cyano or a directly attached amine substituent. All other variables are defined according to the scope of the present invention.

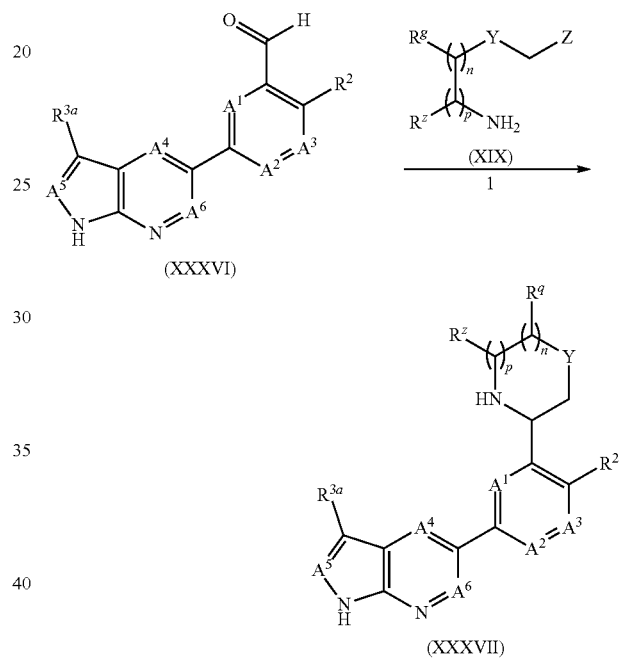

1: an intermediate of Formula (XXXVI) can react with a compound of Formula (XIX, Y = O, S or N, Z = SnBu$_3$) in the presence of an oxidant, such as for example Cu(OTf)$_2$, a suitable ligand, such as for example Lutidien or PhBox, and a suitable solvent or solvent mixture, such as hexafluoroisopropanol (HFIP) and DCM or an intermediate of Formula (XXXVI) can react with a compound of Formula (XIX, Y = N, Z = SiMe3) in the presence of a photcatalyst, such as for example Ir[ppy]$_2$(dtbbpy)PF$_6$, and a suitable solvent or solvent mixture, such as trifluoroethanol (TFE) and CH$_3$CN under blue light irradiation or an intermediate of Formula (XXXVI) can react with a compound of Formula (XIX, Y = S, Z = SiMe$_3$) in the presence of a photocatalyst, such as for example Ir[ppy]$_2$(dtbbpy)PF$_6$, a suitable acid or an acid mixture such as for Bi(OTf)$_3$, Cu(OTf)$_2$, BF$_3$•2MeOH in a suitable solvent CH$_3$CN under blue light irradiation or an intermediate of Formula (XXXVI) can react with a compound of Formula (XIX, Y = O, Z = SiMe$_3$) in the presence of a photocatalyst, such as for example triphenylpyrilium (TPP), a suitable acid such as for example TMSOTf, and a suitable solvent or solvent mixture, such as hexafluoroisopropanl (HFIP) and CH$_3$CN under blue light irradiation.

In the preparation of compounds of the present invention, protection of remote functionality (e.g., primary amine) of intermediates may be necessary. The need for such protection will vary depending on the nature of the remote functionality and the conditions of the preparations methods. Suitable amino-protecting groups (NH-Pg) include t-butoxycarbonyl (Boc), acetyl . . . . The need for such protection is readily determined by one skilled in the art.

It will be appreciated that where appropriate functional groups exist, compounds of various formulae or any intermediates used in their preparation may be further derivatised by one or more standard synthetic methods employing condensation, substitution, oxidation, reduction, or cleavage reactions. Particular substitution approaches include conventional alkylation, arylation, heteroarylation, acylation, sulfonylation, halogenation, nitration, formylation and coupling procedures.

The compounds of Formula (I) may be synthesized in the form of racemic mixtures of enantiomers which can be separated from one another following art-known resolution procedures. The racemic compounds of Formula (I) containing a basic nitrogen atom may be converted into the corresponding diastereomeric salt forms by reaction with a suitable chiral acid. Said diastereomeric salt forms are subsequently separated, for example, by selective or fractional crystallization and the enantiomers are liberated therefrom by alkali. An alternative manner of separating the enantiomeric forms of the compounds of Formula (I) involves liquid chromatography using a chiral stationary phase. Said pure stereochemically isomeric forms may also be derived from the corresponding pure stereochemically isomeric forms of the appropriate starting materials, provided that the reaction occurs stereospecifically.

In the preparation of compounds of the present invention, protection of remote functionality (e.g., primary or secondary amine) of intermediates may be necessary. The need for such protection will vary depending on the nature of the remote functionality and the conditions of the preparation methods. Suitable amino-protecting groups (NH-Pg) include acetyl, trifluoroacetyl, t-butoxycarbonyl (Boc), benzyloxycarbonyl (CBz) and 9-fluorenylmethyleneoxycarbonyl (Fmoc). The need for such protection is readily determined by one skilled in the art. For a general description of protecting groups and their use, see T. W. Greene and P. G. M. Wuts, Protective Groups in Organic Synthesis, 4th ed., Wiley, Hoboken, New Jersey, 2007.

Pharmacology

It has been found that the compounds of the present invention inhibit Hpk1 activity.

An Hpk1 inhibitor is a compound that reduces Hpk1 functions, such as the ability to recruit proteins to the TCR and phosphorylate proteins like SLP76 and GADS.

The compounds of the present invention inhibit the Hpk1 kinase. Therefore, the compounds may be useful in the treatment or prevention, in particular in the treatment, of diseases that are susceptible to the effects of the immune system, such as cancer and viral infection.

The compounds of the present invention may enhance an immune response.

The compounds of the present invention may increase T cell activity.

The compounds of the present invention may have antitumoral properties through immune modulation.

In particular the compounds according to the present invention or pharmaceutical compositions thereof may be useful for treating or preventing, in particular treating, of diseases such as lung cancer, melanoma, head and neck cancer, esophageal cancer, bladder and urothelial cancer, liver cancer, kidney cancer, prostate cancer and hematopoietic cancer.

In some embodiments, the inhibition of HPK1 by a provided compound may be useful in treating or preventing, in particular treating, the following non-limiting list of cancers: breast cancer, lung cancer, esophageal cancer, bladder cancer, hematopoietic cancer, lymphoma, medulloblastoma, rectum adenocarcinoma, colon adenocarcinoma, gastric cancer, pancreatic cancer, liver cancer, adenoid cystic carcinoma, lung adenocarcinoma, head and neck squamous cell carcinoma, brain tumors, hepatocellular carcinoma, renal cell carcinoma, melanoma, oligodendroglioma, ovarian clear cell carcinoma, and ovarian serous cystadenoina.

Examples of cancers which may be treated or prevented, in particular treated, include, but are not limited to, acoustic neuroma, adenocarcinoma, adrenal gland cancer, anal cancer, angiosarcoma (e.g., lymphangio sarcoma, lymphangioendothelio sarcoma, hemangio sarcoma), appendix cancer, benign monoclonal gammopathy, biliary cancer (e.g., cholangiocarcinoma), bladder cancer, breast cancer (e.g., adenocarcinoma of the breast, papillary carcinoma of the breast, mammary cancer, medullary carcinoma of the breast), brain cancer (e.g., meningioma; glioma, e.g., astrocytoma, oligodendroglioma; medulloblastoma), bronchus cancer, carcinoid tumor, cervical cancer (e.g., cervical adenocarcinomna), chordoma, choriocarcinoma, craniopharyngioma, colorectal cancer (e.g., colon cancer, rectal cancer, colorectal adenocarcinoma), epithelial carcinoma, ependymoma, endothelio sarcoma (e.g., Kaposi's sarcoma, multiple idiopathic hemorrhagic sarcoma), endometrial cancer (e.g., uterine cancer, uterine sarcoma), esophageal cancer (e.g., adenocarcinona of the esophagus, Barrett's adenocarinoma), Ewing sarcoma, eye cancer (e.g., intraocular melanoma, retinoblastoma), familiar hypereosinophilia, gall bladder cancer, gastric cancer (e.g., stomach adenocarcinoma), gastrointestinal stromal tumor (GIST), head and neck cancer (e.g., head and neck squamous cell carcinoma, oral cancer (e.g., oral squamous cell carcinoma (OSCC), throat cancer (e.g., pharyngeal cancer, laryngeal cancer, nasopharyngeal cancer, oropharyngeal cancer)), hematopoietic cancers (e.g., leukemia such as acute lymphocytic leukemia (ALL) (e.g., B-cell ALL, T-cell ALL), acute myelocytic leukemia (AML) (e.g., B-cell AML, T-cell AML), chronic myelocytic leukemia (CML) (e.g., B-cell CML, T-cell CML), and chronic lymphocytic leukemia (CLL) (e.g., B-cell CLL, T-cell CLL); lymphoma such as Hodgkin lymphoma (HL) (e.g., B-cell HL, T-cell HL) and non-Hodgkin lymphoma (NHL) (e.g., B-cell NHL such as diffuse large cell lymphoma (DLCL) (e.g., diffuse large B-cell lymphoma (DLBCL)), follicular lymphoma, chronic lymphocytic leukemia/small lymphocytic lymphoma (CLL/SLL), mantle cell lymphoma (MCL), marginal zone B-cell lymphomas (e.g., mucosa-associated lymphoid tissue (MALT) lymphomas, nodal marginal zone B-cell lymphoma, splenic marginal zone B-cell lymphoma), primary mediastinal B-cell lymphoma, Burkitt lymphoma, lymphoplasmacytic lymphoma (i.e., "Waldenstrom's macro globulinemia"), immunoblastic large cell lymphoma, hairy cell leukemia (HCL), precursor B-lymphoblastic lymphoma and primary central nervous system (CNS) lymphoma; and T-cell NHL such as precursor T-lymphoblastic lymphoma/leukemia, peripheral T-cell lymphoma (PTCL) (e.g., cutaneous T-cell lymphoma (CTCL) (e.g., mycosis fungiodes, Sezary syndrome), angioimmunoblastic T-cell lymphoma, extranodal natural killer T-cell lymphoma, enteropathy type T-cell lymphoma, subcutaneous panniculitis-like T-cell lymphoma, anaplastic large cell lymphoma); a mixture of one or more leukemia/lymphoma as described above; and multiple myeloma (MM)), heavy chain disease (e.g., alpha chain disease, gamma chain disease, mu chain disease), hemangioblastoma, inflammatory myofibroblastic tumors, immunocytic amyloidosis, kidney cancer (e.g., nephroblastoma a.k.a. Wilms' tumor, renal cell carcinoma), liver cancer (e.g., hepatocellular cancer (HCC), malignant hepatoma), lung cancer (e.g., bronchogenic carcinoma, non-small cell lung cancer (NSCLC), squamous lung cancer (SLC), adenocarcinoma of the lung, Lewis lung carcinoma, lung neuroendocrine tumors: typical carcinoid, atypical carcinoid, small cell lung cancer (SCLC), and large cell neuroendocrine carcinoma), leiomyosarcoma (LMS), mastocytosis (e.g., systemic mastocytosis), myelodysplastic syndromes (MDS), mesothelioma, myeloproliferative disorder (MPD) (e.g., polycythemia Vera (PV), essential thrombocytosis (ET), agnogenic myeloid metaplasia (AMM) a.k.a. myelofibrosis (MF), chronic idiopathic myelofibrosis, chronic myelocytic leukemia (CML), chronic neutrophilic leukemia (CNL), hypereosinophilic syndrome (HES)), neuroblastoma, neurofibroma (e.g., neurofibromatosis (NF) type 1 or type 2, schwannomatosis), neuroendocrine cancer (e.g., gastroenteropancreatic neuroendoctrine tumor (GEP-NET), carcinoid tumor), osteosarcoma, ovarian cancer (e.g., cystadenocarcinoma, ovarian embryonal carcinoma, ovarian adenocarcinoma), papillary adenocarcinoma, pancreatic cancer (e.g., pancreatic andenocarcinoma, intraductal papillary mucinous neoplasm (IPMN), Islet cell tumors), penile cancer (e.g., Paget's disease of the penis and scrotum), pinealoma, primitive neuroectodermal tumor (PNT), prostate cancer (e.g., prostate adenocarcinoma), rectal cancer, rhabdomyosarcoma, salivary gland cancer, skin cancer (e.g., squamous cell carcinoma (SCC), keratoacanthoma (KA), melanoma, basal cell carcinoma (BCC)), small bowel cancer (e.g., appendix cancer), soft tissue sarcoma (e.g., malignant fibrous histiocytoma (MFH), liposarcoma, malignant peripheral nerve sheath tumor (MPNST), chondrosarcoma, fibrosarcoma, myxosarcoma), sebaceous gland carcinoma, sweat gland carcinoma, synovioma, testicular cancer (e.g., seminoma, testicular embryonal carcinoma), thyroid cancer (e.g., papillary carcinoma of the thyroid, papillary thyroid carcinoma (PTC), medullary thyroid cancer), urethral cancer, vaginal cancer, and vulvar cancer (e.g., Paget's disease of the vulva).

The compounds according to the present invention or pharmaceutical compositions thereof, may also have therapeutic applications in combination with immune modulatory agents, such as inhibitors of the PD1/PDL1 immune checkpoint axis, for example antibodies (or peptides) that bind to and/or inhibit the activity of PD-1 or the activity of PD-1.

The compounds according to the present invention or pharmaceutical compositions thereof, may also be combined with radiotherapy or chemotherapeutic agents.

The compounds according to the present invention or pharmaceutical compositions thereof, may may also be combined with other agents that stimulate or enhance the immune response, such as vaccines.

The compounds according to the present invention or pharmaceutical compositions thereof, may calso be used to enhance the antigen presenting properties of dendritic cells produced ex vivo.

The compounds according to the present invention or pharmaceutical compositions thereof may be useful for treating or preventing, in particular treating, of infectious diseases, such as viral, bacterial, fungal, and parasitic infections. The compounds according to the present invention or pharmaceutical compositions thereof may be useful for treating or preventing, in particular treating, of chronic infections. The compounds according to the present invention or pharmaceutical compositions thereof may be useful for treating or preventing, in particular treating, of chronic viral infections.

The invention relates to compounds of Formula (I) and pharmaceutically acceptable addition salts, N-oxides, and solvates thereof, for use as a medicament.

The invention relates to compounds of Formula (I) and pharmaceutically acceptable addition salts, N-oxides, and solvates thereof for use in the inhibition of HPK1 activity.

The compounds of the present invention can be "anti-cancer agents", which term also encompasses "anti-tumor cell growth agents" and "anti-neoplastic agents".

The invention relates to compounds of Formula (I) and pharmaceutically acceptable addition salts, N-oxides, and solvates thereof, for use in the treatment of diseases mentioned above.

The invention relates to compounds of Formula (I) and pharmaceutically acceptable addition salts, N-oxides, and solvates thereof, for the treatment or prevention, in particular for the treatment, of said diseases.

The invention relates to compounds of Formula (I) and pharmaceutically acceptable addition salts, N-oxides, and solvates thereof, for the treatment or prevention, in particular in the treatment, of HPK1 mediated diseases or conditions.

The invention relates to compounds of Formula (I) and pharmaceutically acceptable addition salts, N-oxides, and solvates thereof, for the manufacture of a medicament.

The invention relates to compounds of Formula (I) and pharmaceutically acceptable addition salts, N-oxides, and solvates thereof, for the manufacture of a medicament for the inhibition of HPK1.

The invention relates to compounds of Formula (I) and pharmaceutically acceptable addition salts, N-oxides, and solvates thereof, for the manufacture of a medicament for the treatment or prevention, in particular for the treatment, of any one of the disease conditions mentioned hereinbefore.

The invention relates to compounds of Formula (I) and pharmaceutically acceptable addition salts, N-oxides, and solvates thereof, for the manufacture of a medicament for the treatment of any one of the disease conditions mentioned hereinbefore.

The invention relates to compounds of Formula (I) and pharmaceutically acceptable addition salts, N-oxides, and solvates thereof, can be administered to mammals, preferably humans, for the treatment or prevention of any one of the diseases mentioned hereinbefore.

In view of the utility of the compounds of Formula (I) and pharmaceutically acceptable addition salts, N-oxides, and solvates thereof, there is provided a method of treating warm-blooded animals, including humans, suffering from or a method of preventing warm-blooded animals, including humans, to suffer from any one of the diseases mentioned hereinbefore.

Said methods comprise the administration, i.e. the systemic or topical administration, preferably oral administration, of an effective amount of a compound of Formula (I) or a pharmaceutically acceptable addition salt, an N-oxide, or a solvate thereof, to warm-blooded animals, including humans.

One skilled in the art will recognize that a therapeutically effective amount of the compounds of the present invention is the amount sufficient to have therapeutic activity and that this amount varies inter alias, depending on the type of disease, the concentration of the compound in the therapeutic formulation, and the condition of the patient. An effective therapeutic daily amount would be from about 0.005 mg/kg to 100 mg/kg. In particular, an effective therapeutic daily amount would be 25 mg/kg BID (twice a day) or 50 mg/kg BID. In particular, an effective therapeutic daily amount would be 50 mg/kg QD (once a day) or 100 mg/kg QD. The amount of a compound according to the present invention, also referred to herein as the active ingredient, which is required to achieve a therapeutically effect may vary on case-by-case basis, for example with the particular compound, the route of administration, the age and condition of the recipient, and the particular disorder or disease being treated. A method of treatment may also include administering the active ingredient on a regimen of between one and four intakes per day. In these methods of treatment the compounds according to the invention are preferably formulated prior to administration.

The present invention also provides compositions for preventing or treating the disorders referred to herein. Said compositions comprising a therapeutically effective amount of a compound of Formula (I), or a pharmaceutically acceptable addition salt, an N-oxide, or a solvate thereof, and a pharmaceutically acceptable carrier or diluent.

While it is possible for the active ingredient to be administered alone, it is preferable to present it as a pharmaceutical composition. Accordingly, the present invention further provides a pharmaceutical composition comprising a compound according to the present invention, together with a pharmaceutically acceptable carrier or diluent. The carrier or diluent must be "acceptable" in the sense of being compatible with the other ingredients of the composition and not deleterious to the recipients thereof.

The pharmaceutical compositions may be prepared by any methods well known in the art of pharmacy, for example, using methods such as those described in Gennaro et al. Remington's Pharmaceutical Sciences (18$^{th}$ ed., Mack Publishing Company, 1990, see especially Part 8: Pharmaceutical preparations and their Manufacture).

The compounds of the present invention may be administered alone or in combination with one or more additional therapeutic agents. Combination therapy includes administration of a single pharmaceutical dosage formulation which contains a compound according to the present invention and one or more additional therapeutic agents, as well as administration of the compound according to the present invention and each additional therapeutic agent in its own separate pharmaceutical dosage formulation.

Therefore, an embodiment of the present invention relates to a product containing as first active ingredient a compound according to the invention and as further active ingredient one or more anticancer agent, as a combined preparation for simultaneous, separate or sequential use in the treatment of patients suffering from cancer.

The one or more other medicinal agents and the compound according to the present invention may be administered simultaneously (e.g. in separate or unitary compositions) or sequentially in either order. In the latter case, the two or more compounds will be administered within a period and in an amount and manner that is sufficient to ensure that an advantageous or synergistic effect is achieved. It will be appreciated that the preferred method and order of administration and the respective dosage amounts and regimes for each component of the combination will depend on the particular other medicinal agent and compound of the present invention being administered, their route of administration, the particular condition, in particular tumour, being treated and the particular host being treated.

The following examples further illustrate the present invention.

EXAMPLES

Several methods for preparing the compounds of this invention are illustrated in the following examples. Unless otherwise noted, all starting materials were obtained from commercial suppliers and used without further purification, or alternatively can be synthesized by a skilled person by using well-known methods.

When a stereocentre is indicated with 'RS' this means that a racemic mixture was obtained at the indicated centre, unless otherwise indicated.

Hereinafter, "DCM" means dichloromethane; "DME" means 1,2-dimethoxyethane; "DMF-DMA" means N,N-dimethylformamide dimethyl acetal; "ACN" means acetonitrile; "Ac" means acetyl; "LAH" means lithium aluminium hydride; "sol." means solution; "prep." means preparative; "aq." means aqueous; "Int." Means Intermediate; "Co." means compound; "r.t." means room temperature; "r.m." means reaction mixture; "KOAc" means potassium acetate; "AcONH$_4$" means ammonium acetate; "BisPin" means bis(pinacolato)diboron; "DCE" means 1,2-dichloroethane; "DIPE" means diisopropyl ether; "Boc" means tert-butoxycarbonyl; "DMA" means dimethylacetamide; "HBr" means hydrogen bromide; "MeCN" means acetonitrile; "EDCI" means 1-Ethyl-3-(3-dimethylaminopropyl)carbodiimide; "HOBt" means 1-hydroxy-1H-benzotriazole; "TMS" means trimethylsilyl; "DIPE" means diisopropylether; "DMAP" means 4-(dimethylamino)pyridine; "MeOH" means methanol; "LC" means liquid chromatography; "LCMS" means Liquid Chromatography/Mass spectrometry; "HPLC" means high-performance liquid chromatography; "RP-HPLC" means reversed phase HPLC; "NH$_4$Cl" means ammonium chloride; "H$_2$O" means water "TFA" means trifluoroacetic acid; "m.p." means melting point; "N$_2$" means nitrogen; "Na$_2$SO$_4$" means sodium sulfate; "AcOH" means acetic acid; "MeOD" means deuterated methanol; "D2" means deuterium; "RP" means reversed phase; "min" means minute(s); "EtOAc" or "AcOEt" means ethyl acetate; "Et$_3$N" means triethylamine; "EtOH" means ethanol; "THF" means tetrahydrofuran; "MnO$_2$" means manganese dioxide; "Celite®" means diatomaceous earth; "MgSO$_4$" means magnesium sulfate; "NH$_4$OH" means ammonium hydroxide; "K$_2$CO$_3$" means potassium carbonate; "DMF" means N,N-dimethyl formamide; "Na$_2$SO$_3$" means sodium sulfite; "NaHCO$_3$" means sodium bicarbonate; "Na$_2$CO$_3$" means sodium carbonate; "HCl" means hydrogen chloride "NaOH" means sodium hydroxide; "HCOOH" means formic acid; "DMSO" means dimethyl sulfoxide; "iPrOH" means 2-propanol; "iPrNH$_2$" means isopropylamine; "SFC" means Supercritical Fluid Chromatography; "CO$_2$" means carbon dioxide; "Et$_3$N" means triethylamine; "DIPEA" means N,N-diisopropylethylamine; "Pd(PPh$_3$)$_4$" means tetrakis(triphenylphosphine)palladium; "w/v" means weight/volume; "[Ir(dtbbpy)(ppy) 2]PF$_6$" means (4,4'-Di-t-butyl-2,2'-bipyridine)bis[2-(2-pyridinyl-kN)phenyl-kC]iridium(III) hexafluorophosphate, "SLAP™" means 2-(((Trimethylsilyl)methyl)thio)ethanamine; "SLAP" means silicon amine protocol; "SLAP hydropyridopyrazine" means (1-((trimethylsilyl)methyl)piperidin-2-yl)methanamine; "m-CPBA" means 3-chloroperbenzoic acid; "PPh$_3$" means triphenylphosphine; "Et$_2$O" means diethyl ether; "Pd/C" means palladium on carbon; "Et" means ethyl; "Me" means methyl; "h" means hours; "PdCl$_2$(dppf)" means [1,1'-bis(diphenylphosphino-κP)ferrocene]dichloropalladium; "quant." means quantitative.

Preparation of the Intermediates and the Final Compounds

Synthesis of Intermediate 1

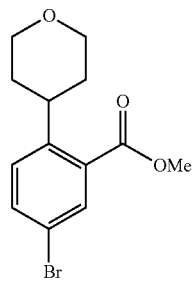 [SMILES: COC(=O)c1cc(Br)ccc1C1CCOCC1]

To a mixture of Zn (69.9 g, 1.07 mol) in DMA (500 mL) was added ethylene dibromide (16.5 g, 88 mmol, 6.64 mL) in one portion under $N_2$. Then TMSCl (6.83 g, 62.9 mmol, 8.0 mL) was added slowly and the mixture was stirred for 30 min at 25° C. A solution of 4-iodotetrahydropyran (200 g, 943 mmol) in DMA (500 mL) was added dropwise slowly (30 min) to maintain temperature below 50° C., the resulting mixture was stirred at 25° C. for 1.5 h and then added via a cannula to a solution of methyl 5-bromo-2-iodobenzoate (214.4 g, 629 mmol), Pd(dppf)$Cl_2 \cdot CH_2Cl_2$ (25.7 g, 31.4 mmol) and CuI (12.0 g, 62.9 mmol) in DMA (2400 mL) under $N_2$, the color of the mixture turned brown, then the mixture was heated and stirred at 80° C. for 14 h under $N_2$. Six batches were combined together. The mixture was cooled to rt and diluted with EtOAc (10 L). A saturated aqueous solution of $NH_4Cl$ (18 L) and $H_2O$ (10 L) were added and the mixture was stirred for 30 mins, then filtered through a pad of Celite©. The cake was washed with EtOAc (5 L*2), the filtrate was extracted with EtOAc (8 L*4), the combined organic phase was washed with brine (15 L*2), dried with anhydrous $Na_2SO_4$, filtered and concentrated in vacuum to give the crude product. The crude product was purified by silica gel chromatography eluted with Petroleum ether:EtOAc=100:0-93:7 to give intermediate 1 (700 g, 61% yield) as a yellow solid.

Synthesis of Intermediate 2

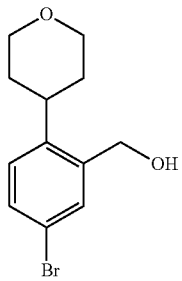 [SMILES: OCc1cc(Br)ccc1C1CCOCC1]

To a mixture of intermediate 1 (220 g, 735 mmol) in THF (2200 mL) was added portionwise LAH (27.9 g, 735 mmol) at 0-10° C. over 30 min. The grey suspension was stirred at 0-30° C. for 1 h. The mixture was cooled to 0° C. and $H_2O$ (800 mL) was added dropwise and then the mixture was stirred for 30 min. The three batches were worked together. The mixture was filtered and the cake was washed with EtOAc (3 L*3), the filtrated was extracted with EtOAc (2 L*3), the combined organic phase was washed with brine (2 L*2), dried with $Na_2SO_4$, filtered and concentrated in vacuum. The crude product was used for next step without purification to give intermediate 2 (576 g, 87% yield) as a yellow oil.

Synthesis of Intermediate 3

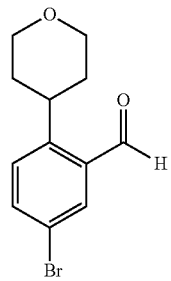 [SMILES: O=Cc1cc(Br)ccc1C1CCOCC1]

To a mixture of intermediate 2 (325 g, 1.2 mol) in $CH_2Cl_2$ (3200 mL) was added $MnO_2$ (834 g, 9.6 mol) in one portion. The black mixture was stirred at 30° C. for 34 h. The two batches were worked together. The mixture was filtered through Celite and the cake was washed with $CH_2Cl_2$ (2 L*3), the filtrate was concentrated in vacuum. The crude product was purified by silica gel column chromatography (Petroleum ether/Ethyl acetate=100:0-85:15) to give 560 g as a crude product which was stirred with Petroleum ether (800 mL) at 30° C. for 4 h, filtered and the cake was washed with Petroleum ether (200 mL*2) and concentrated in high vacuum to give intermediate 3 (502 g, 1.85 mol, 77% yield) as a white solid.

Synthesis of Intermediate 4

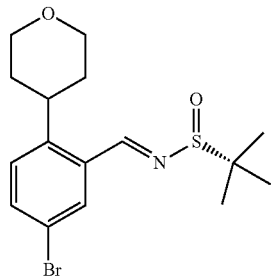

Titanium (IV) ethoxide (64.5 mL, 0.308 mol) was added dropwise to a solution of intermediate 3 (20.7 g, 77 mmol) and (S)-(−)-t-butylsulfinamide (18.06 g, 0.149 mol). The solution was stirred at rt overnight and the mixture was poured into brine and Ethyl acetate was added. The organic layer was separated, dried over $MgSO_4$, filtered and evaporated until dryness. The residue was purified by preparative LC (330 g of irregular SiOH 35-40 μm GraceResolv, mobile phase: gradient from 100% DCM to DCM 95%/MeOH 5%/$NH_4OH$ 0.1%. The pure fractions were collected and the solvent evaporated until dryness to give intermediate 4 (30 g, y=quant.)

Synthesis of Intermediate 5

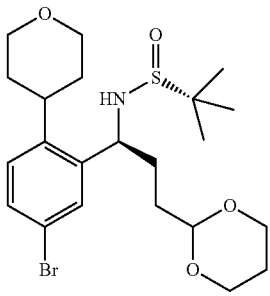

A solution of intermediate 4 (41 g, 0.11 mol) in THF (500 mL) was added dropwise at −78° C. to a solution of (1,3-dioxan-2-ylethyl)magnesium bromide (96.6 g, 0.44 mol) in THF (550 mL). The reaction mixture was stirred at −78° C. for 0.5 h. A saturated solution of NH$_4$Cl was added and the reaction mixture was extracted with ethyl acetate, the organic layer was separated, dried over MgSO$_4$, filtered and evaporated until dryness to give intermediate 5 (60 g, y=quant.)

Synthesis of Intermediate 6

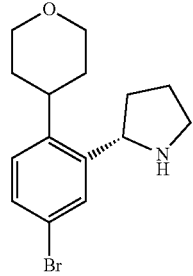 [SMILES: Brc1ccc(C2CCOCC2)c([C@@H]2CCCN2)c1]

Intermediate 5 (66.4 g, 0.135 mol) was slowly added to a mixture of TFA (597 mL) and water (33 mL) to maintain temperature below 25° C. The reaction mixture was stirred at rt for 40 min. Triethylsilane (221 mL, 1.38 mol) was added and the reaction mixture vigorously stirred at rt overnight. The reaction mixture was evaporated till dryness. A purification was performed via preparative LC (stationary phase: irregular SiOH 35-40 μM 220+330 g, GraceResolv, mobile phase: from DCM 100% to DCM 80%/MeOH/20%/NH4OH 0.10%). The pure fractions were evaporated and taken up in DCM and water, basified with K$_2$CO$_3$. The organic layer was separated, dried over MgSO$_4$, filtered and evaporated to give intermediate 6 (33.2 g, 79%). [α]$_d$: −47.5° (589 nm, c 0.36 w/v %, DMF, 20° C.)

Synthesis of Intermediate 7

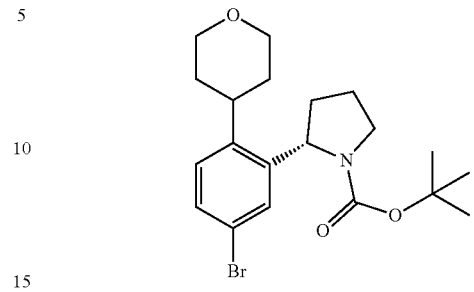

Di-tert-butyl dicarbonate (44.3 g, 0.203 mol) was added to a solution of intermediate 6 (21 g, 67.7 mmol) and 4-dimethylaminopyridine (1.65 g 13.5 mmol) in DCM (680 mL). The reaction mixture was stirred at rt for 24 h. Water and DCM were added, the organic layer was separated, dried over MgSO$_4$, filtered and evaporated until dryness. The residue was crystallized in diethylether, filtered and dried to give 22.2 g of intermediate 7 (80%).

Synthesis of Intermediate 8

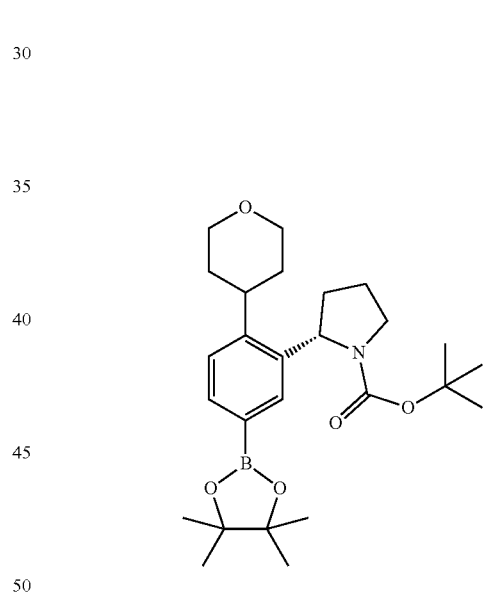

A mixture of intermediate 7 (4 g, 9.7 mmol), bis(pinacolato)diboron (3 g, 11.8 mmol), PdCl$_2$(dppf) (0.8 g, 0.98 mmol) and potassium acetate (2.87 g, 29.2 mmol) in 1,4-dioxane (90 mL) was stirred at 90° C. under nitrogen atmosphere in a schlenk flask for 15 hours. The reaction mixture was cooled to rt, water was added. The aqueous layer was extracted with ethyl acetate. The organic layer was dried over MgSO$_4$, filtered and evaporated until dryness. The residue was purified by preparative LC (SiOH 35-40 μm GraceResolv, from heptane/AcOEt 80/20 to 50/50). The fractions were collected and evaporated until dryness to give 5.3 g of intermediate 8 (quant.).

Synthesis of Intermediate 9

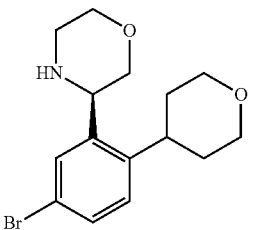

Intermediate 3 (7.39 g, 27.46 mmol) and molecular sieves 4 A (3.6 g) were added to [(2-aminoethoxy)methyl]tributyl stannane (10 g, 27.46 mmol) in DCM (95 mL). The reaction mixture was stirred at rt for 6 h, filtered over Celite and the filtrate was evaporated till dryness to give the imine. (R,R)-2,2'-Isopropylidenebis(4-phenyl-2-oxazoline) (1.84 g, 5.5 mmol) was added in one portion to a suspension of copper (II) triflate in hexafluoroisopropanol (50 mL). To this mixture was added the imine in hexafluoroisopropanol (50 mL). The reaction mixture was stirred at rt overnight. 1N NaOH was added, the mixture was stirred and extracted with DCM, the organic layer was separated, dried over $MgSO_4$, filtered and evaporated till dryness. A purification was performed via preparative LC (Stationary phase: SiOH 35-40 µm, 330 g interchim, Mobile phase: 100% DCM to 50/50 DCM/AcOEt). The fractions were collected and evaporated until dryness (8.5 g, 95%). Both enantiomers were separated via chiral SFC (Stationary phase: CHIRALPAK AD-H 5 µm 250*30 mm, Mobile phase: 70% CO2, 30% iPOH (0.3% iPrNH$_2$)) yielding 1.86 g of enantiomer A (20.8%, $[\alpha]_d$: +7.05° (589 nm, c 0.19 w/v %, DMF, 20° C.) and 4.63 g of enantiomer B (intermediate 9, 51.7%, $[\alpha]_d$: −76.67° (589 nm, c 0.27 w/v %, DMF, 20° C.).

Synthesis of Intermediate 10

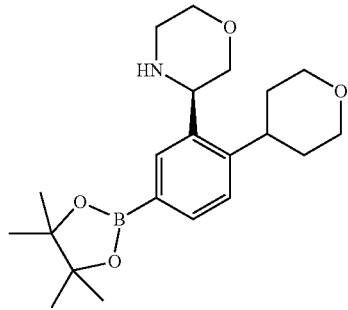 [SMILES: CC1(C)OB(c2ccc(C3CCOCC3)c([C@@H]3COCCN3)c2)OC1(C)C]

A mixture of intermediate 9 (0.28 g, 0.86 mmol), bis(pinacolato)diboron (0.261 g, 1 mmol), $PdCl_2(dppf)$ (0.045 g, 0.05 mmol), potassium acetate (0.252 mg, 2.6 mmol) in 1,4-dioxane (8 mL) was stirred at 120° C. using one single mode microwave (Biotage Initiator EXP 60) with a power output ranging from 0 to 400 W for 45 min. The reaction mixture was filtered over celite, $H_2O$ was added to the filtrate, the filtrate was extracted with ethyl acetate, the organic layer was separated, dried over $MgSO_4$, filtered and evaporated. Intermediate 10 was used as it for next step.

Synthesis of Intermediate 11

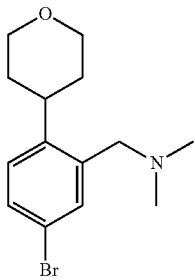 [SMILES: CN(C)Cc1cc(Br)ccc1C1CCOCC1]

To a solution of 5-amino-N,N-dimethyl-2-(tetrahydro-2H-pyran-4-yl)-benzenemethanamine (6.82 g, 26.75 mmol) in HBr (48% in water, 2 mL) cooled in an ice bath, was added dropwise sodium nitrite (2.03 g, 29.42 mmol) in water. The mixture was stirred for 30 min at 0-4° C. Then this mixture was added dropwise to a solution of copper bromide (2.12 g, 14.71 mmol) in HBr (48% in water, 5.5 mL) cooled in an ice bath. The reaction mixture was stirred at 100° C. for 2 hours, then poured into aqueous NaOH (10 mol/L, 200 mL) and was extracted with ethyl acetate (100 mL*5). The organic layer was dried over $MgSO_4$, filtered and evaporated until dryness. The residue was purified by column chromatography over silica gel (eluent: petrol/ethyl acetate=100:0-2:1) yielding intermediate 11 (6.02 g, 76.6%) as a white solid.

Synthesis of Intermediate 12

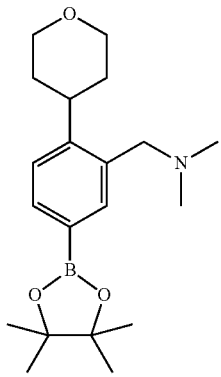

A mixture of intermediate 11 (1.5 g, 5.1 mmol), bis(pinacolato)diboron (1.5 g, 6.1 mmol), $PdCl_2(dppf)$ (0.267 g, 0.3 mmol) and potassium acetate (1.5 g, 15.3 mmol) in 1,4-dioxane (20 mL) was stirred at 120° C. using one single mode microwave (Biotage Initiator EXP 60) with a power output ranging from 0 to 400 W for 45 min. The reaction mixture was cooled to rt, filtered over celite and water was added. The organic layer was dried over $MgSO_4$, filtered and evaporated until dryness. The residue was cristallized in DIPE/pentane, the precipitate was filtered off (catalyst derivatives) and the filtrate was evaporated and used as it for next step.

Synthesis of Intermediate 13

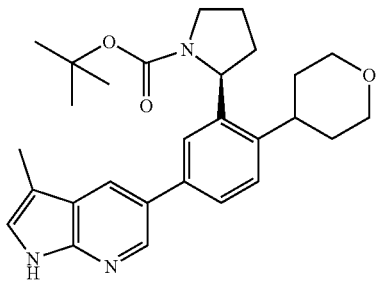 [SMILES: Cc1c[nH]c2ncc(-c3ccc(C4CCOCC4)c([C@@H]4CCCN4C(=O)OC(C)(C)C)c3)cc12]

In a sealed tube, a mixture of 5-bromo-3-methyl-7-azaindole (0.94 g, 4.45 mmol), intermediate 8 (2.04 g, 4.45 mmol), $PdCl_2(dppf)$ (0.365 g, 0.445 mmol), sodium carbonate (4.7 g, 9.4 mmol) in 1,4-dioxane was heated at 90° C. for 15 hours. Water and potassium carbonate were added and the mixture was extracted with AcOEt. The organic layer was dried over $MgSO_4$, filtered and evaporated until dryness. The residues was purified by preparative LC (40 g of SiOH 30 μm, from 100% DCM to 95% DCM/5% MeOH/0.1% $NH_4OH$); the fractions were collected and evaporated until dryness to yield intermediate 13 (1.41 g, 69%).

The following intermediates were prepared by using an analogous procedure

| Intermediate | Structure | Quantity | Yield |
| --- | --- | --- | --- |
| Intermediate 14 Starting from intermediate 8 and 5-Bromo-2-methyl-7-azaindole | | 0.32 g | 83% |
| Intermediate 15 Starting from intermediate 8 and 5-bromo-1H-pyrrolo[2,3-b]pyridine-3-carbonitrile | | 0.22 g | 94% |
| Intermediate 16 Starting from intermediate 8 and 1H-Pyrrolo[2,3-b]pyridine-3-acetonitrile, 5-bromo- | | 0.34 g | 82% |
| Intermediate 17 Starting from intermediate 8 and 2-Bromo-5H-pyrrolo[2,3-b]pyrazine | | 0.067 g | 34% |

| Intermediate | Structure | Quantity | Yield |
|---|---|---|---|
| Intermediate 18 Starting from intermediate 8 and 5-Bromo-1H-pyrrolo[2,3-b]pyridine | | 0.134 g | 55% |
| Intermediate 19 Starting from intermediate 8 and 5-Bromo-3H-pyrazolo[3,4-b]pyridine | | 0.032 g | 14% |

Synthesis of Intermediate 20

1-amino-2-methylpropan-2-ol (0.599 mL; 4.56 mmol) was added to a stirring solution of 5-Bromo-1H-pyrrolo[2,3-b]pyridine-3-carboxylic acid (1 g, 4.15 mmol), DIPEA (2.17 mL, 12.4 mmol), EDCI (1.59 g, 8.3 mmol), HOBt (1.12 g, 8.3 mmol) in DCM (15 mL) and DMSO (1 mL). The reaction mixture was stirred at rt overnight. The solvents were evaporated. The mixture was diluted with aqueous sat. Na$_2$CO$_3$ (5 mL). The layers were separated and the aqueous phase extracted with AcOEt. The organic layer was dried over MgSO$_4$, filtered and evaporated until dryness, purified by flash column chromatography uing DCM/DCM-MeOH 9:10% to 100% as a gradient. The desired fractions were collected and evaporated yielding intermediate 20 (1.2 g, 92%).

The following intermediates were prepared by an analogous procedure:

| Intermediate | Structure | Quantity | Yield |
|---|---|---|---|
| Intermediate 21 Starting from 5-Bromo-1H-pyrrolo[2,3-b]pyridine-3-carboxylic acid and [1-(aminomethyl)cyclobutyl]methanol | | 0.648 g | 89% |
| Intermediate 21a Starting from 5-Bromo-1H-pyrrolo[2,3-b]pyridine-3-carboxylic acid and N-Boc-N-methylethylenediamine | | 2.9 g | 55% |

Synthesis of Intermediate 22

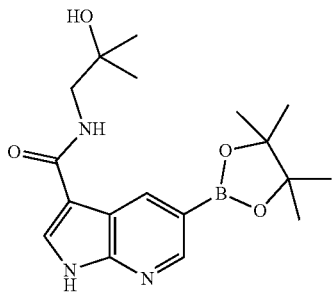 [SMILES: CC(C)(O)CNC(=O)c1c[nH]c2ncc(B3OC(C)(C)C(C)(C)O3)cc12]

To a solution of intermediate 20 (1 g, 3.2 mmol), bis(pinacolato)diboron (1.22 g, 4.8 mmol) and potassium acetate (0.94 g, 9.6 mmol) in 1,4-dioxane (15 mL) was added under nitrogen atmosphere PdCl$_2$(dppf) (0.26 g, 0.32 mmol). The reaction mixture was heated at 110° C. for 12 hours, cooled to room temperature. The mixture was filtered through a pad of Celite® and the filtrate was evaporated until dryness and used directly in the next step.

The following intermediates were prepared via an analogous procedure:

Synthesis of Intermediate 25

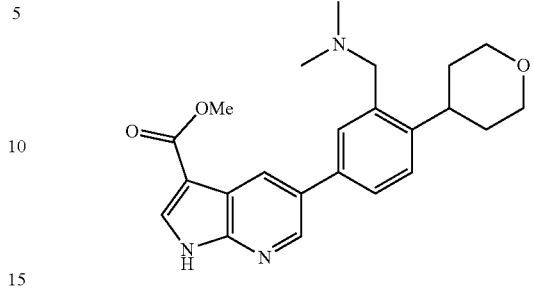

A mixture of intermediate 24 (4.86 g, 16.07 mmol), intermediate 11 (4.36 g, 14.61 mmol), PdCl$_2$(dppf) (0.598 g, 0.731 mmol), sodium carbonate (3.097 g, 29.22 mmol) in 1,4-dioxane (60 mL) and water (12 mL) was heated at 90° C. for 15 hours. Water was added and the mixture was extracted with DCM. The organic layer was dried over MgSO$_4$, filtered and evaporated until dryness. The residue was purified by flash chromatography (DCM/DCM-MeOH 9:1 gradient from 100/0 to 0/100); the fractions were collected and evaporated until dryness to yield intermediate 25 (4.0 g, 67%).

| Intermediate | Structure | Quantity |
|---|---|---|
| Intermediate 23 Starting from intermediate 21 | | Used directly in next step |
| Intermediate 24 Starting from Methyl 5-bromo-1H-pyrrolo[2,3-b]pyridine-3-carboxylate | | Used directly in next step |

Synthesis of Intermediate 26

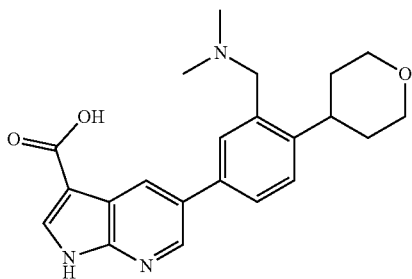 [SMILES: CN(C)Cc1cc(-c2cnc3[nH]cc(C(=O)O)c3c2)ccc1C1CCOCC1]

Lithium hydroxide monohydrate (6.04 g, 98.6 mmol) was added to a solution of intermediate 25 (2 g, 4.93 mmol) in methanol (100 mL) and water (30 mL). The reaction was stirred at 55° C. for 12 h. Methanol was evaporated, the mixture was diluted with AcOEt and water. The organic layer was discarded and the aqueous was acidified with HCl 6N and extracted with AcOEt. Both layers were filtrated and the solid obtained was dried under vacuum to yield intermediate 26 (1.12 g, 56%).

Synthesis of Intermediate 27

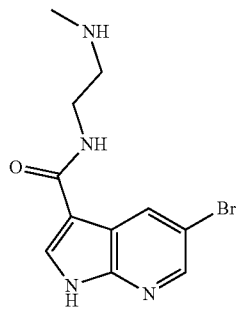 [SMILES: CNCCNC(=O)c1c[nH]c2ncc(Br)cc12]

TFA (11.2 mL, 146 mmol) was added to a solution of intermediate 21a (2.9 g, 7.3 mmol) in DCM (50 mL) at 0° C. The reaction mixture was stirred at rt overnight. The solvent was evaporated in vacuo and the intermediate was used in the next step without purification.

Synthesis of Intermediate 28

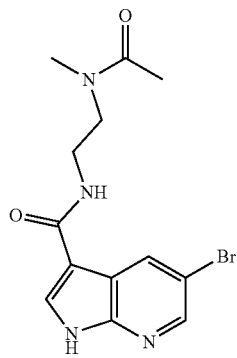 [SMILES: CC(=O)N(C)CCNC(=O)c1c[nH]c2ncc(Br)cc12]

Triethylamine (2.54 mL, 18.25 mmol) was added to a mixture of intermediate 27 (3 g, 7.3 mmol) and acetic anhydride (0.76 mL, 8.03 mmol) in DCM (25 mL). After evaporation of the solvents, the mixture was purified by flash chromatography over silica gel (gradient DCM/DCM:MeOH 9:1 from 100/0 to 0/100); The fractions were collected and evaporated until dryness to yield intermediate 28 (2.0 g, 73%).

The following intermediate was prepared via an analogous procedure as was used for intermediate 22:

| Intermediate | Structure | Quantity |
| --- | --- | --- |
| Intermediate 29 Starting from intermediate 28 | 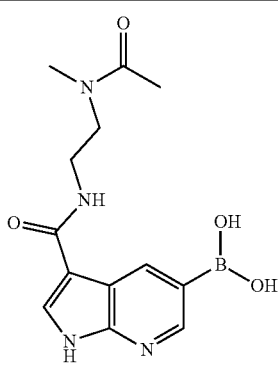 | Used directly in the next step |

Synthesis of Intermediate 30

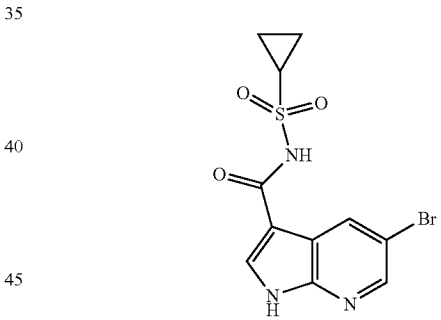

To as solution of 5-Bromo-1H-pyrrolo[2,3-b]pyridine-3-carboxylic acid (0.150 g, 0.622 mmol) in dry THF (3 mL) was added portionwise carbonyldiimidazole (0.151 g, 0.93 mmol). The mixture was stirred at rt for 2 hours and at 55° C. for 2 hours. Cyclopropanesulfonamide (0.151 g, 1.25 mmol) in THF (1 mL) and 1,8-Diazabicyclo[5.4.0]undec-7-ene (0.186 µL, 1.25 mmol) were added and the mixture was stirred at 50° C. for 24 h. 2 eq of cyclopropanesulfonamide and 1 eq. of 1,8-Diazabicyclo[5.4.0]undec-7-ene were added and the mixture was stirred at 75° C. for 36 h. After evaporation of THF, water and AcOEt were added. The mixture was purified by flash chromatography over silica gel (gradient DCM/DCM:MeOH 9:1 from 100/0 to 0/100). The fractions were collected and evaporated until dryness to yield intermediate 30 (0.37 g, 87%)

Synthesis of Intermediate 31

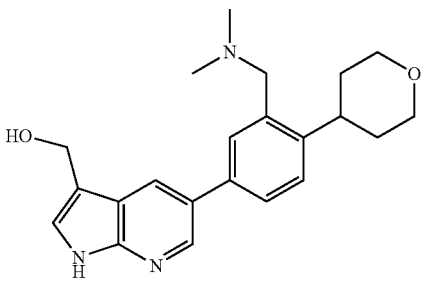 [SMILES: CN(C)Cc1cc(-c2cnc3[nH]cc(CO)c3c2)ccc1C1CCOCC1]

A solution of LAH (0.079 g, 2.1 mmol) in THF (2 mL) was added dropwise to a solution of intermediate 25 (0.75 g, 1.91 mmol) in THF (13 mL) at 0° C. The mixture was stirred at rt for 1 h. 1.5 eq of LAH was added and the reaction mixture stirred for two additional hours. Water was added and the aqueous phase extracted with DCM. The organic layer was dried over MgSO$_4$, filtered and evaporated until dryness. The mixture was purified by flash chromatography over silica gel (gradient DCM/DCM:MeOH 4:1 from 100/0 to 0/100). The fractions were collected and evaporated until dryness to yield intermediate 31 (0.43 g, 57%)

Synthesis of Intermediate 32

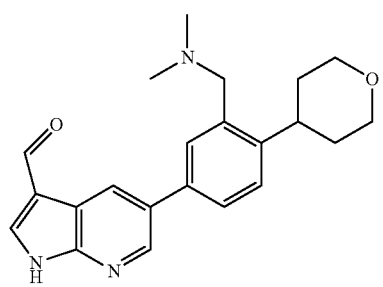 [SMILES: CN(C)Cc1cc(-c2cnc3[nH]cc(C=O)c3c2)ccc1C1CCOCC1]

A solution of intermediate 31 (0.43 g, 1.18 mmol), Dess-Martin periodinane (0.998 g, 2.35 mmol) in DCM (5 mL) was stirred at rt for 3 h. A saturated solution of NaHCO$_3$ was added and the aqueous phase extracted with AcOEt. The organic layer was dried over MgSO$_4$, filtered and evaporated until dryness. The mixture was purified by flash chromatography over silica gel (gradient DCM/DCM:MeOH 4:1 from 100/0 to 0/100%). The fractions were collected and evaporated until dryness to yield intermediate 32 (0.131 g, 26%).

Synthesis of Intermediate 33

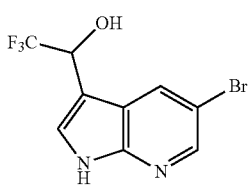 [SMILES: OC(c1c[nH]c2ncc(Br)cc12)C(F)(F)F]

To a solution of Ethanone, 1-(5-bromo-1H-pyrrolo[2,3-b]pyridin-3-yl)-2,2,2-trifluoro (1.21 g, 4.1 mmol) in MeOH (20 mL) was added at 0° C. portionwise sodium borohydride (0.772 g, 20.4 mmol). The mixture was stirred ar rt for 2 h. Water was added and the aqueous phase extracted with DCM. The organic layer was dried over MgSO$_4$, filtered and evaporated until dryness. The mixture was purified by flash chromatography over silica gel (gradient DCM/DCM:MeOH 4:1 from 100/0 to 0/100). The fractions were collected and evaporated until dryness to yield intermediate 33 (1.04 g, 86%)

Synthesis of Intermediate 34

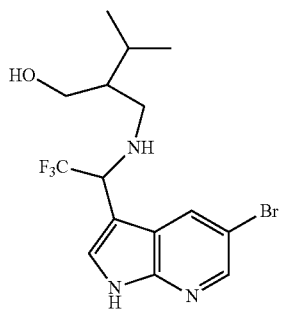 [SMILES: CC(C)C(CO)CNC(c1c[nH]c2ncc(Br)cc12)C(F)(F)F]

To a solution of intermediate 33 (0.05 g, 0.169 mmol) in dry THF (3 mL) was added at 0° C. triethylamine (35.4 µL, 0.25 mmol) and methanesulfonyl chloride (15.7 µL, 0.20 mmol). The mixture was stirred ar rt for 12 h. 2-(aminomethyl)-3-methyl-1-butanol (0.030 g, 0.25 mmol) in THF (2 mL) was added and the reaction mixture was stirred at 50° C. for 14 h. Water was added and the aqueous phase extracted with AcOEt. The organic layer was dried over MgSO$_4$, filtered and evaporated until dryness. The mixture was purified by flash chromatography over silica gel (Heptane-AcOEt 100-0 to 40-60); The fractions were collected and evaporated until dryness to yield intermediate 34 (0.031 g, 46%)

The following intermediate was prepared via an analogous procedure:

| Intermediate | Structure | Quantity Yield |
|---|---|---|
| Intermediate 35 Starting from intermediate 33 and Oxazol-2-yl-methylamine |  | 0.12 g  17% |

Synthesis of Intermediate 36

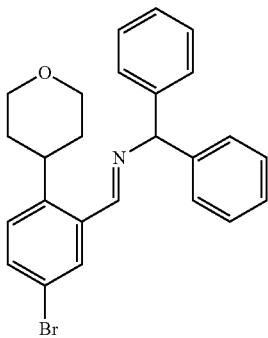 [SMILES: Brc1ccc(C2CCOCC2)c(/C=N/C(c2ccccc2)c2ccccc2)c1]

Magnesium sulfate (3.94 g, 32.7 mmol) and intermediate 3 (4 g, 14.86 mmol) were added successively to a stirred solution of Benhydrylamine (2.64 mL, 14.86 mmol) in DCM (52 mL). The resulting mixture was stirred at rt overnight, filtered. The filtrate was evaporated until dryness, dried under vacuum and used directly in the next step without further purification

Synthesis of Intermediate 37

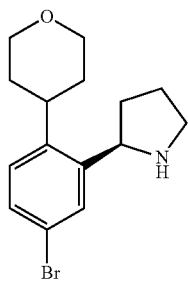 [SMILES: Brc1ccc(C2CCOCC2)c([C@H]2CCCN2)c1]

Intermediate 36 (8.6 g, 19.8 mmol) was dissolved in THF (94 mL) under nitrogen atmosphere and cooled to −78° C. A 1M solution of Potassium tert-butoxide in dry THF (23.7 mL, 23.7 mmol) was added dropwise (changing of color to violet). After 30 min 1-chloro-3-iodopropane (8.52 mL, 79.194 mmol) was added rapidly. The mixture was stirred for 1 h at −78° C., then warmed to room temperature (after 5 min changing of color to grey) and stirred overnight. Water and DCM were added, the phases separated and the aqueous phase extracted with DCM. The combined organic extracts were dried over MgSO$_4$, filtered, the solvent removed under reduced pressure and the residue obtained dried under high vacuum. This residue was dissolved in acetone (75 mL), 3M HCl (28 mL, 84 mmol) was added and the mixture stirred at room temperature overnight. The mixture was basified with K$_2$C$_{O3}$ and extracted with DCM. The layers were separated and the aqueous phase extracted with DCM. The combined organic extracts were dried over MgSO$_4$, filtered and the solvent removed under reduced pressure. A purification was performed via preparative LC (Stationary phase: SiOH 30 μm. Mobile phase: 100% DCM to 90% DCM 10% MeOH 0.1% NH4OH) and enantiomers were separated by chiral SFC (Stationary phase: Chiralpak AS-H 5 μm 250*20 mm, Mobile phase: 80% CO$_2$, 20% mixture of EtOH/iPrOH 50/50 v/v(+0.3% iPrNH$_2$)). The pure fractions were collected and evaporated until dryness to give intermediate 37 (463 mg, 7.5%) [α]$_d$: +630 (589 nm, c 0.3 w/v %, DMF, 20° C.) and intermediate 6 (470 mg, 7.6%) [α]$_d$: +63° (589 nm, c 0.3 w/v %, DMF, 20° C.)

Synthesis of Final Compounds

Synthesis of Co. 1

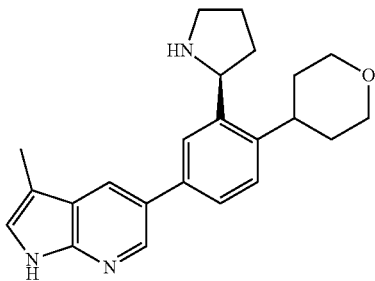 [SMILES: Cc1c[nH]c2ncc(-c3ccc(C4CCOCC4)c([C@@H]4CCCN4)c3)cc12]

TFA (7 mL, 91.5 mmol) was added dropwise to a solution of intermediate 13 (1.41 g, 3 mmol) in DCM (70 mL) at room temperature. The reaction mixture was stirred for 15 h at room temperature. Water and potassium carbonate were added and the mixture was extracted with AcOEt. The organic layer was dried over MgSO4, filtered and evaporated until dryness. The residue was cristallized in diethylether to yield Co. 1 (0.69 g, 62%). [α]$_d$: −61.3° (589 nm, c 0.24 w/v %, DMF, 20° C.);

The compounds listed below have been prepared by an analogous procedure as for preparation of Co. 1:

| Compound | Structure | Quantity | Yield |
|---|---|---|---|
| Co. 2 Starting from Intermediate 14 | 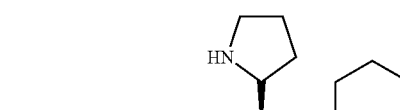 [α]$_d$: −15.1° (589 nm, c 0.16 w/v %, MeOH, 23° C.); m.p. = 241.7° C. (Mettler Toledo MP50) | 0.240 g | 97% |

-continued

| Compound | Structure | Quantity | Yield |
|---|---|---|---|
| Co. 3 Starting from Intermediate 15 | [structure] [α]$_d$: -14.3° (589 nm, c 0.1 w/v %, MeOH, 23° C.); m.p. = 246.5° C. (Mettler Toledo MP50) | 0.115 g | 71% |
| Co. 4 Starting from Intermediate 16 | [structure] [α]$_d$: -35.5° (589 nm, c 0.2 w/v %, DMF, 20° C.); m.p. = 260° C. (DSC) | 0.102 g | 38% |
| Co. 5 Starting from Intermediate 17 | [structure] [α]$_d$: -82.5° (589 nm, c 0.08 w/v %, DMF, 20° C.) | 0.015 g | 29% |
| Co. 6 Starting from Intermediate 18 | [structure] [α]$_d$: -53.3° (589 nm, c 0.21 w/v %, DMF, 20° C.) | 0.035 g | 35% |

| Compound | Structure | Quantity | Yield |
|---|---|---|---|
| Co. 7 Starting from Intermediate 19 | 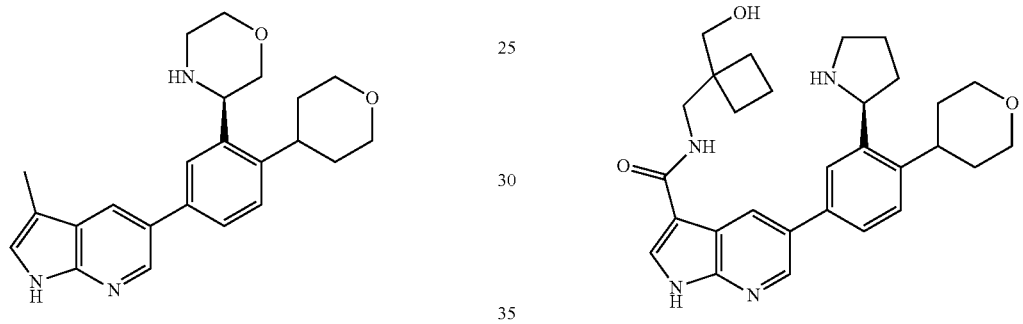 [α]$_d$: -55.8° (589 nm, c 0.12 w/v %, DMF, 20° C.) | 0.02 g | 80% |

Synthesis of Co. 8

In a sealed tube, a mixture of 5-bromo-3-methyl-7-azaindole (0.775 g, 3.67 mmol), intermediate 10 (1.37 g, 3.7 mmol), PdCl$_2$(dppf) (0.3 g, 0.37 mmol), sodium carbonate (4.0 g, 8 mmol) in 1,4-dioxane (40 mL) was heated at 90° C. for 15 hours. Water and potassium carbonate were added and the mixture was extracted with AcOEt. The organic layer was dried over MgSO4, filtered and evaporated until dryness. The residue was purified by preparative LC (40 g of SiOH 30 μm, from 100% DCM to 90% DCM/10% MeOH/ 0.5% NH4OH); the fractions were collected and evaporated until dryness. The compound was cristallized in acetonitrile to yield Co. 8 (0.332 g, 24%). [α]$_d$: −750 (589 nm, c 0.16 w/v %, DMF, 20° C.); m.p.=229° C. (DSC)

Synthesis of Co. 9

A mixture of intermediate 23 (0.286 g, 0.74 mmol), intermediate 6 (0.115 g, 0.37 mmol), PdCl2(dppf) (0.045 g, 0.056 mmol), sodium carbonate (0.079 g, 0.74 mmol) in 1,4-dioxane (5 mL) and water (1 mL) was heated at 85° C. for 15 hours. Brine was added and the mixture was extracted with AcOEt. The organic layer was dried over MgSO$_4$, filtered and evaporated util dryness. The residue was purified by flash chromatography: Gradient of a mixture (DCM/ MeOH/NH$_4$OH, 4.0/1.0/0.1, v/v/v) in DCM from 0 to 50%. the fractions were collected and evaporated until dryness to yield Co. 9 (0.05 g, 27%) as a brown solid. [α]$_d$: −25.3° (589 nm, c 0.147 w/v %, MeOH, 23° C.).

The compounds listed below have been prepared by an analogous reaction procedure as for preparation of Co. 9:

| Compound | Structure | Quantity | Yield |
|---|---|---|---|
| Co. 9b Starting from Intermediates 23 and 37 | [α]$_d$: +27.7° (589 nm, c 0.11 w/v %, MeOH, 23° C.); m.p. = 203° C. (Mettler Toledo MP50) | 0.026 g | 15% |

| Compound | Structure | Quantity | Yield |
|---|---|---|---|
| Co. 10 Starting from Intermediates 22 and 6 | (structure shown) [α]$_d$: -25.8° (589 nm, c 0.11 w/v %, MeOH, 23° C.); m.p. = 235.1° C. (Mettler Toledo MP50) | 0.017 g | 10% |
| Co. 10b Starting from Intermediates 22 and 37 | (structure shown) [α]$_d$: +25.6° (589 nm, c 0.15 w/v %, MeOH, 23° C.); m.p. = 210° C. (Mettler Toledo MP50) | 0.052 g | 31% |

Synthesis of Co. 11

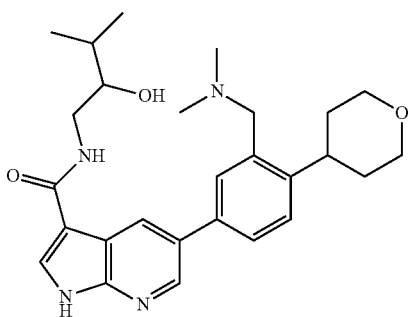 [SMILES: CC(C)C(O)CNC(=O)c1c[nH]c2ncc(-c3ccc(C4CCOCC4)c(CN(C)C)c3)cc12]

1-amino-3-methylbutan-2-ol hydrochloride (0.166 g, 1.19 mmol) was added to a stirring solution of intermediate 6 (0.3 g, 0.79 mmol), EDCI (0.303 g, 1.58 mmol), DIPEA (0.413 mL, 2.37 mmol) and HOBt (0.214 g, 1.58 mmol) in DCM (5 mL) and DMSO (3 mL). The reaction mixture was stirred at rt for 15 hours. The solvents were removed and the mixture was diluted with a saturated solution of Na$_2$CO$_3$ (5 mL). The layers were separated and the aqueous phase extracted with DCM/MeOH (9/1) (3×20 mL). The organic layer was dried over MgSO$_4$, filtered and evaporated until dryness. The residue was purified by flash chromatography (DCM/(DCM/MeOH/NH$_4$OH: 4/1/0.02%) gradient from 100-0 to 0-100); the fractions were collected and evaporated until dryness to yield Co. 11 (0.173 g, 47%). m.p.=263.4° C. (Mettler Toledo MP50).

The compounds listed below have been prepared similarly as for preparation of Co. 11:

| Compound | Structure | Quantity | Yield |
|---|---|---|---|
| Co. 12 Starting from Intermediate 6 | 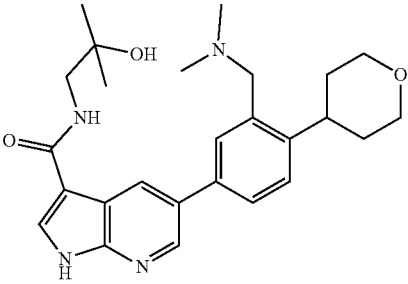<br>m.p. = 268° C. (Mettler Toledo MP50) | 0.070 g | 23% |
| Co. 13 Starting from Intermediate 6 | 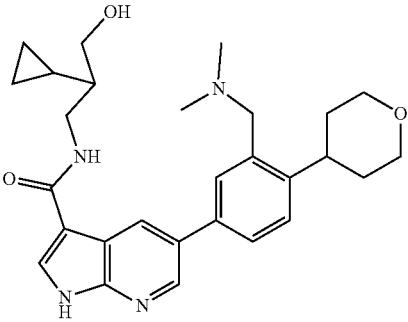<br>m.p. = 260° C. (Mettler Toledo MP50) | 0.115 g | 36% |
| Co. 14 Starting from Intermediate 6 | 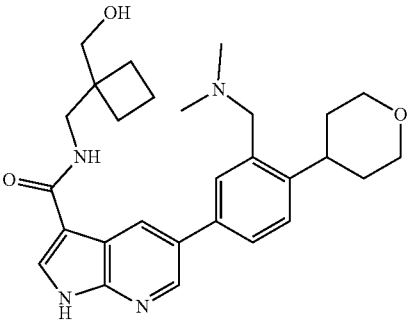<br>m.p. = 285° C. (Mettler Toledo MP50) | 0.109 g | 34% |
| Co. 15 Starting from Intermediate 6 | 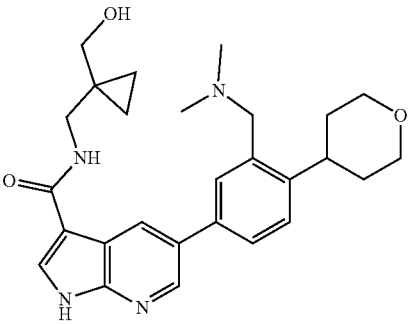<br>m.p. = 277° C. (Mettler Toledo MP50) | 0.087 g | 28% |

-continued
| Compound | Structure | Quantity | Yield |
|---|---|---|---|
| Co. 16 Starting from Intermediate 6 | 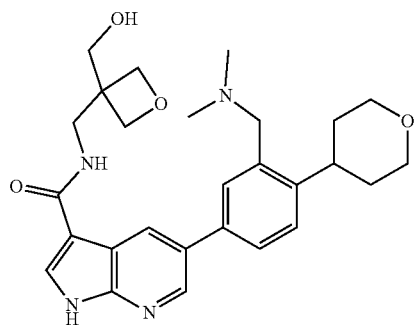 m.p. = 261° C. (Mettler Toledo MP50) | 0.143 g | 45% |
| Co. 17 Starting from Intermediate 6 | 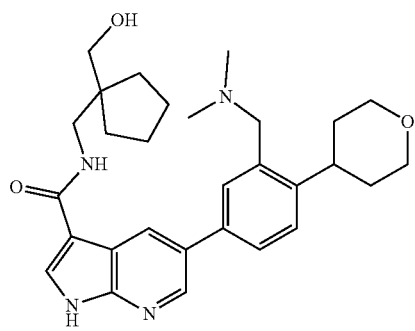 m.p. = 292° C. (Mettler Toledo MP50) | 0.059 g | 18% |
| Co. 18 Starting from Intermediate 6 | 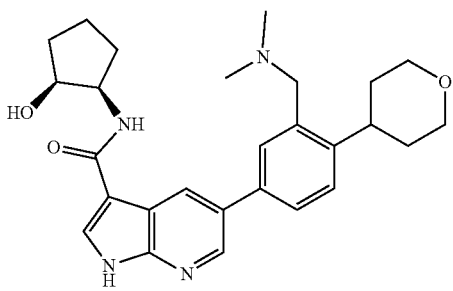 m.p. = 267° C. (Mettler Toledo MP50) | 0.132 g | 70% |
| Co. 19 Starting from Intermediate 6 | 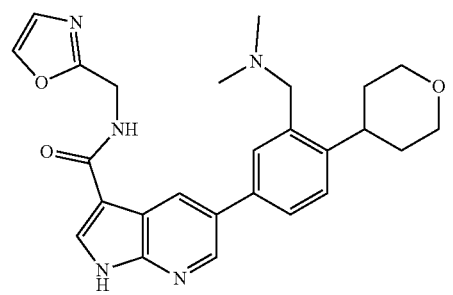 m.p. = 217° C. (Mettler Toledo MP50) | 0.031 g | 16% |

| Compound | Structure | Quantity | Yield |
|---|---|---|---|
| Co. 20a Starting from Intermediate 6 | | 0.035 g | 18% | m.p. = 266° C. (Mettler Toledo MP50)

| Co. 20b Starting from Intermediate 6 | | 0.037 g | 23% | m.p. = 255° C. (Mettler Toledo MP50)

| Co. 21 Starting from Intermediate 6 | | 0.068 g | 35% | m.p. = 250° C. (Mettler Toledo MP50)

| Co. 22 Starting from Intermediate 6 | | 0.075 g | 39% | m.p. = 213° C. (Mettler Toledo MP50)

-continued

| Compound | Structure | Quantity | Yield |
|---|---|---|---|
| Co.23 Starting from Intermediate 6 | (structure) m.p. = 275° C. (Mettler Toledo MP50) | 0.060 g | 30% |
| Co. 24 Starting from Intermediate 6 | (structure) m.p. = 204° C. (Mettler Toledo MP50) | 0.043 g | 22% |
| Co. 26 Starting from Intermediate 6 | (structure) m.p. = 143° C. (Mettler Toledo MP50) | 0.108 g | 53% |
| Co. 27 Starting from Intermediate 6 | (structure) m.p. = 273° C. (Mettler Toledo MP50) | 0.060 g | 33% |

-continued
| Compound | Structure | Quantity | Yield |
|---|---|---|---|
| Co. 29 Starting from Intermediate 6 | 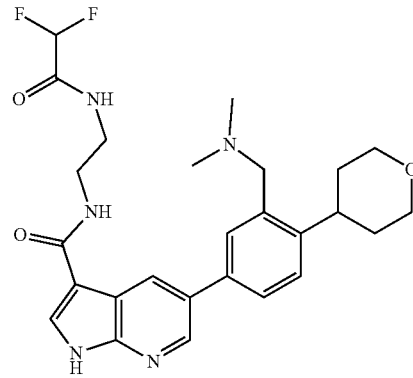 m.p. = 245° C. (Mettler Toledo MP50) | 0.140 g | 74% |
| Co. 30 Starting from Intermediate 6 | 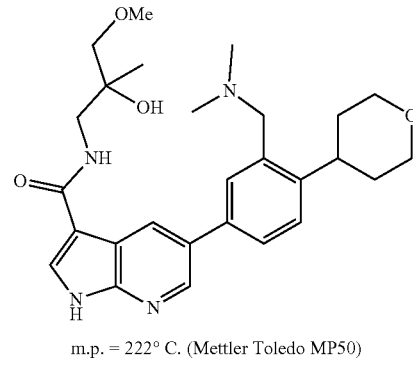 [SMILES: COCC(C)(O)CNC(=O)c1c[nH]c2ncc(-c3ccc(C4CCOCC4)c(CN(C)C)c3)cc12] m.p. = 222° C. (Mettler Toledo MP50) | 0.045 g | 23% |
| Co. 31a Starting from Intermediate 6 | 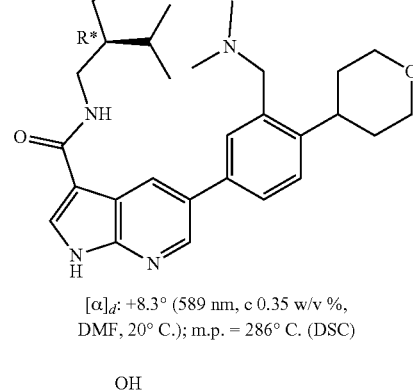 [α]$_d$: +8.3° (589 nm, c 0.35 w/v %, DMF, 20° C.); m.p. = 286° C. (DSC) | 0.129 g | 10% |
| Co. 31b Starting from Intermediate 6 | 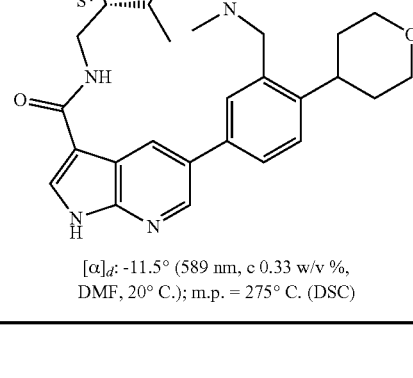 [α]$_d$: -11.5° (589 nm, c 0.33 w/v %, DMF, 20° C.); m.p. = 275° C. (DSC) | 0.127 g | 10% |

Synthesis of Co. 32

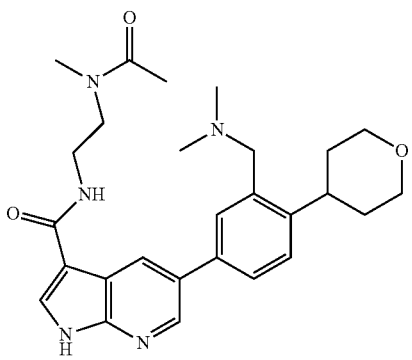 [SMILES: CC(=O)N(C)CCNC(=O)c1c[nH]c2ncc(-c3ccc(C4CCOCC4)c(CN(C)C)c3)cc12]

A mixture of intermediate 29 (0.331 g, 1.09 mmol), intermediate 11 (0.250 g, 0.838 mmol), PdCl$_2$(dppf) (0.034 g, 0.042 mmol), sodium carbonate (0.178 g, 1.68 mmol) in 1,4-dioxane (15 mL) and water (3 mL) was heated at 95° C. for 15 hours. The solvents were evaporated in vacuo. The residue was purified by flash chromatography (DCM/DCM-MeOH 4:1 gradient from 100/0 to 0/100); the fractions were collected and evaporated until dryness to yield Co. 32 (0.165 g, 40%) as a white solid.

The compound listed below has been prepared by an analogous procedure as described for preparation of Co. 32:

| Compound | Structure | Quantity | Yield |
| --- | --- | --- | --- |
| Co. 33 Starting from Intermediates 12 and 30 | 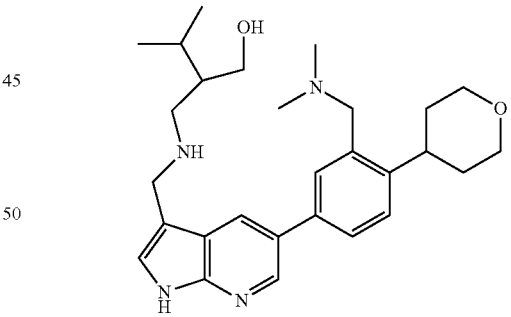 m.p. = 268° C. (Mettler Toledo MP50) | 0.050 g | 36% |

Synthesis of Co. 34

A mixture of 2-(aminomethyl)-3-methylbutan-1-ol (0.67 g, 0.57 mmol), intermediate 32 (0.104 g, 0.29 mmol) and one drop of acetic acid was stirred in MeOH (5 mL) at rt for 15 min. Sodium triacetoxyborohydride (0.185 g, 0.86 mmol) was added and the mixture was stirred at rt for 2 h. 4 eq of sodium triacetoxyborohydride were added with an additional reaction time of 4 hours. MeOH was evaporated; the mixture was diluted with water and DCM. The layers were separated and the aqueous phase extracted with DCM/MeOH (9/1) (3×20 mL). The organic layer was dried over MgSO4, filtered and evaporated until dryness. The residue was purified by flash chromatography (DCM/DCM-MeOH (9:1) from 100/0 to 0/100) and purified by RP-HPLC (From 90% of H$_2$O (65 mM NH$_4$OAc+CH$_3$CN (90:10))—10% (CH$_3$CN:MeOH 1:1) till 54% of H$_2$O (65 mM NH$_4$OAc+ CH$_3$CN (90:10))—46% (CH$_3$CN:MeOH 1:1). The fractions were collected to yield Co. 34 recrystallized in diethyl ether (0.016 g, 12%). m.p.=201° C. (Mettler Toledo MP50).

The compound listed below was prepared according to a similar protocol:

| Compound | Structure | Quantity | Yield |
|---|---|---|---|
| Co. 35 Starting from Intermediates 32 and 2-Oxazolemethanamine | 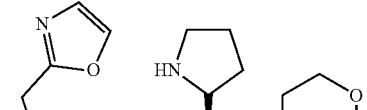 m.p. = 205° C. (Mettler Toledo MP50) | 0.105 g | 50% |

Synthesis of Co. 36

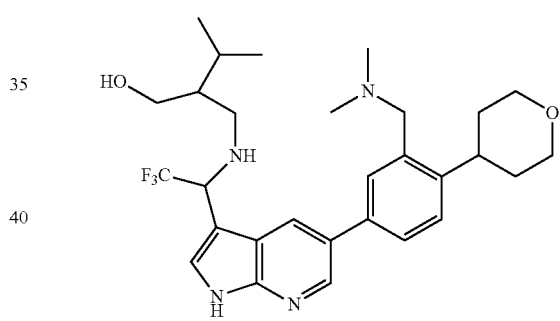

A mixture of intermediate 34 (0.127 g, 0.32 mmol), intermediate 12 (0.334 g, 0.97 mmol), PdCl$_2$(dppf) (0.013 g, 0.016 mmol), sodium carbonate (0.068 g, 0.65 mmol) in 1,4-dioxane (5 mL) and water (1 mL) was heated at 90° C. for 15 hours. Water was added and the mixture was extracted with DCM. The organic layer was dried over MgSO$_4$, filtered and evaporated until dryness. The residue was purified by flash chromatography (DCM/DCM-MeOH 4:1 gradient from 100/0 to 0/100) and by RP-HPLC (From 81% of H$_2$O (65 mM NH$_4$OAc+CH$_3$CN (90:10))–19% CH$_3$CN till 45% of H$_2$O (65 mM NH$_4$OAc+CH$_3$CN (90:10))–55% CH$_3$CN); The fractions were collected to yield Co. 36 recrystallized in diethyl ether (0.022 g, 13%). m.p.=178° C. (Mettler Toledo MP50).

The compound listed below was prepared according to a similar protocol:

| Compound | Structure | Quantity | Yield |
|---|---|---|---|
| Co. 37 Starting from Intermediates 35 and 12 | [Chemical structure with m.p. = 171° C. (Mettler Toledo MP50)] | 0.027 g | 24% |

Analytical Part

Optical Rotation (OR)

Optical rotations were measured at 20° C. or 23° C. on a Perkin Elmer 341 digital polarimeter at λ=589 nm (i.e., sodium D line), using a 0.2 mL cell (1=1 dm), and are given as $[\alpha]_D$ (concentration in g/100 mL solvent).

LCMS (Liquid Chromatography/Mass Spectrometry)

The High Performance Liquid Chromatography (HPLC) measurement was performed using a LC pump, a diode-array (DAD) or a UV detector and a column as specified in the respective methods. If necessary, additional detectors were included (see table of methods below).

Flow from the column was brought to the Mass Spectrometer (MS) which was configured with an atmospheric pressure ion source. It is within the knowledge of the skilled person to set the tune parameters (e.g. scanning range, dwell time . . . ) in order to obtain ions allowing the identification of the compound's nominal monoisotopic molecular weight (MW). Data acquisition was performed with appropriate software. Compounds are described by their experimental retention times (Rt) and ions. If not specified differently in the table of data, the reported molecular ion corresponds to the $[M+H]^+$ (protonated molecule) and/or $[M-H]^-$ (deprotonated molecule). In case the compound was not directly ionizable the type of adduct is specified (i.e. $[M+NH_4]^+$, $[M+HCOO]^-$, etc. . . . ). For molecules with multiple isotopic patterns (Br, Cl), the reported value is the one obtained for the lowest isotope mass. All results were obtained with experimental uncertainties that are commonly associated with the method used. Hereinafter, "MSD" means Mass Selective Detector, "DAD" Diode Array Detector.

TABLE

LCMS Method codes (Flow expressed in mL/min; column temperature (T) in ° C.;Run time in minutes).

| Method code | Instrument | Column | Mobile phase | gradient | Flow Column T | Run time |
|---|---|---|---|---|---|---|
| 1 | Agilent: 1100-DAD and MSD | YMC: Pack ODS-AQ (3 μm, 4.6 × 50mm) | A: HCOOH 0.1% in water, B: $CH_3CN$ | 95% A to 5% A in 4.8 min, held for 1 min, back to 95% A in 0.2 min. | 2.6 35 | 6 |
| 2 | Agilent 1260 Infinity DAD TOF-LC/MS G6224A | YMC-pack ODS-AQ C18 (50 × 4.6 mm, 3 μm) | A: 0.1% HCOOH in $H_2O$ B: $CH_3CN$ | From 95% A to 5% A in 4.8 min, held for 1.0 min, to 95% A in 0.2 min. | 2.6 35 | 6.8 |
| 3 | Agilent 1290 Infinity DAD TOF-LC/MS G6224A | YMC-pack ODS-AQ C18 (50 × 4.6 mm, 3 μm) | A: 0.1% HCOOH in $H_2O$ B:$CH_3CN$ | ISET 2V1.0 Emulated Agilent Pump G1312A V1.0 From 94.51% A to 5 % A in 4.8 min held foor 1.0 min, to 95% A in 0.2 min | 2.6 35 | 6 |
| 4 | Waters: Acquity UPLC® - DAD and Quattro Micro ™ | Waters: BEH C18 (1.71.μm, 2.1 × 100 mm) | A: 95% $CH_3COON$ $H_4$7mM/ 5% $CH_3CN$, B: $CH_3CN$ | 84.2% A in 0.49min, to 10.5% A in 2.18min, held for 1.94min, back to 84.2% A to 0.73min, held for 0.73min. | 0.343 40 | 6.2 |
| 5 | Waters: Acquity® H-Class - DAD and SQD2™ | Waters: BEH C18 (1.71μm, 2.1 × 100 mm) | A: 95% $CH_3COON$ $H_4$7mM/ 5% $CH_3CN$, B: $CH_3CN$ | 84.2% A for 10.5% A in 2.18 min, held for 1.96 min, back to 84.2% A in 0.73 min, held for 0.73 min. | 0.343 40 | 6.1 |

Melting Points

For a number of compounds, melting points (m.p.) were determined with a DSC 1 STAR$^e$ System from Mettler Toledo (method 1) or a Mettler Toledo MP50 (method 2) or a Kofler bench (method 3). Melting points were measured with a temperature gradient of 10° C./minute up to 350° C. Melting points are given by peak values.

The results of the analytical measurements are shown in table 3.

TABLE 3

Retention time ($R_t$) in min.,[M+H]$^+$ peak (protonated molecule), LCMS method and m.p. (melting point in ° C.) (n.d.means not determined).

| Co. No. | $R_t$ | [M+H]$^+$ | LCMS Method | m.p. (° C.) | m.p. method | Co. No. | $R_t$ | [M+H]$^+$ | LCMS Method | m.p. (° C.) | m.p. method |
|---|---|---|---|---|---|---|---|---|---|---|---|
| 1 | 2.18 | 362.2 | 4 | 262 | 2 | 23 | 1.89 | 477.3 | 3 | 275 | 2 |
| 2 | 1.98 | 362.2 | 1 | 242 | 2 | 24 | 1.87 | 476.2 | 3 | 204 | 2 |
| 3 | 2.00 | 373.3 | 4 | 247 | 2 | 26 | 1.77 | 490.3 | 3 | 143 | 2 |
| 4 | 1.97 | 387.3 | 4 | 260 | 1 | 27 | 1.75 | 451.8 | 3 | 273 | 2 |
| 5 | 1.75 | 349.4 | 5 | n.d. |  | 29 | 1.71 | 500.3 | 3 | 245 | 2 |
| 6 | 1.92 | 348.4 | 5 | n.d. |  | 30 | 1.75 | 481.3 | 3 | 222 | 2 |
| 7 | 1.68 | 349.4 | 5 | n.d. |  | 32 | 1.88 | 478.1 | 1 | >300 | 2 |
| 8 | 2.39 | 378.3 | 4 | 229 | 1 | 34 | 1.65 | 465 | 3 | 201 | 2 |
| 9 | 1.98 | 489 | 1 | n.d. |  | 35 | 1.48 | 446 | 1 | 205 | 2 |
| 10 | 1.81 | 463.1 | 2 | 235 | 2 | 36 | 1.91 | 533.3 | 2 | 178 | 2 |
| 11 | 2.04 | 465 | 1 | 263 | 2 | 37 | 1.98 | 514 | 2 | 171 | 2 |
| 12 | 1.86 | 452 | 1 | 268 | 2 | 10 b | 1.77 | 463 | 1 | 210 | 2 |
| 13 | 2.06 | 477 | 1 | 260 | 2 | 20 a | 1.47 | 473.3 | 3 | 266 | 2 |
| 14 | 2.15 | 477 | 1 | 285 | 2 | 20 b | 1.77 | 407.3 | 3 | 255 | 2 |
| 18 | 1.79 | 463.3 | 3 | 267 | 2 | 31 a | 2.25 | 479.3 | 4 | 286 | 1 |
| 19 | 1.78 | 460.2 | 3 | 217 | 2 | 31 b | 2.27 | 479.3 | 4 | 275 | 1 |
| 21 | 1.73 | 475.3 | 3 | 250 | 2 | 9 b | 1.98 | 489.1 | 1 | 203 | 2 |
| 22 | 1.76 | 475 | 3 | 213 | 2 |  |  |  |  |  |  |

NMR

Some NMR experiments were carried out using a Bruker Avance 500 spectrometer equipped with a Bruker 5 mm BBFO probe head with z gradients and operating at 500 MHz for the proton and 125 MHz for carbon. Chemical shifts (d) are reported in parts per million (ppm). J values are expressed in Hz.

Some NMR experiments were carried out using a Bruker Avance III 400 spectrometer at ambient temperature (298.6 K), using internal deuterium lock and equipped with reverse double-resonance ($^1$H, $^{13}$C, SEI) probe head with z gradients and operating at 400 MHz for the proton. Chemical shifts (d) are reported in parts per million (ppm). J values are expressed in Hz.

TABLE 4

$^1$H NMR results

| Co. No. | $^1$H NMR result |
|---|---|
| 1 | $^1$H NMR (500 MHz, DMSO-d$_6$) δ ppm 11.30 (br s, 1H), 8.45 (d, J = 1.9 Hz, 1H), 8.08 (d, J = 1.6 Hz, 1H), 7.90 (d, J = 1.9 Hz, 1H), 7.57 (dd, J = 8.0, 1.7 Hz, 1H), 7.38 (d, J = 7.9 Hz, 1H), 7.26 (s, 1H), 4.17 (dd, J = 9.8, 2.5 Hz, 1H), 3.93-4.04 (m, 2H), 3.78 (br d, J = 9.8 Hz, 1H), 3.69 (dd, J = 10.7, 2.5 Hz, 1H), 3.47-3.59 (m, 3H), 3.31 (m, 1H, partially obscured by solvent peak), 3.19 (br t, J = 11.3 Hz, 1H), 2.99 (td, J = 11.7, 2.8 Hz 1H), 2.94 (d, J = 11.4 Hz, 1H), 2.80 (br s, 1H), 2.31 (s, 3H), 1.83 (qd, J = 12.3, 4.4 Hz, 1H), 1.64-1.78 (m, 2H), 1.60 (br d, J = 12.9 Hz, 1H) |
| 3 | $^1$H NMR (500 MHz, DMSO-d$_6$) δ ppm 8.68 (d, J = 1.6 Hz, 1H), 8.46 (s, 1H), 8.27 (d, J = 1.9 Hz, 1H), 7.92 (d, J = 1.3 Hz, 1H), 7.61 (dd, J = 8.2, 1.6 Hz, 1H), 7.39 (d, J = 7.9 Hz, 1H), 4.46 (br t, J = 7.9 Hz, 1H), 3.97 (br d, J = 10.7 Hz, 2H), 3.46-3.53 (m, 2H), 3.13-3.23 (m, 2H), 2.93-3.03 (m, 1H), 2.14- 2.27 (m, 1H), 1.81-1.97 (m 2H) 1.77 (td J = 12.5, 4.1 Hz, 2H) 1.48-1.70 (m 3H) |
| 4 | $^1$H NMR (500 MHz, DMSO-d$_6$) δ ppm 11.72 (br s, 1H), 8.52 (d, J = 1.9 Hz, 1H), 8.22 (d, J = 1.9 Hz, 1H), 7.89 (d, J = 1.9 Hz, 1H), 7.45-7.54 (m, 2 H), 7.37 (d, J = 7.9 Hz, 1H), 4.39 (t, J = 7.6 Hz, 1H), 4.12 (s, 2H), 3.87-4.04 (m, 2H), 3.43-3.59 (m, 2H), 3.06-3.22 (m, 2H), 2.88-2.98 (m, 1H), 2.68-2.86 (m, 1H), 2.12-2.26 (m, 1H), 1.70-1.94 (m, 4H), 1.55-1.69 (m, 2H), 1.47 (dq, J = 11.5, 8.3 Hz, 1H) |
| 8 | $^1$H NMR (500 MHz, DMSO-d$_6$) δ ppm 11.30 (br s, 1H), 8.45 (d, J = 1.9 Hz, 1H), 8.08 (d, J = 1.6 Hz, 1H), 7.90 (d, J = 1.9 Hz, 1H), 7.57 (dd, J = 8.0, 1.7 Hz, 1H), 7.38 (d, J = 7.9 Hz, 1H), 7.26 (s, 1H), 4.17 (dd, J = 9.8, 2.5 Hz, 1H), 3.93-4.04 (m, 2H), 3.78 (br d, J = 9.8 Hz, 1H), 3.69 (dd, J = 10.7, 2.5 Hz, 1H), 3.47-3.59 (m, 3H), 3.31 (m, 1H, partially obscured by solvent peak), 3.19 (br t, J = 11.3 Hz, 1H), 2.99 (td, J = 11.7, 2.8 Hz 1H), 2.94 (d, J = 11.4 Hz, 1H), 2.80 (br s, 1H), 2.31 (s, 3H), 1.83 (qd, J = 12.3, 4.4 Hz, 1H), 1.64-1.78 (m, 2H), 1.60 (br d, J = 12.9 Hz, 1H) |

Pharmacological, Part

HPK1 Kinase Assay

A recombinant fusion protein consisting of full-length human Hpk1 with an N-terminal Glutatione S-transferase (GST) tag was produced in a baculovirus/insect cell expression system. GST-Hpk1 protein was purified from cell lysates by glutathione sepharose affinity chromatography. Kinase inhibition was determined using the ADP Glo™ Kinase Assay kit (Promega, V9101). Test compounds were prepared by serial dilution in dimethyl sulfoxide (DMSO) and 0.1 µl of each dilution was spotted onto a 384-well white Proxiplate (Perkin Elmer, 6008289). 8 µl of kinase assay buffer (40 mM Tris pH 7.5, 2 mM dithiothreitol (DTT), 0.05% Bovine Serum Albumin, 5 mM $MgCl_2$) containing Hpk1 protein was transferred to each well and incubated for 30-45 minutes at room temperature. The enzymatic reaction was started by adding 2 µl of kinase assay buffer containing 75 µM ATP. After 120 minutes, the reaction was stopped by adding 3 µl of ADP Glo™ reagent (Promega, V9101) and incubating 45 minutes at room temperature. After adding 6 µl Kinase Detection Reagent (Promega, V9101) and incubating for at least 20 minutes at room temperature, the plate was transferred to an EnVision Plate Reader (Perkin Elmer) for luminescence detection and $IC_{50}$ values were determined.

SLP76 Phosphorylation Assay

Hpk1 inhibition in cells was determined by detection of SLP76 phosphorylation at S376 in lysates from HEK293 cells engineered to express Hpk1 and SLP76. Serial dilutions of test compounds were prepared in cell culture medium and 20 µl was transferred into each well of a 96-well plate containing HEK293 cells in 180 µl of culture medium. After incubation for 4 hours at 37° C./5% $CO_2$, the culture medium was removed, plates were put on ice and cells washed with cold Minimal Essential Medium before lysing in 90 µl of cold Mammalian Protein Extraction Reagent (Thermo Scientific, 78501) for 30 minutes on ice. The cell lysates were transferred to another 96-well plate, centrifuged 10 minutes at 3000 rcf (4° C.) and 30 µl transferred to a 96-well High-bind plate (MSD, L15XB-3). After coating overnight at 4° C., the cell lysate was removed, wells were washed with base buffer (TBS, 0.2% Tween-20), and blocking solution (base buffer containing 3% MSD blocker A) was added to each well for 1 hour at room temperature. The blocking solution was removed, the wells were washed with base buffer, and detection antibody (SLP76 pS376) was added in 25 µl base buffer containing 1% MSD blocker A to each well. After a 2 h incubation at room temperature, the detection antibody was removed, wells were washed four times with base buffer, 25 µl SULFO-TAG labeled goat anti-rabbit secondary antibody (MSD, R32AB-1) in base buffer containing 1% MSD blocker A was added to each well and left for 1 hour at room temperature. Wells were washed 4 times with base buffer, 150 µl Read Buffer T was added to each well, and the plates were read in a Mesoscale plate reader (MSD). $IC_{50}$ values were determined by curve-fitting the electrochemiluminescent signals obtained from the lysates of HEK293 cells expressing Hpk1 and SLP76 treated with test compounds at various concentrations minus the signal obtained from HEK293 cells expressing SLP76 only.

TABLE

Data of the HPK1 kinase assay and the SLP76 phosphorylation assay. Co. No. means Compound Number.

| Co. No. | Hpk1 biochemical ($pIC_{50}$) | pSLP76 (HEK293) ($pIC_{50}$) |
| --- | --- | --- |
| 1 | 8.73 | 6.54 |
| 2 | 6.84 | 5.17 |
| 3 | 8.50 | 6.59 |
| 4 | 7.95 | 6.92 |
| 5 | 7.32 | 6.06 |
| 6 | 7.52 | 6.41 |
| 7 | 6.90 | 5.07 |
| 8 | 8.35 | 6.95 |
| 9 | 8.38 | 5.88 |
| 9b | 6.45 | n.d. |
| 10 | 8.33 | <5 |
| 10b | 6.31 | n.d. |
| 11 | 7.66 | 5.45 |
| 12 | 8.24 | 6.24 |
| 13 | 7.92 | 6.12 |
| 14 | 8.61 | 6.73 |
| 15 | 8.1 | 6.42 |
| 16 | 7.27 | <5 |
| 17 | 8.42 | 6.6 |
| 18 | 8.54 | 6.58 |
| 19 | 7.99 | 5.99 |
| 20a | 7.55 | 5.16 |
| 20b | 7.03 | 5.14 |
| 21 | 7.47 | 5.02 |
| 22 | 7.23 | 5.19 |
| 23 | 7.98 | 5.8 |
| 24 | 8.35 | 5.81 |
| 26 | 7.41 | 5.37 |
| 27 | 7.93 | 5.94 |
| 29 | 7.91 | 5.81 |
| 30 | 7.80 | 5.67 |
| 31a | 8.47 | 6.59 |
| 31b | 7.58 | 5.88 |
| 32 | 7.18 | 5.8 |
| 33 | 8.04 | <5 |
| 34 | 6.49 | <5 |
| 35 | 7.64 | 5.52 |
| 36 | 7.39 | 5.58 |
| 37 | 7.66 | 5.78 |

The invention claimed is:

1. A compound of Formula (I)

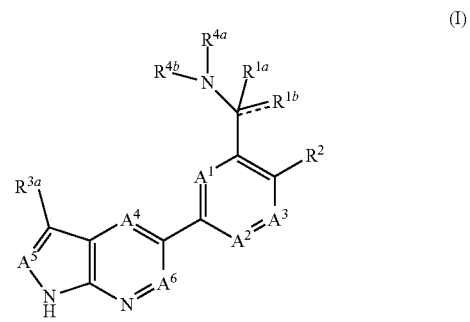

or a tautomer or a stereoisomeric form thereof, wherein the dotted bond towards $R^{1b}$ is an optional bond that may be present when $R^{1b}$ and $R^{4b}$ are taken together to form a monocyclic or bicyclic aromatic heterocyclyl as defined herein;

$A^1$ represents CH or N; $A^2$ represents CH; $A^3$ represents CH or N;

provided that only one of $A^1$ and $A^3$ represents N;

$A^4$ represents CH or N; $A^5$ represents N or $CR^{3b}$; $A^6$ represents CH;

$R^{1a}$ represents hydrogen;

$R^{1b}$ represents hydrogen or $CH_3$;

$R^{4a}$ represents hydrogen, $C_{1-4}$alkyl, or $C_{3-6}$cycloalkyl;

$R^{4b}$ represents hydrogen, $C_{1-4}$alkyl, $C_{3-6}$cycloalkyl, or a carbon linked monocyclic 4-, 5-, 6- or 7-membered non-aromatic heterocyclyl containing 1, 2 or 3 heteroatoms each independently selected from the group consisting of N, O, and S;

wherein said S-atom might be substituted to form S(=O), S(=O)$_2$, or S(=O)(=NR$^x$);

or

R$^{1b}$ and R$^{4b}$ are taken together to form together with the atoms to which they are attached a monocyclic 5-membered aromatic heterocyclyl or a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$); or a bicyclic 6- to 12-membered aromatic or fully saturated heterocyclyl containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$);

wherein said monocyclic or bicyclic, aromatic or fully saturated heterocyclyl might be substituted on one or more of the carbon atoms with in total 1, 2 or 3 substituents each independently selected from the group consisting of —OH, CN, halo, R$^7$, —O—R$^7$, —S(=O)$_2$—R$^7$, —C(=O)—R$^7$, —NR$^{6c}$R$^{6d}$, —C(=O)—NR$^{6a}$R$^{6b}$, and Het$^e$;

wherein said monocyclic or bicyclic, aromatic or fully saturated heterocyclyl might be substituted on the optional additional nitrogen atoms with in total 1 or 2 substituents each independently selected from the group consisting of R$^7$, —S(=O)$_2$—R$^7$, —C(=O)—R$^7$, —C(=O)—NR$^{6a}$R$^{6b}$ and Het$^d$;

provided that in case R$^{1b}$ and R$^{4b}$ are taken together, R$^{4a}$ represents hydrogen; and R$^{1a}$ represents hydrogen or R$^{1a}$ is absent when the dotted bond towards R$^{1b}$ is a bond;

or

R$^{4a}$ and R$^{4b}$ are taken together to form together with the N-atom to which they are attached a monocyclic 5-, 6- or 7-membered aromatic heterocyclyl or a monocyclic 4-, 5-, 6- or 7-membered fully saturated heterocyclyl, each containing 1 N-atom and optionally 1 or 2 additional heteroatoms each independently selected from the group consisting of N, O, S;

wherein said optional S-atom might be substituted to form S(=O), S(=O)$_2$, or S(=O)(=NR$^x$); or a bicyclic 6- to 12-membered aromatic or fully saturated heterocyclyl containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$);

wherein said monocyclic or bicyclic, aromatic or fully saturated heterocyclyl might be substituted on one or more of the carbon atoms with in total 1, 2 or 3 substituents each independently selected from the group consisting of —OH, CN, halo, R$^7$, —O—R$^7$, —S(=O)$_2$—R$^7$, —C(=O)—R$^7$, —NR$^{6c}$R$^{6d}$, —C(=O)—NR$^{6a}$R$^{6b}$, and Het$^e$;

wherein said monocyclic or bicyclic, aromatic or fully saturated heterocyclyl might be substituted on the nitrogen atoms with in total 1 or 2 substituents each independently selected from the group consisting of R$^7$, —S(=O)$_2$—R$^7$, —C(=O)—R$^7$, —C(=O)—NR$^{6a}$R$^{6b}$, and Het$^d$;

in case R$^{4a}$ and R$^{4b}$ are taken together, R$^{1a}$ represents hydrogen, and R$^{1b}$ represents hydrogen;

R$^2$ is;

C$_{1-6}$alkyl optionally substituted with 1 or 2 substituents each independently selected from the group consisting of halo, —OH, cyano, and —O—C$_{1-4}$alkyl;

C$_{3-6}$cycloalkyl optionally substituted with 1 or 2 substituents each independently selected from the group consisting of halo, —OH, cyano and —O—C$_{1-4}$alkyl; and C$_{3-6}$cycloalkenyl optionally substituted with 1 or 2 substituents each independently selected from the group consisting of halo, —OH, cyano and —O—C$_{1-4}$alkyl;

R$^{3a}$ represents hydrogen, halo, cyano, —NR$^{6e}$R$^{6f}$, —C(=O)—NR$^{6g}$R$^{6h}$, or C$_{1-4}$alkyl optionally substituted with one, two or three substituents each independently selected from the group consisting of cyano, halo, CF$_3$, —NR$^{6e}$R$^{6f}$ and —C(=O)—NR$^{6g}$R$^{6h}$;

R$^{3b}$ represents hydrogen, halo, cyano, or C$_{1-4}$alkyl optionally substituted by 1, 2 or 3 halo atoms;

R$^{6a}$, R$^{6b}$, R$^{6c}$, and R$^{6d}$ are each independently selected from the group consisting of hydrogen;

C$_{3-6}$cycloalkyl optionally substituted with one —OR$^5$; and C$_{1-4}$alkyl optionally substituted with one —OR$^5$, wherein two hydrogen atoms on the same carbon atom of said C$_{1-4}$alkyl might be taken together to form C$_{3-6}$cycloalkyl;

R$^{6e}$, R$^{6f}$, R$^{6g}$, and R$^{6h}$ are each independently selected from the group consisting of hydrogen;

—S(=O)$_2$—R$^7$; C$_{3-6}$cycloalkyl optionally substituted with one or two substituents each independently selected from the group consisting of —OR$^5$, Het$^g$, and Het$^e$; and C$_{1-6}$alkyl optionally substituted with one or two substituents each independently selected from the group consisting of —OR$^5$, —NR$^{9a}$—C(=O)—R$^{9b}$, Het$^g$, and Het$^e$, wherein two hydrogen atoms on the same carbon atom of said C$_{1-6}$alkyl might be taken together to form C$_{3-6}$cycloalkyl wherein optionally one carbon atom is replaced by an heteroatom selected from nitrogen, oxygen and sulfur;

R$^5$ represents hydrogen or C$_{1-4}$alkyl;

R$^{8a}$, R$^{8c}$, and R$^{8d}$ are each independently selected from the group consisting of hydrogen;

C$_{1-4}$alkyl optionally substituted with one —OH or —O—C$_{1-4}$alkyl; and C$_{3-6}$cycloalkyl optionally substituted with one —OH or —O—C$_{1-4}$alkyl;

R$^{8b}$ is selected from the group consisting C$_{1-4}$alkyl optionally substituted with one —OH or —O—C$_{1-4}$alkyl; and C$_{3-6}$cycloalkyl optionally substituted with one —OH or —O—C$_{1-4}$alkyl;

or

R$^{8a}$ and R$^{8b}$, or R$^{8c}$ and R$^{8d}$ are taken together to form together with the N-atom to which they are attached a monocyclic fully saturated heterocyclyl containing 1 N-atom and optionally 1 or 2 additional heteroatoms each independently selected from the group consisting of N, O, S;

wherein said optional S-atom might be substituted to form S(=O), S(=O)$_2$, or S(=O)(=NR$^x$);

wherein said monocyclic 4-, 5-, 6- or 7-membered fully saturated heterocyclyl might be substituted on one or more of the carbon atoms with in total 1, 2 or 3 substituents each independently selected from the group consisting of —OH, CN, halo, R$^7$, —O—R$^7$, —S(=O)$_2$—R$^7$, —C(=O)—R$^7$, —NR$^{6c}$R$^{6d}$, and —C(=O)—NR$^{6a}$R$^{6b}$;

wherein said monocyclic fully saturated heterocyclyl might be substituted on the nitrogen atoms with in total 1 or 2 substituents each independently selected from the group consisting of $R^7$, —S(=O)$_2$—$R^7$, —C(=O)—$R^7$, and —C(=O)—NR$^{6a}$R$^{6b}$;

$R^{9a}$ represents hydrogen or $C_{1-4}$alkyl;

$R^{9b}$ represents hydrogen or $C_{1-4}$alkyl optionally substituted with 1, 2 or 3 halo atoms;

each Het$^c$ independently represents a monocyclic 4-, 5-, 6- or 7-membered fully saturated heterocyclyl containing 1, 2 or 3 heteroatoms each independently selected from the group consisting of N, O or S; wherein said S-atom might be substituted to form S(=O), S(=O)$_2$, or S(=O)(=NR$^x$);

each Het$^d$ independently represents a carbon linked monocyclic 4-, 5-, 6- or 7-membered fully saturated heterocyclyl containing 1, 2 or 3 heteroatoms each independently selected from the group consisting of N, O or S; wherein said S-atom might be substituted to form S(=O), S(=O)$_2$, or S(=O)(=NR$^x$);

Het$^b$ represents 4-tetrahydropyranyl;

each $R^7$ independently represents $C_{3-6}$cycloalkyl optionally substituted with 1, 2 or 3 substituents each independently selected from the group consisting of halo, —OH, —O—$C_{1-4}$alkyl and cyano; or $C_{1-4}$alkyl optionally substituted with 1, 2 or 3 substituents each independently selected from the group consisting of halo, —OH, —O—$C_{1-4}$alkyl and cyano;

Het$^c$ represents monocyclic 5-membered aromatic heterocyclyl containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$); wherein said monocyclic 5-membered aromatic heterocyclyl is optionally substituted with one substituent selected from the group consisting of Het$^f$, and $C_{1-4}$alkyl optionally substituted with one Het$^f$;

Het$^f$ represents a monocyclic 4-, 5-, 6- or 7-membered non-aromatic heterocyclyl containing 1, 2 or 3 heteroatoms each independently selected from the group consisting of N, O, S;

wherein said S-atom might be substituted to form S(=O), S(=O)$_2$, or S(=O)(=NR$^x$); wherein said monocyclic non-aromatic heterocyclyl is optionally substituted with one $C_{1-4}$alkyl;

Het$^g$ represents a monocyclic 4-, 5-, 6- or 7-membered non-aromatic heterocyclyl containing 1, 2 or 3 heteroatoms each independently selected from the group consisting of N, O, S;

wherein said S-atom might be substituted to form S(=O), S(=O)$_2$, or S(=O)(=NR$^x$); wherein said monocyclic non-aromatic heterocyclyl is optionally substituted with one substituent selected from the group consisting of oxo, Het$^f$, and $C_{1-4}$alkyl optionally substituted with one Het$^f$;

each $R^x$ independently represents hydrogen or $C_{1-4}$alkyl;

or a pharmaceutically acceptable addition salt or an N-oxide thereof.

2. The compound according to claim 1, wherein
$A^1$ represents CH; $A^2$ represents CH; $A^3$ represents CH; $A^4$ represents CH or N; $A^5$ represents N or CR$^{3b}$; $A^6$ represents CH;
$R^{1a}$ represents hydrogen;
$R^{1b}$ represents hydrogen;
$R^{4a}$ represents $C_{1-4}$alkyl;
$R^{4b}$ represents $C_{1-4}$alkyl;
or
$R^{1b}$ and $R^{4b}$ are taken together to form together with the atoms to which they are attached a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O) or S(=O)$_2$;

provided that in case $R^{1b}$ and $R^{4b}$ are taken together, $R^{4a}$ represents hydrogen; and
$R^{1a}$ represents hydrogen;
$R^{3a}$ represents hydrogen, cyano, —C(=O)—NR$^{6g}$R$^{6h}$, or $C_{1-4}$alkyl optionally substituted with one, two or three substituents each independently selected from the group consisting of cyano, halo, CF$_3$, and —NR$^{6e}$R$^{6f}$;

$R^{3b}$ represents hydrogen or $C_{1-4}$alkyl;

$R^{6e}$, $R^{6f}$, $R^{6g}$, and $R^{6h}$ are each independently selected from the group consisting of hydrogen; —S(=O)$_2$—$R^7$; $C_{3-6}$cycloalkyl optionally substituted with one or two —OR$^5$ substituents; and $C_{1-6}$alkyl optionally substituted with one or two substituents each independently selected from the group consisting of —OR$^5$, —NR$^{9a}$—C(=O)—R$^{9b}$, Het$^g$, and Het$^e$, wherein two hydrogen atoms on the same carbon atom of said $C_{1-6}$alkyl might be taken together to form $C_{3-6}$cycloalkyl wherein optionally one carbon atom is replaced by an heteroatom selected from nitrogen, oxygen and sulfur;

$R^5$ represents hydrogen or $C_{1-4}$alkyl;
$R^{9a}$ represents hydrogen or $C_{1-4}$alkyl;
$R^{9b}$ represents $C_{1-4}$alkyl optionally substituted with 1, 2 or 3 halo atoms;
each $R^7$ represents $C_{3-6}$cycloalkyl;
Het$^e$ represents monocyclic 5-membered aromatic heterocyclyl containing 1 N-atom and optionally 1 or 2 additional heteroatoms each independently selected from the group consisting of N, O, S; wherein said optional S-atom might be substituted to form S(=O) or S(=O)$_2$; wherein said monocyclic 5-membered aromatic heterocyclyl is optionally substituted with one $C_{1-4}$alkyl.

3. The compound according to claim 1, wherein
the dotted bond towards $R^{1b}$ is absent;
$A^1$ represents CH; $A^2$ represents CH; $A^3$ represents CH; $A^4$ represents CH; $A^5$ represents CR$^{3b}$; $A^6$ represents CH;
$R^{1b}$ and $R^{4b}$ are taken together to form together with the atoms to which they are attached a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O) or S(=O)$_2$;

provided that $R^{4a}$ represents hydrogen; and $R^{1a}$ represents hydrogen;
$R^{3a}$ represents $C_{1-4}$alkyl;
$R^{3b}$ represents hydrogen.

4. The compound according to claim 1, wherein
$R^{1b}$ and $R^{4b}$ are taken together to form together with the atoms to which they are attached a monocyclic 5-membered aromatic heterocyclyl or a monocyclic 4-, 5-, 6- or 7-membered fully saturated heterocyclyl, each containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$); or a bicyclic 6- to 12-membered aromatic or fully saturated heterocyclyl containing 1 N-atom and optionally 1 or 2 additional heteroatoms each independently selected from the group consisting of N, O, S; wherein said optional S-atom might be substituted to form S(=O), S(=O)$_2$, or S(=O)(=NR$^x$);

wherein said monocyclic or bicyclic, aromatic or fully saturated heterocyclyl might be substituted on one or more of the carbon atoms with in total 1, 2 or 3 substituents each independently selected from the group consisting of —OH, CN, halo, R$^7$, —O—R$^7$, —S(=O)$_2$—R$^7$, —C(=O)—R$^7$, —NR$^{6c}$R$^{6d}$, —C(=O)—NR$^{6a}$R$^{6b}$, and Het$^c$;

wherein said monocyclic or bicyclic, aromatic or fully saturated heterocyclyl might be substituted on the optional additional nitrogen atoms with in total 1 or 2 substituents each independently selected from the group consisting of R$^7$, —S(=O)$_2$—R$^7$, —C(=O)—R$^7$, —C(=O)—NR$^{6a}$R$^{6b}$, and Het$^d$;

provided that R$^{4a}$ represents hydrogen; and

R$^{1a}$ represents hydrogen or R$^{1a}$ is absent when the dotted bond towards R$^{1b}$ is a bond.

5. A pharmaceutical composition comprising a compound as claimed in claim 1 and a pharmaceutically acceptable carrier or diluent.

6. A process for preparing a pharmaceutical composition as defined in claim 5 comprising mixing a pharmaceutically acceptable carrier with a therapeutically effective amount of a compound according to claim 1.

7. A compound as claimed in claim 1 for use as a medicament.

8. A compound as claimed in claim 1 for use in the prevention or treatment of cancer and viral infection.

9. The compound as claimed in claim 8 in the prevention or treatment of cancer wherein cancer is selected from lung cancer, melanoma, head and neck cancer, esophageal cancer, bladder and urothelial cancer, liver cancer, kidney cancer, prostate cancer and hematopoietic cancer.

10. The compound as claimed in claim 8 in the prevention or treatment of a chronic viral infection.

11. A method of treating a disorder selected from cancer and viral infection comprising administering to a subject in need thereof, a therapeutically effective amount of a compound as claimed in claim 1, wherein the cancer is selected from lung cancer, melanoma, head and neck cancer, esophageal cancer, bladder and urothelial cancer, liver cancer, kidney cancer, prostate cancer and hematopoietic cancer.

12. The method according to claim 11 wherein the disorder is cancer.

13. The method according to claim 11 wherein the disorder is a chronic viral infection.

14. A pharmaceutical composition as claimed in claim 5 for use as a medicament.

15. A pharmaceutical composition as claimed in claim 5 for use in the prevention or treatment of cancer and viral infection.

16. A method of treating a disorder selected from cancer and viral infection comprising administering to a subject in need thereof, a pharmaceutical composition as claimed in claim 5.

17. The compound according to claim 1, wherein the compound is selected from

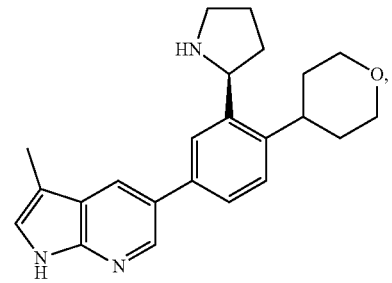
(Co. 1)

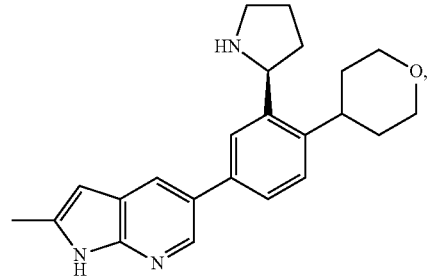
(Co. 2)

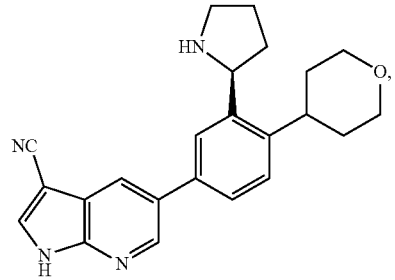
(Co. 3)

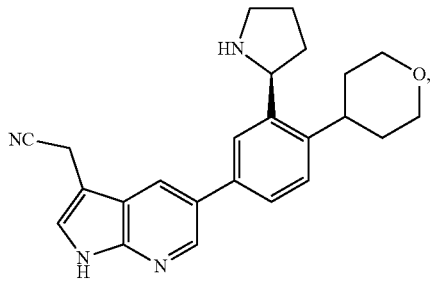
(Co. 4)

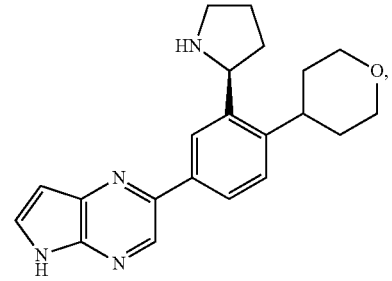
(Co. 5)

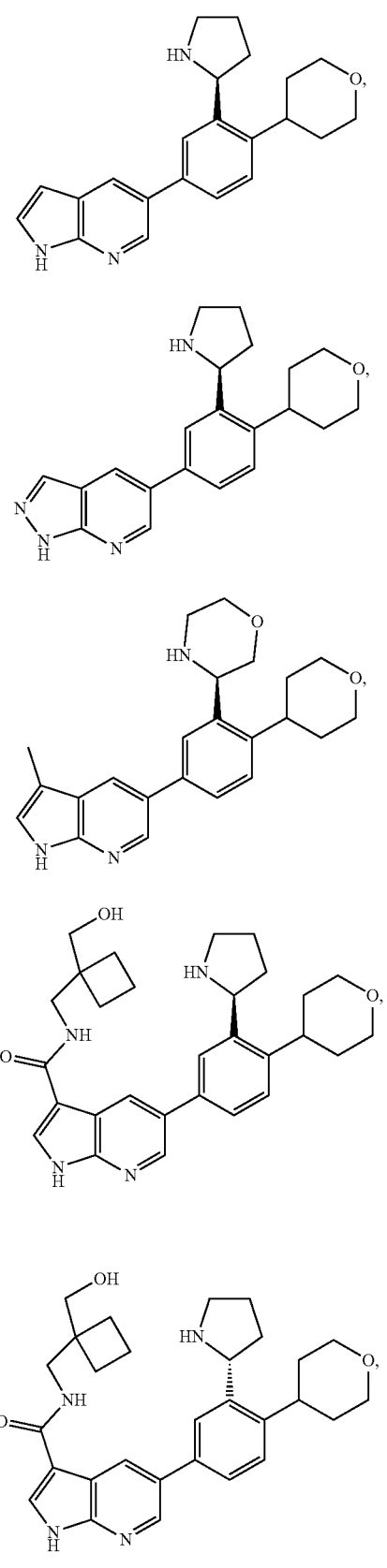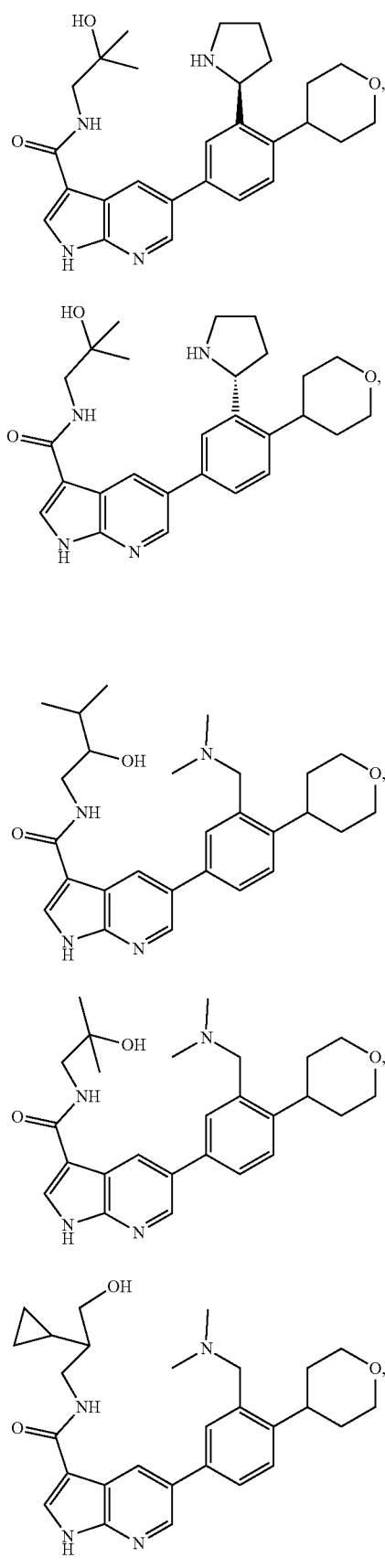

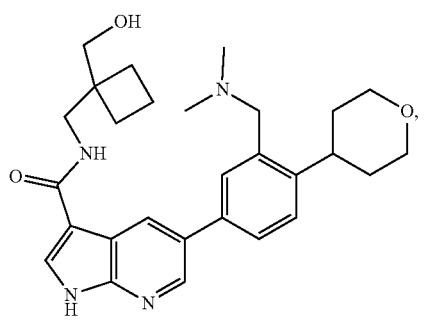
(Co. 14)
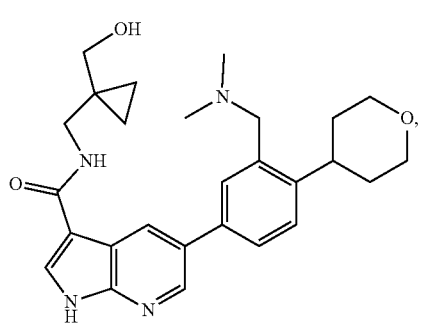
(Co. 15)
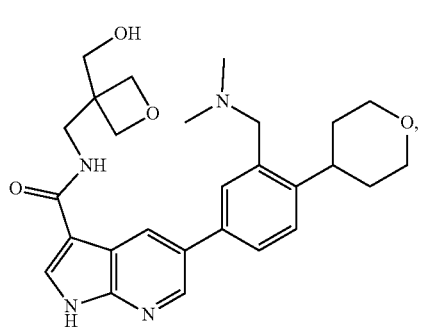
(Co. 16)
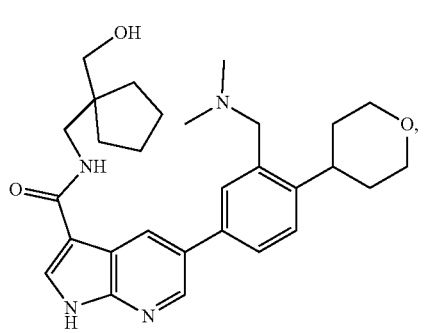
(Co. 17)
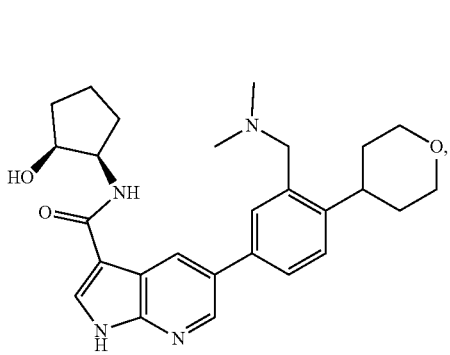
(Co. 18)
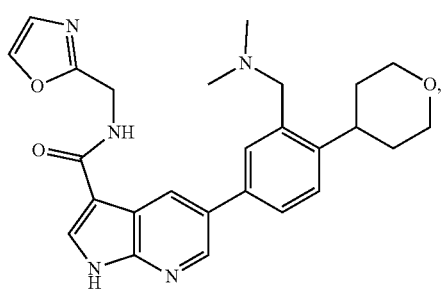
(Co. 19)
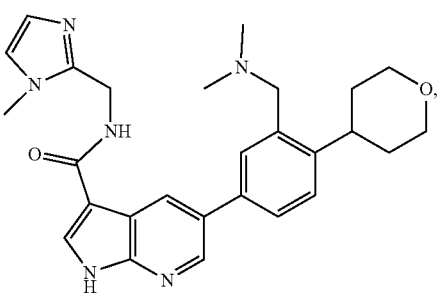
(Co. 20a)
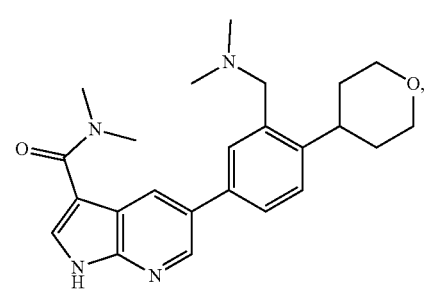
(Co. 20b)
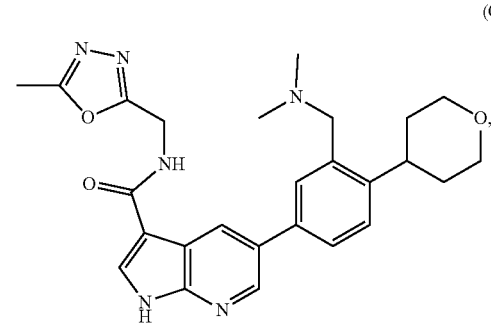
(Co. 21)
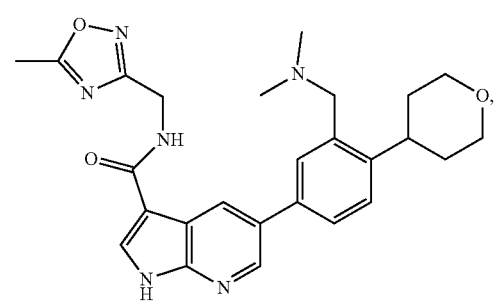
(Co. 22)

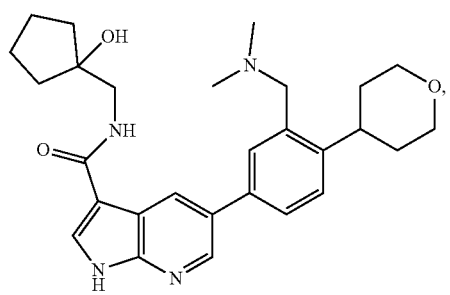
(Co. 23)
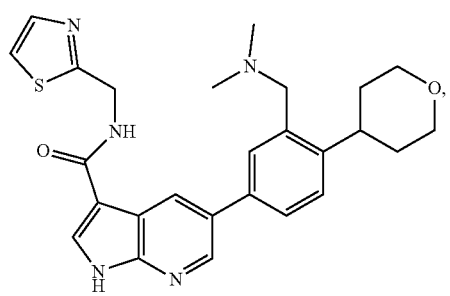
(Co. 24)
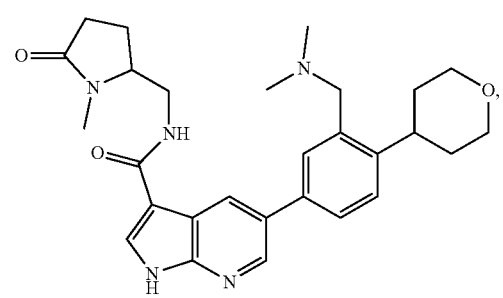
(Co. 26)
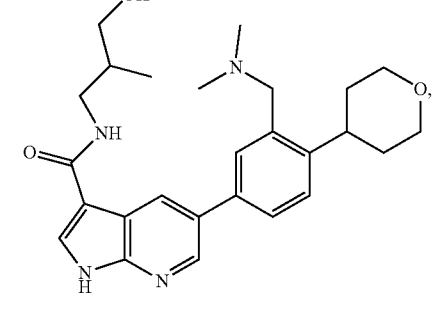
(Co. 27)
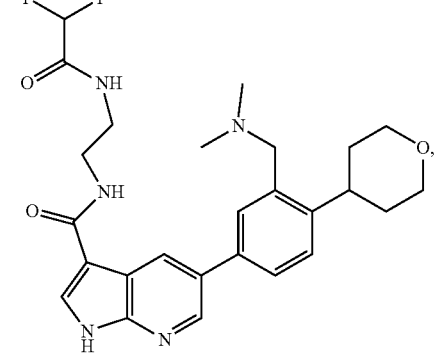
(Co. 29)
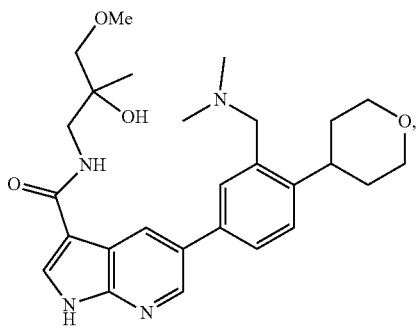
(Co. 30)
(Co. 31a)
(Co. 31b)
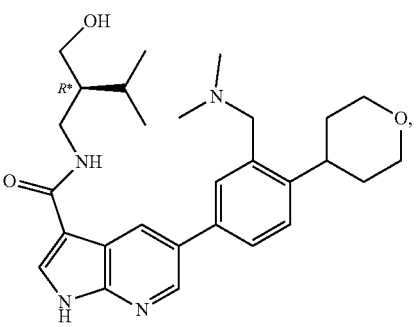
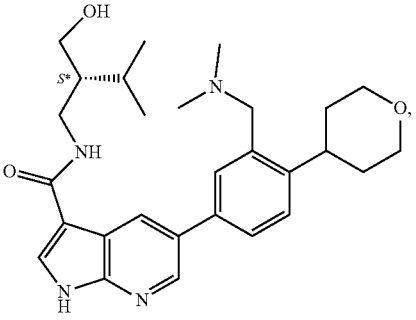
(Co. 32)
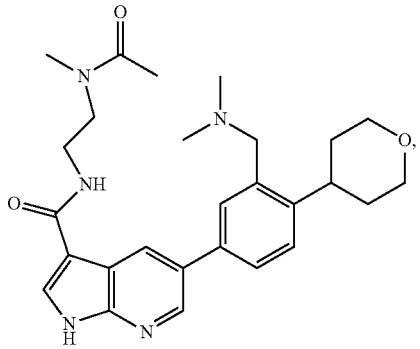
(Co. 33)

(Co. 34)
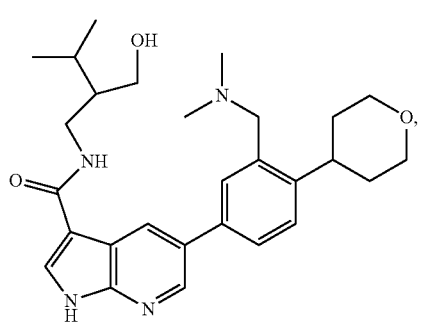

(Co. 35)
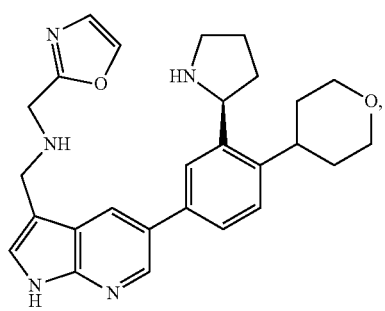

(Co. 36)
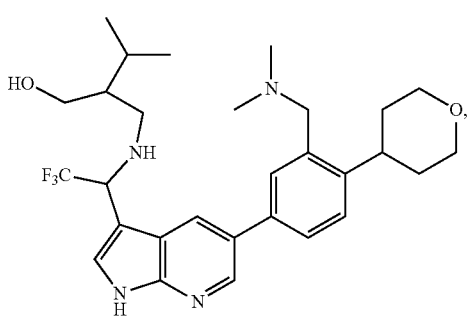

(Co. 37)

tautomers and stereoisomeric forms thereof,
and pharmaceutically acceptable addition salts and N-oxides thereof.

18. The compound according to claim 1, wherein the compound is

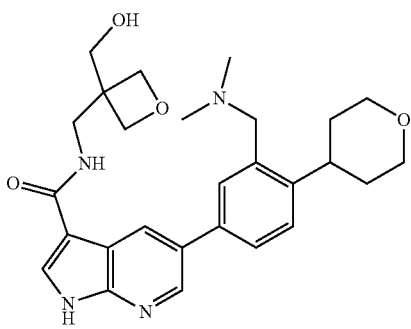 [SMILES: CN(C)Cc1cc(-c2cnc3[nH]cc(C(=O)NCC4(CO)COC4)c3c2)ccc1C1CCOCC1]

or a pharmaceutically acceptable addition salt thereof.

19. The compound according to claim 1, wherein the compound is

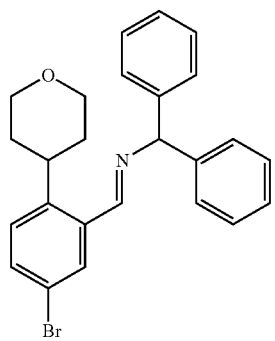 [SMILES: Brc1ccc(C2CCOCC2)c(/C=N/C(c2ccccc2)c2ccccc2)c1]

20. The compound according to claim 1, wherein the compound is

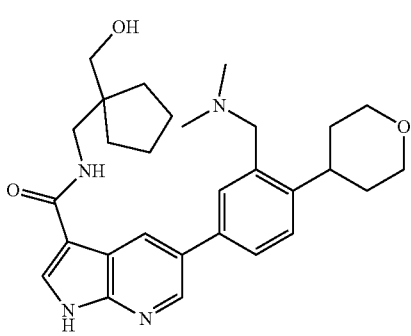 [SMILES: CN(C)Cc1cc(-c2cnc3[nH]cc(C(=O)NCC4(CO)CCCC4)c3c2)ccc1C1CCOCC1]

or a pharmaceutically acceptable addition salt thereof.

21. The compound according to claim 1, wherein the compound is
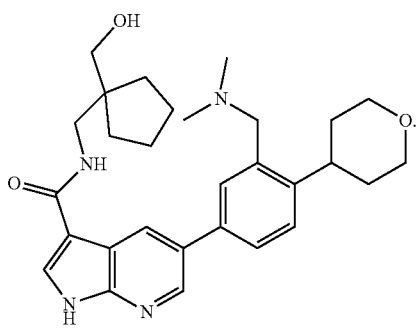 [SMILES: CN(C)Cc1cc(-c2cnc3[nH]cc(C(=O)NCC4(CO)CCCC4)c3c2)ccc1C1CCOCC1]
22. The compound according to claim 1, wherein the compound is
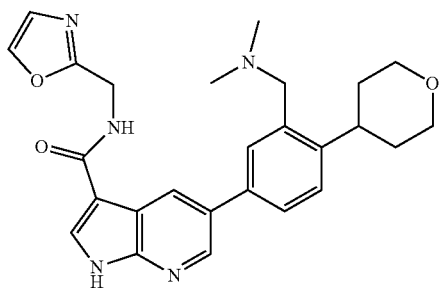 [SMILES: CN(C)Cc1cc(-c2cnc3[nH]cc(C(=O)NCc4ncco4)c3c2)ccc1C1CCOCC1]
or a pharmaceutically acceptable addition salt thereof.
23. The compound according to claim 1, wherein the compound is
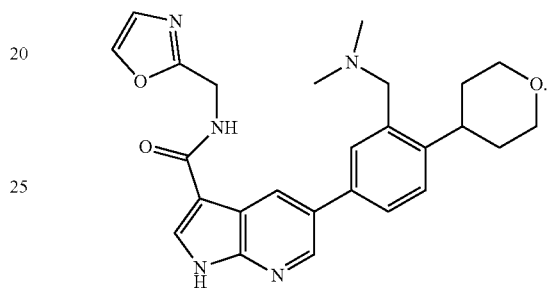
* * * * *